US010275982B2

(12) United States Patent
Sato et al.

(10) Patent No.: US 10,275,982 B2
(45) Date of Patent: *Apr. 30, 2019

(54) ATTENDANT DEVICE, GAMING MACHINE, AND DEALER-ALTERNATE DEVICE

(71) Applicants: Universal Entertainment Corporation, Tokyo (JP); Aruze Gaming (Hong Kong) Limited, Kowloon (HK)

(72) Inventors: Junpei Sato, Tokyo (JP); Yoshihiro Nagasaki, Tokyo (JP); Satoshi Joko, Tokyo (JP)

(73) Assignees: UNIVERSAL ENTERTAINMENT CORPORATION, Tokyo (JP); ARUZE GAMING (HONG KONG) LIMITED, Kowloon (HK)

( * ) Notice: Subject to any disclaimer, the term of this patent is extended or adjusted under 35 U.S.C. 154(b) by 97 days.

This patent is subject to a terminal disclaimer.

(21) Appl. No.: 15/276,707

(22) Filed: Sep. 26, 2016

(65) Prior Publication Data

US 2017/0330406 A1  Nov. 16, 2017

Related U.S. Application Data

(60) Provisional application No. 62/335,766, filed on May 13, 2016.

(51) Int. Cl.
  *A63F 9/24* (2006.01)
  *A63F 13/00* (2014.01)
  (Continued)

(52) U.S. Cl.
  CPC ........ *G07F 17/3241* (2013.01); *A63F 5/0005* (2013.01); *F21V 3/02* (2013.01); *F21V 3/062* (2018.02); *F21V 33/008* (2013.01); *G06K 9/00255* (2013.01); *G06K 9/00315* (2013.01); *G06K 9/00664* (2013.01); *G06K 9/00771* (2013.01); *G07F 17/322* (2013.01); *G07F 17/3206* (2013.01); *G07F 17/3209* (2013.01);
  (Continued)

(58) Field of Classification Search
  CPC ........................................................ G07F 17/32
  See application file for complete search history.

(56) References Cited

U.S. PATENT DOCUMENTS

| 2,011,995 A | 8/1935 | Baltzley |
| 2,068,379 A | 1/1937 | Frantz |

(Continued)

OTHER PUBLICATIONS

USPTO, Non-Final Office Action of U.S. Appl. No. 15/276,698 dated Nov. 15, 2017.

(Continued)

*Primary Examiner* — Kevin Y Kim
(74) *Attorney, Agent, or Firm* — Lex IP Meister, PLLC

(57) ABSTRACT

The present invention provides a reception device, which comprises an operation device performing a variety of operations, an obstacle checking device checking the obstacle in the monitoring area which includes the motion range of the operation device, and a control device simulating the operation path of the operation device in advance before the operation device performs an action and during the process of performing the action, and if there is an obstacle in the simulated operation path, a control is performed to cause the operation device to perform the operation corresponding to the abnormal state.

12 Claims, 45 Drawing Sheets

(51) Int. Cl.
  *G06F 17/00* (2019.01)
  *G06F 19/00* (2018.01)
  *G07F 17/32* (2006.01)
  *G10L 15/22* (2006.01)
  *G10L 15/25* (2013.01)
  *G10L 17/00* (2013.01)
  *H04N 5/247* (2006.01)
  *G07F 17/34* (2006.01)
  *G06K 9/00* (2006.01)
  *G07F 17/38* (2006.01)
  *H04N 7/18* (2006.01)
  *F21V 3/06* (2018.01)
  *F21V 3/02* (2006.01)
  *F21V 33/00* (2006.01)
  *H05B 33/08* (2006.01)
  *A63F 5/00* (2006.01)
  *G10L 15/26* (2006.01)
  *G10L 25/63* (2013.01)

(52) U.S. Cl.
  CPC ...... *G07F 17/3211* (2013.01); *G07F 17/3216* (2013.01); *G07F 17/3227* (2013.01); *G07F 17/3269* (2013.01); *G07F 17/3272* (2013.01); *G07F 17/3288* (2013.01); *G07F 17/3293* (2013.01); *G07F 17/34* (2013.01); *G07F 17/38* (2013.01); *G10L 15/22* (2013.01); *G10L 15/25* (2013.01); *G10L 17/005* (2013.01); *H04N 5/247* (2013.01); *H04N 7/183* (2013.01); *H04N 7/188* (2013.01); *H05B 33/086* (2013.01); *G10L 15/26* (2013.01); *G10L 25/63* (2013.01); *G10L 2015/223* (2013.01)

(56) References Cited

U.S. PATENT DOCUMENTS

| | | | |
|---|---|---|---|
| 2,104,740 | A | 1/1938 | Evans |
| 3,142,487 | A | 7/1964 | Portteus |
| 3,208,751 | A | 9/1965 | Kostka |
| 4,391,442 | A | 7/1983 | Levy |
| 4,735,416 | A | 4/1988 | McNally |
| 6,083,105 | A | 7/2000 | Ronin |
| 7,815,187 | B2 | 10/2010 | Yokota |
| 7,841,597 | B2 | 11/2010 | Cammegh |
| 9,474,981 | B1 | 10/2016 | Forti |
| 2004/0243280 | A1* | 12/2004 | Bash ............... G05D 1/0246 700/245 |
| 2005/0288089 | A1 | 12/2005 | Cammegh |
| 2006/0063599 | A1 | 3/2006 | Greenspan |
| 2007/0155496 | A1 | 7/2007 | Okada |
| 2007/0155497 | A1 | 7/2007 | Okada |
| 2007/0270074 | A1 | 11/2007 | Aochi et al. |
| 2008/0194310 | A1 | 8/2008 | Yoshizawa |
| 2009/0036187 | A1 | 2/2009 | Tseng |
| 2009/0143141 | A1 | 6/2009 | Wells et al. |
| 2010/0075744 | A1* | 3/2010 | Baratti ............... A63F 3/00157 463/22 |
| 2010/0090399 | A1 | 4/2010 | Tseng |
| 2010/0121808 | A1 | 5/2010 | Kuhn |
| 2011/0029128 | A1 | 2/2011 | Serre et al. |
| 2011/0106309 | A1 | 5/2011 | Lim et al. |
| 2013/0106054 | A1 | 5/2013 | Tseng |
| 2013/0210556 | A1 | 8/2013 | Vilar et al. |
| 2013/0218339 | A1 | 8/2013 | Maisonnier et al. |
| 2013/0277911 | A1 | 10/2013 | Shigeta |
| 2014/0038751 | A1 | 2/2014 | Yeager |
| 2014/0214424 | A1 | 7/2014 | Wang et al. |
| 2015/0165625 | A1 | 6/2015 | Michalowski et al. |
| 2015/0217455 | A1 | 8/2015 | Kikkeri et al. |
| 2015/0245133 | A1 | 8/2015 | Kim et al. |
| 2015/0348371 | A1 | 12/2015 | Blazevic |
| 2016/0101347 | A1 | 4/2016 | Merati |
| 2016/0310831 | A1 | 10/2016 | Chun |
| 2016/0361623 | A1 | 12/2016 | Huang et al. |

OTHER PUBLICATIONS

USPTO, Non-Final Office Action of U.S. Appl. No. 15/276,695 dated Feb. 7, 2018.
USPTO, Office Action U.S. Appl. No. 15/276,710 dated Oct. 20, 2017.
USPTO, Non-Final Office Action of U.S. Appl. No. 15/276,703 dated Nov. 2, 2017.
USPTO, Non-Final Office Action of U.S. Appl. No. 15/276,698 dated Nov. 21, 2018.
USPTO, Non-final office action of U.S. Appl. No. 15/276,695 dated Oct. 31, 2018.

* cited by examiner

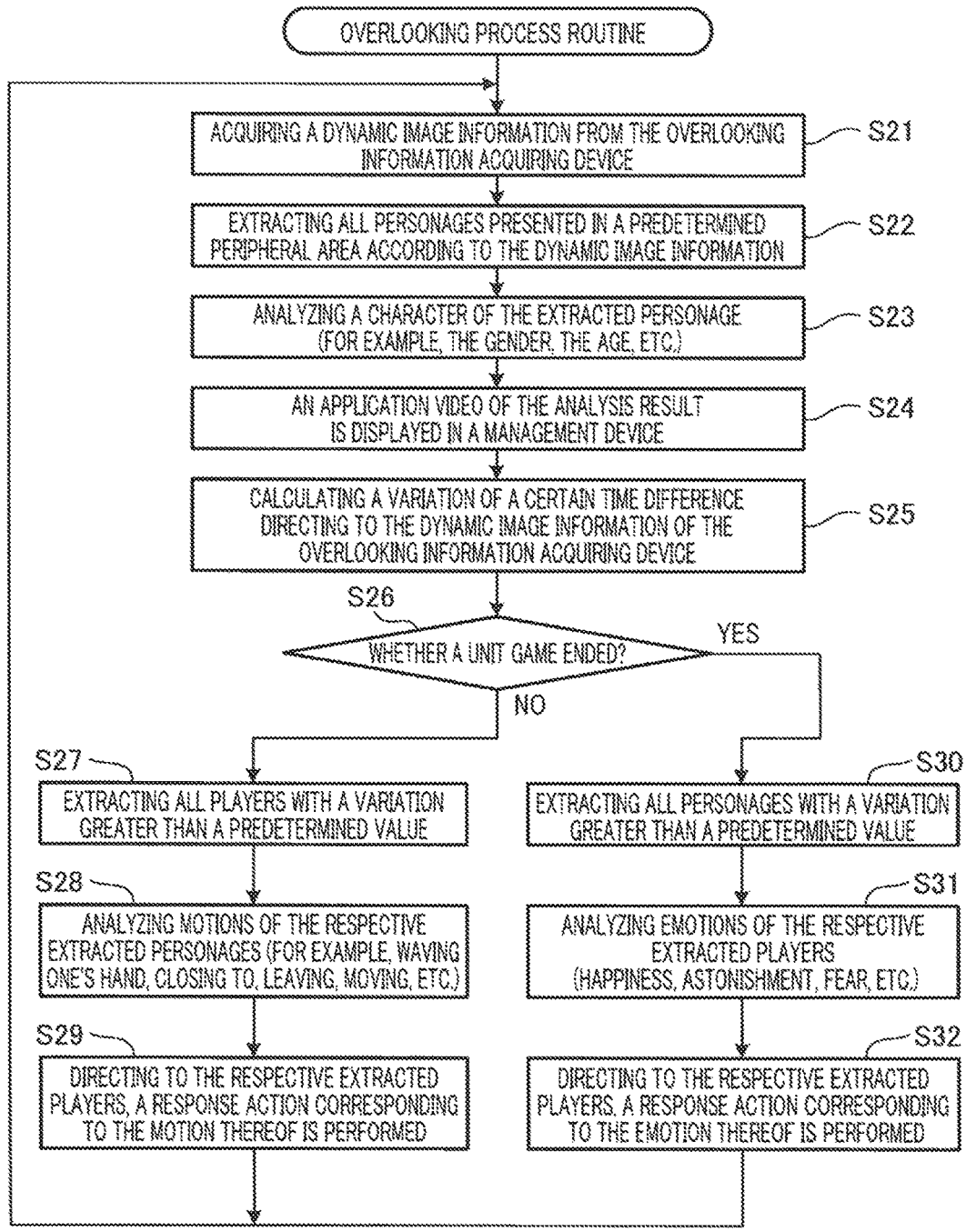

FIG.5

| EMOTION | EMOTIONAL ACTION |
|---|---|
| DISGUST | AN MOTION OF TURNING A FACE OR BODIES BACK TO BACK WITH EACH OTHER |
| FEAR | AN ACTION OF A HEAD AND A BODY BACK AWAY; AN ACTION OF A BODY BEING SPASTICITY, AN ACTION OF ESCAPING, AN ACTION OF A PITCH OF A VOICE HEIGHTENING, AN ACTION OF TAKING A DEEP BREATH SUDDENLY |
| ANGER | AN ACTION OF A HEAD AND A CHIN LEANING DOWNWARD, AN ACTION OF ALL ONE'S MUSCLES BEING NERVOUS, AN ACTION OF AN INTIMIDATING VOICE, A ROUGH VOICE, A LOUD VOICE, ETC. |
| HAPPINESS | AN ACTION OF A VOICE EXCITING, AN ACTION OF CLOSING TO SOMEONE |
| SADNESS | AN ACTION OF THE SIGHT LINE DROOPING, AN ACTION OF A HEAD DROOPING, AN ACTION OF A VOICE LOWERING, BEING A LITTLE BIT QUIET, ETC. |
| CONTEMPT | AN ACTION OF A HYPSOKINESIS A HEAD SEEMING TO LOOK ONE'S NOSE TIP, AN ACTION OF THE HEAD LEANING TO THE LEFT OR THE RIGHT IN A UNIDIRECTION UNDER THE ABOVE CONDITION, A PARALANGUAGE HUMMED BY A NOSTRIL (=VARIATION OF THE HEIGHT OF THE TONE, THE PROPERTY, THE VOLUME, THE SPEECH RATE, ETC.) |
| ASTONISHMENT | AN ACTION OF SHOULDERS RISING, AN ACTION OF TAKING A DEEP BREATH, ETC. |

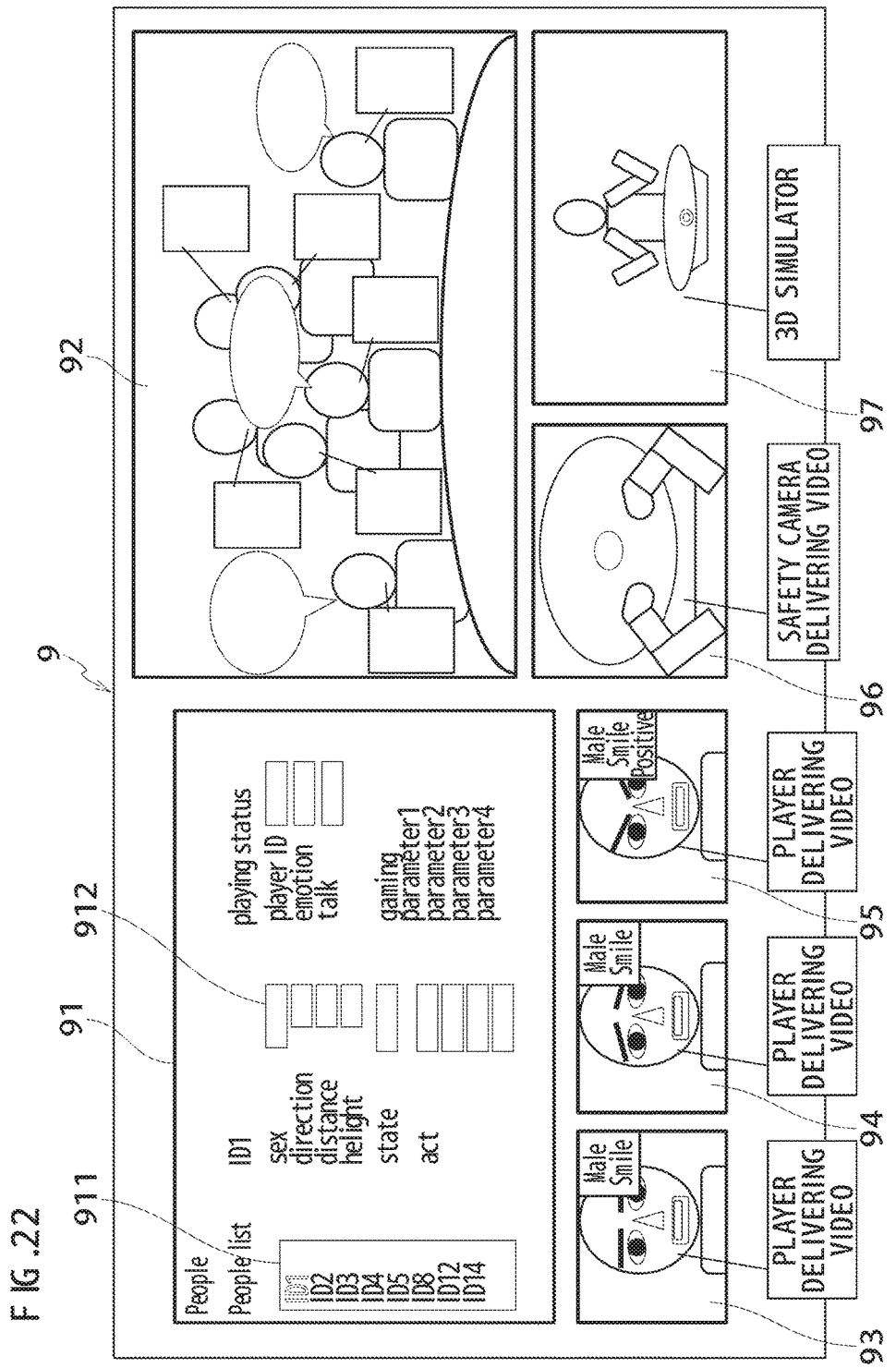

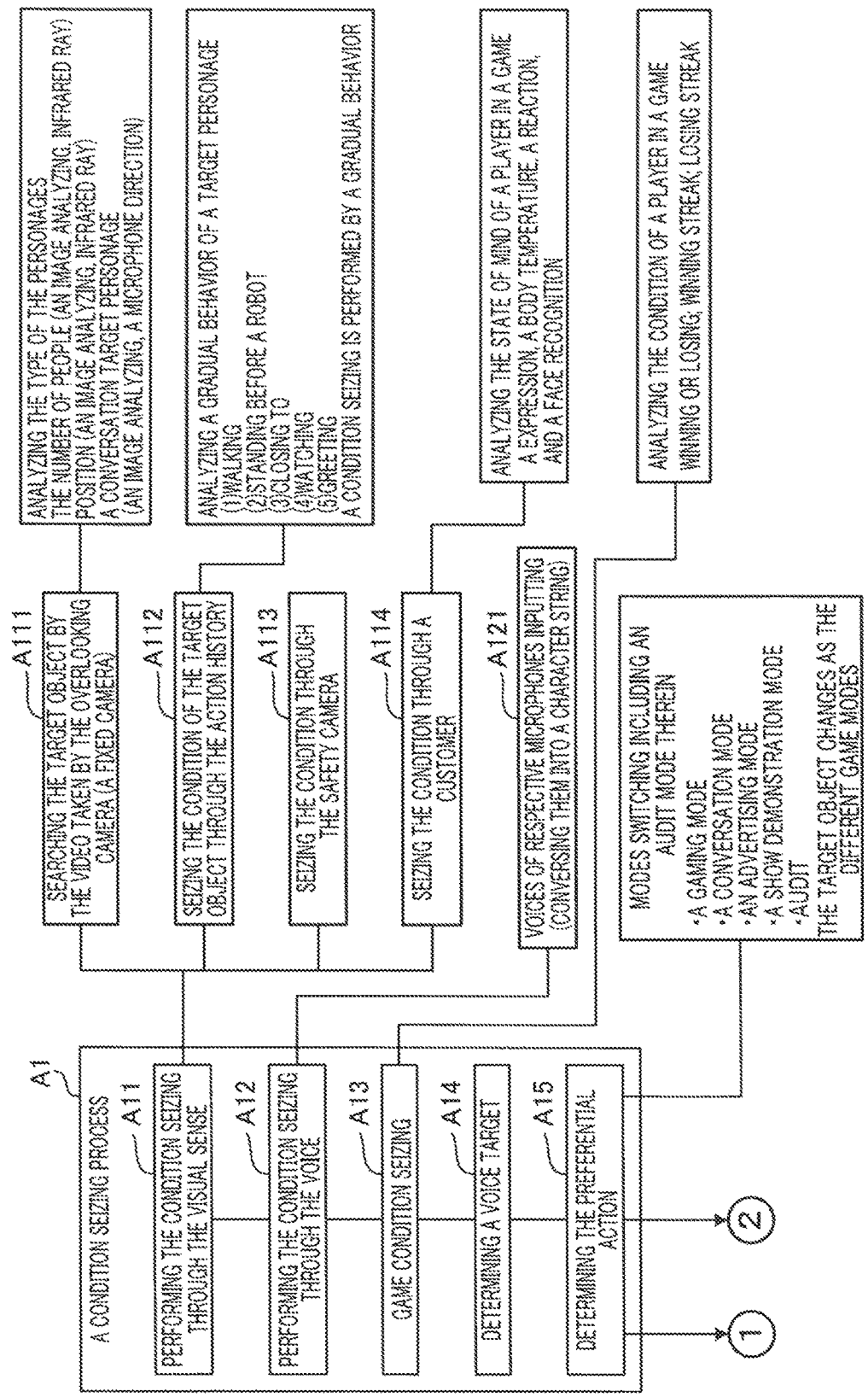

FIG.27

| EMOTION | EXPRESSION ||||||
|---|---|---|---|---|---|---|
| | A BROW AREA | A BROW AREA | A NOSE AREA | A CHEEK AREA | A MOUTH AREA | A LOWER JAW AREA |
| DISGUST | | | SKIN OF NOSE PURSING UP | | UPPER LIP TURNING UP | |
| FEAR | EYES OPENING GREATLY | BROW RISING | | | CORNERS OF MOUTH TRANSVERSE STRETCHING | |
| | EYES OPENING GREATLY | BROW GATHERING THE MIDDLE | | | CORNERS OF MOUTH TRANSVERSE STRETCHING | |
| ANGER | EYES OPENING GREATLY | BROW GATHERING THE MIDDLE | | | LIPS CLOSING TIGHTLY | |
| | EYES OPENING GREATLY | BROW GATHERING THE MIDDLE | | | OPENING A MOUTH | |
| HAPPINESS | | | | CHEEKS RISING | CORNERS OF MOUTH RISING | |
| | | INNER SIDES OF BROW RISING | | | JUST CORNERS OF MOUTH RISING | |
| SADNESS | | BROW GATHERING THE MIDDLE | | | CORNERS OF MOUTH DROOPING DOWNWARD | A WRINKLE OCCURRING |
| | | | | | A LOWER LIP POUTING UPWARD | A WRINKLE OCCURRING |
| CONTEMPT | | | | | ONE SIDE OF THE CORNERS OF MOUTH RISING | |
| ASTONISHMENT | EYES OPENING GREATLY | BROW RISING | | | OPENING A MOUTH | |

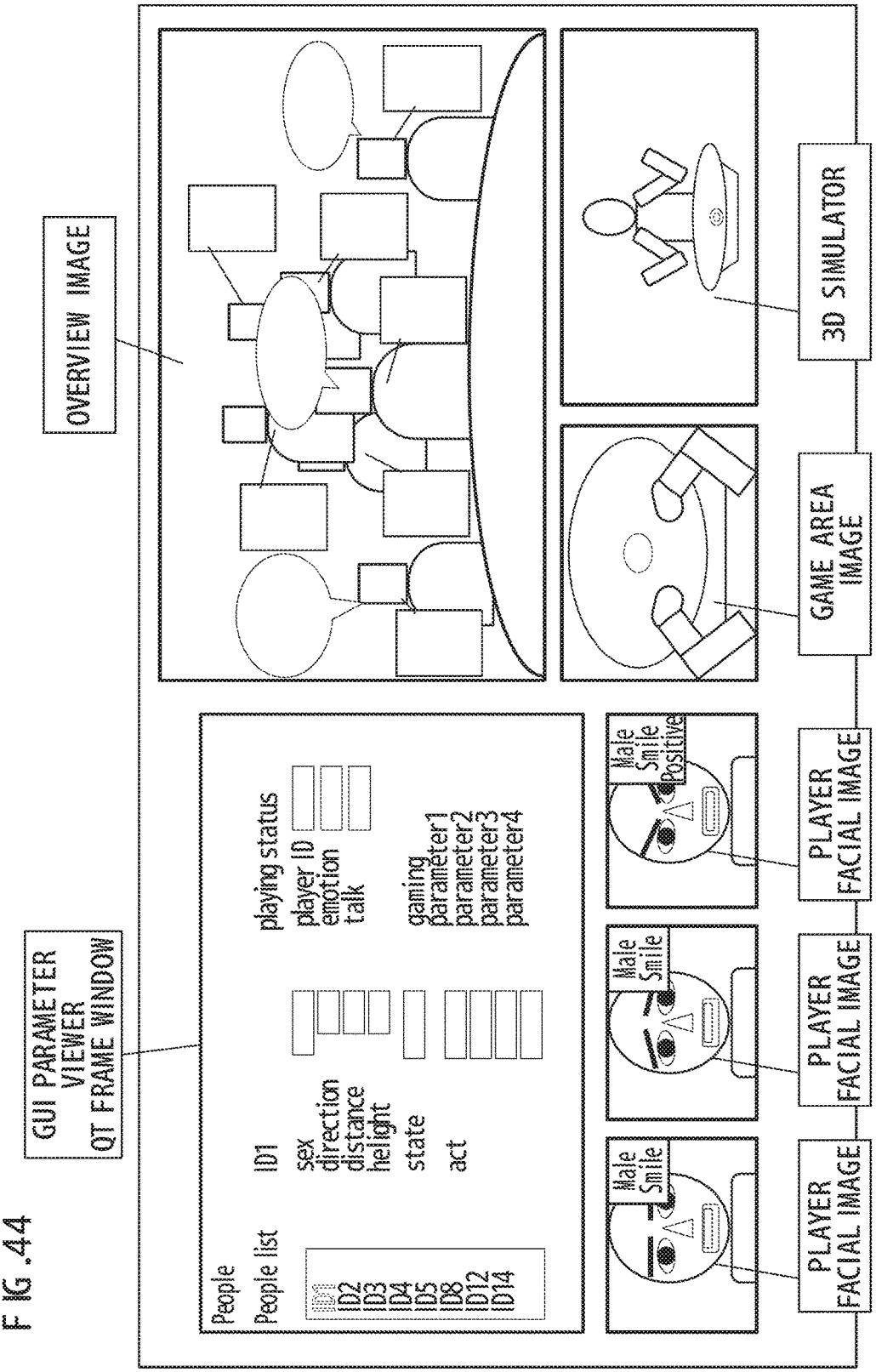
F I G. 44

ATTENDANT DEVICE, GAMING MACHINE, AND DEALER-ALTERNATE DEVICE

The present application claims priority from Provisional Patent Application No. 62/335,766 which are filed on May 13, 2016, the disclosure of which is herein incorporated by reference in its entirety.

FIELD OF THE INVENTION

The present invention relates to a reception device which performs a motion automatically, a gaming machine which conducts a game automatically, and a dealer replacement device.

BACKGROUND OF THE INVENTION

All the time, people continually develops technology to strive for achieving the automation of the gaming machine, and the gaming machine are always operated by a human dealer in the past. For example, in the specification of the Japan Patent for Invention No. 4676236, as one of the gaming machine, a roulette device is disclosed. The roulette device is formed to the following structure, that is, in which a roulette wheel is configured with a plurality of marks, a ball rotating on the roulette wheel is accepted in a ball storage part, and the air which is compressed by a compressor is ejected toward a bank path to the ball storage part such that the ball is allowed to rotate toward the bank path with the help of the air pressure.

According to the roulette device mentioned above, in the roulette device, all operations including the operation which causes the ball to rotate each performs automatically, and thus an atmosphere which is totally different from the game environment in the past may be provided to a player, and that is to say, there is no a dealer in this game environment. However, in the condition of executing automatically, when there is a unexpected obstacle in the operation path executed automatically, it may collide the obstacle.

For this purpose, one goal of the present invention is to provide a reception device which may prevent colliding the unexpected obstacle, a gaming machine and a dealer replacement device.

BRIEF SUMMARY OF THE INVENTION

The present invention provides a reception device, which comprises an operation device performing a variety of operations, an obstacle checking device checking the obstacle in the monitoring area which includes the motion range of the operation device, and a control device simulating the operation path of the operation device in advance before the operation device performs an action and during the process of performing the action, and if there is an obstacle in the simulated operation path, a control is performed to cause the operation device to perform the operation corresponding to the abnormal state.

According to the structure mentioned above, before the operation device performs an action and during the process of performing the action, if the obstacle is presented on the operation path which is simulated in advance, it is able to prevent the operation device colliding with the obstacle by causing the operation device to perform the operation corresponding to the abnormal state.

The present invention provides a gaming machine, which comprises a dealer replacement device which is used to perform a variety of operations including a handling operation for a gaming equipment used in a game, an obstacle checking device which is used to check the obstacle in the monitoring area which includes the motion range of the dealer replacement device, and a control device simulating the operation path of the dealer replacement device in advance before the dealer replacement device performs an action and during the process of performing the action, and if there is an obstacle in the simulated operation path, a control is performed to cause the dealer replacement device to perform the operation corresponding to the abnormal state.

According to the structure mentioned above, before the dealer replacement device performs an action and during the process of performing the action, if the obstacle is presented on the operation path which is simulated in advance, it is able to prevent the dealer replacement device colliding with the obstacle by causing the dealer replacement device to perform the operation corresponding to the abnormal state.

A gaming machine includes: a game dealer device including an arm locating a handling part in a three dimensional position, the handling part handling a game object, and a body supporting the arm and performing an action for a player; a plurality of stations, a player playing a game at one of the stations; a plurality of camera devices, each camera device taking and recording pictures of the player; a plurality of microphone devices, each microphone device taking sounds of the player; and a control device configured to determine whether one of the microphone devices receives an input from the player, analyze facial expressions of each player from the pictures recorded by the camera devices at a time of the input of the one of the microphone devices, determine which station the player speaks, and control the game dealer device to take an action responsive to the input.

A gaming machine includes: a game dealer device including an arm locating a handling part in a three dimensional position, the handling part handling a game object, and a body supporting the arm and performing an action for a player; a plurality of stations, a player playing a game at one of the stations; a camera device taking and recording pictures of the plurality of stations; and a control device configured to analyze a motion of a person from the pictures recorded by the camera device, and control the game dealer device to take an action responsive a result of the analysis.

A gaming machine includes: a game dealer device including an arm locating a handling part in a three dimensional position, the handling part handling a game object, and a body supporting the arm and performing an action for a player; a gaming area for conducting a game; a camera device taking and recording pictures of the gaming area; and a control device configured to determine whether a foreign object enters into the gaming area from the pictures taken by the camera device, and control the game dealer device to take an action responsive the entry of the foreign object when it is determined that the foreign object enters into the gaming area.

A game dealer device includes: an arm locating a handling part in a three dimensional position, the handling part handling a game object; a body supporting the arm and performing an action for a player; a memory storing a three-dimensional movement pattern of the arm and the body; and a control device configured to compare a movement of the arm and the body with the movement pattern; and determine whether the arm and the body conduct malfunction from the comparing.

A game dealer device includes: an arm locating a handling part in a three dimensional position, the handling part handling a game object; and a body supporting the arm and performing an action for a player, wherein the body includes a face including a translucent resin, and the face includes a luminant emitting different color lights for different situations.

A roulette game device includes: a roulette table including a spinning rail and a plurality of stop places, wherein a roulette ball spins along the spinning rail and then gets down to stop one of the stop places; and a ball support disposed at the roulette table near the spinning rail, the ball support holding the roulette ball at a strike position for spinning.

As mentioned above, the present invention is able to prevent a conflict with the unexpected obstacle occurring.

BRIEF DESCRIPTION OF THE DRAWINGS

Other and further objects, features and advantages of the invention will appear more fully from the following description taken in connection with the accompanying drawings in which:

FIG. 4 is a flowchart of an overlooking process routine.

FIG. 5 is an illustrative view representing a relationship between an emotion type and an emotion action.

FIG. 22 is an illustrative view representing a display state of a manage device.

FIG. 23A is an illustrative view representing a condition holding handle of a gaming machine.

FIG. 27 is an illustrative view representing a relationship between an emotion and an expression.

FIG. 44 shows a screen of a monitor of the gaming machine according to an embodiment of the present invention.

DESCRIPTION OF THE PREFERRED EMBODIMENTS

The First Embodiment

The first embodiment of the present invention will be illustrated according to the drawings as follows.

(Gaming Machine 1: Outline)

Figure 1:
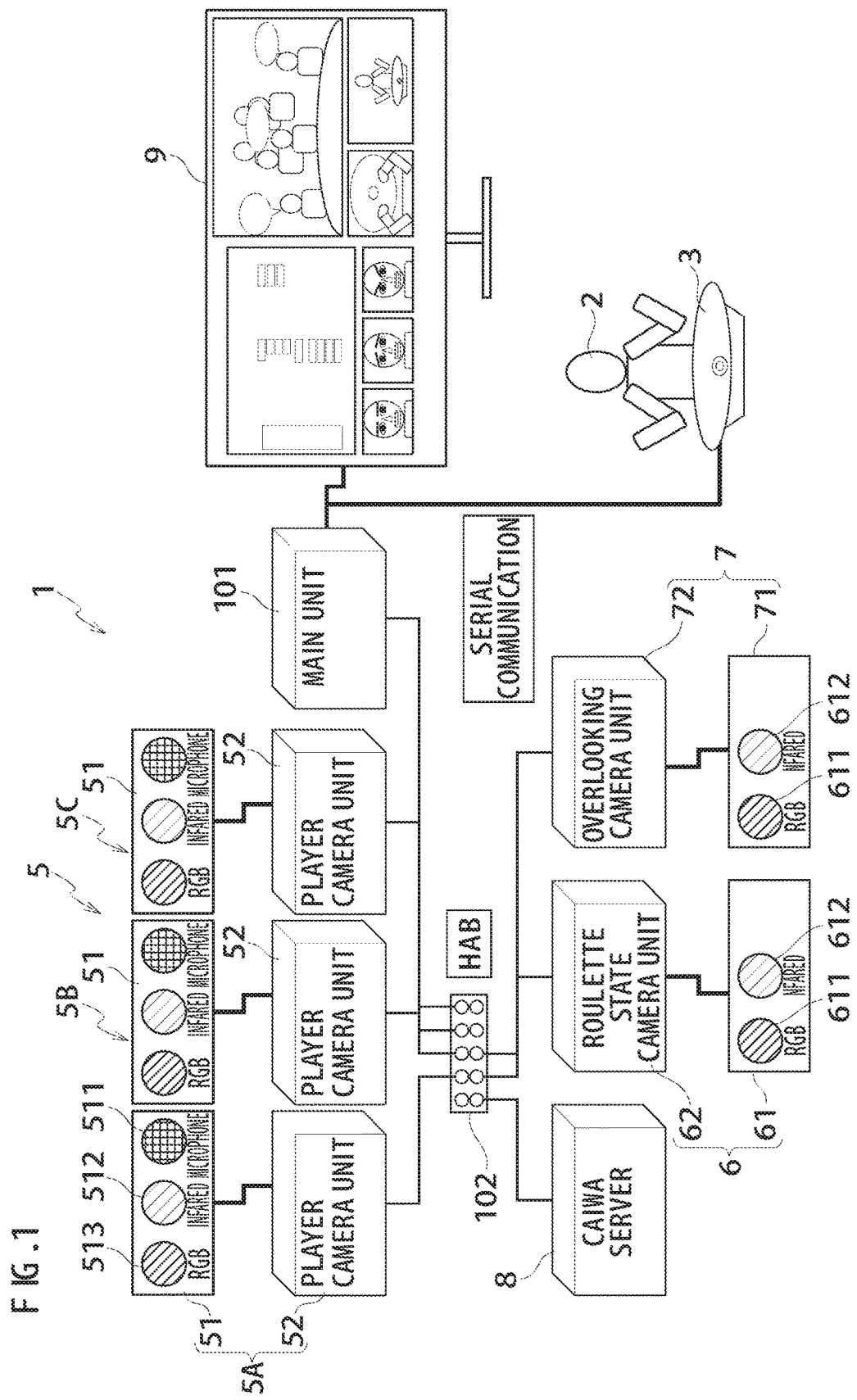
FIG. 1 is an illustrative view representing the outline of a gaming machine.

As shown in FIG. 1, the gaming machine 1 comprises an utterance recognition device 5, a safety camera recognition device 6, an overlooking camera recognition device 7, CAIWA server 8, and a manage device 9. In addition, the gaming machine 1 comprises a robotic dealer 2 (a dealer replacement device), which simulates a human dealer through a robot, a roulette device 3 conducting a roulette game, and three terminal device 4A-4C (FIG. 7), which are configured in the roulette device 3.

In addition, in the present embodiment, the gaming machine 1 may be configured to be that two terminal device are multi-user structure and one terminal device is a single user structure. In addition, the gaming machine 1 may also conduct a game such as a baccarat game, a card game and so on in addition to the roulette game.

(Gaming Machine 1: Utterance Recognition Device 5)

The utterance recognition device 5 has three player analyzing device 5A, 5B and 5C, which are used to acquire and analyze a voice of an utterance of a player (a person) and output a player information such as an analysis result etc. The player analyzing device 5A, 5B and 5C are configured corresponding to the various terminal device 4A-4C of the gaming machine 1 respectively.

The various player analyzing device 5A, 5B, and 5C have a player information acquiring device 51, which is used to acquire a dynamic image including corners of the mouth of a player (a person) therein and a voice of an utterance of a player. In addition, the dynamic image including corners of the mouth of a player (a person) therein may be a video including a whole face of a player and may be also a video of a partial region of a face of a player.

The player information acquiring device 51 comprises two types of camera devices 511 and 512, which are used to take the dynamic images including corners of the mouth of a player therein, and a microphone device 513, which is used to acquire a voice of an utterance of a player. One type of the camera device 511 is a high definition video camera. The other type of the camera device 512 is an infrared camera. In addition, the player information acquiring device 51 may comprise one type of camera device. In addition, the player information acquiring device 51 may apply the "RealSense" (registered trademark) produced by the Intel Corporation. In the condition that the player information acquiring device 51 is composed of the "RealSense", the various processes such as a process of observing as a human eye, a process of checking a depth, and a process of tracking a motion of a player are able to be performed by three cameras (a 1080p HD camera, an infrared camera, and an infrared laser projector) cooperating.

In addition, various player analyzing device 5A, 5B and 5C have a player camera unit 52 as an information processing unit. The player camera unit 52 is connected with the player information acquiring device 51 and gets a dynamic image and a voice signal of a player acquired through the player information acquiring device 51. The player camera unit 52 performs an image analysis according to the dynamic image, and therefore an emotion determination process, a gender determination process, a process determining whether there is a conversation or not, and an application video formation process, and a sending process of an analysis result information and a dynamic image information obtained by the processes mentioned above is performed. Besides, the player camera unit 52 performs a voice recognition process and a string conversion process according to a voice and performs a sending process for the voice information obtained by the processes mentioned above.

In addition, the player analyzing device 5A, 5B and 5C are connected with a main unit 101 as an information processing unit via a hub 102. The main unit 101 is able to perform an utterance recognition process such that it may be served as an utterance recognition control device. The utterance recognition process is a process that a player who utters is determined from a plurality of players according to motions of corners of the mouth of various player captured by the camera devices 511 and 512 when a voice is acquired by the microphone device 513.

In addition, a process determining the player may be performed just after the voice is acquired by the microphone device 513 according to the dynamic images obtained from the camera devices 511 and 512, however, it is performed preferably according to the dynamic image of a shooting time when the voice is acquired by the microphone device 513 so as to eliminate a time difference between an acquiring time of the voice and a capturing time of the dynamic image. Wherein the "shooting time" may be an elapsed time from a certain time such as a reset time, a power-on time and so on, and it may be also the current time.

Specifically, it is preferably, that the main unit 101 is configured to have a dynamic image memory device, which is used to store the dynamic images captured by the camera devices 511 and 512 and the shooting times of the dynamic images, read out a dynamic image including a shooting time when acquiring a voice from the dynamic image memory device, and determine a person who utters with the dynamic image of the shooting time. Therefore, even if there is such a time difference that the shooting time of the dynamic image is earlier than the acquiring time of the voice, the main unit 101 is able to determine the person who utters in a more highly reliable manner with the dynamic image of the shooting time when acquiring the voice. In addition, the dynamic image memory device may be disposed either inside or outside of the main unit 101.

In addition, the main unit 101 is able to perform a control to make a robotic dealer 2 to conduct an operation corresponding to the utterance contents of the player who is determined. Therefore, the main unit 101 is able to make the robotic dealer 2 to perform a correct effect operation for a player who utters in a highly reliable manner.

(Gaming Machine 1: Utterance Recognition Device 5: Operation)

Figure 2:
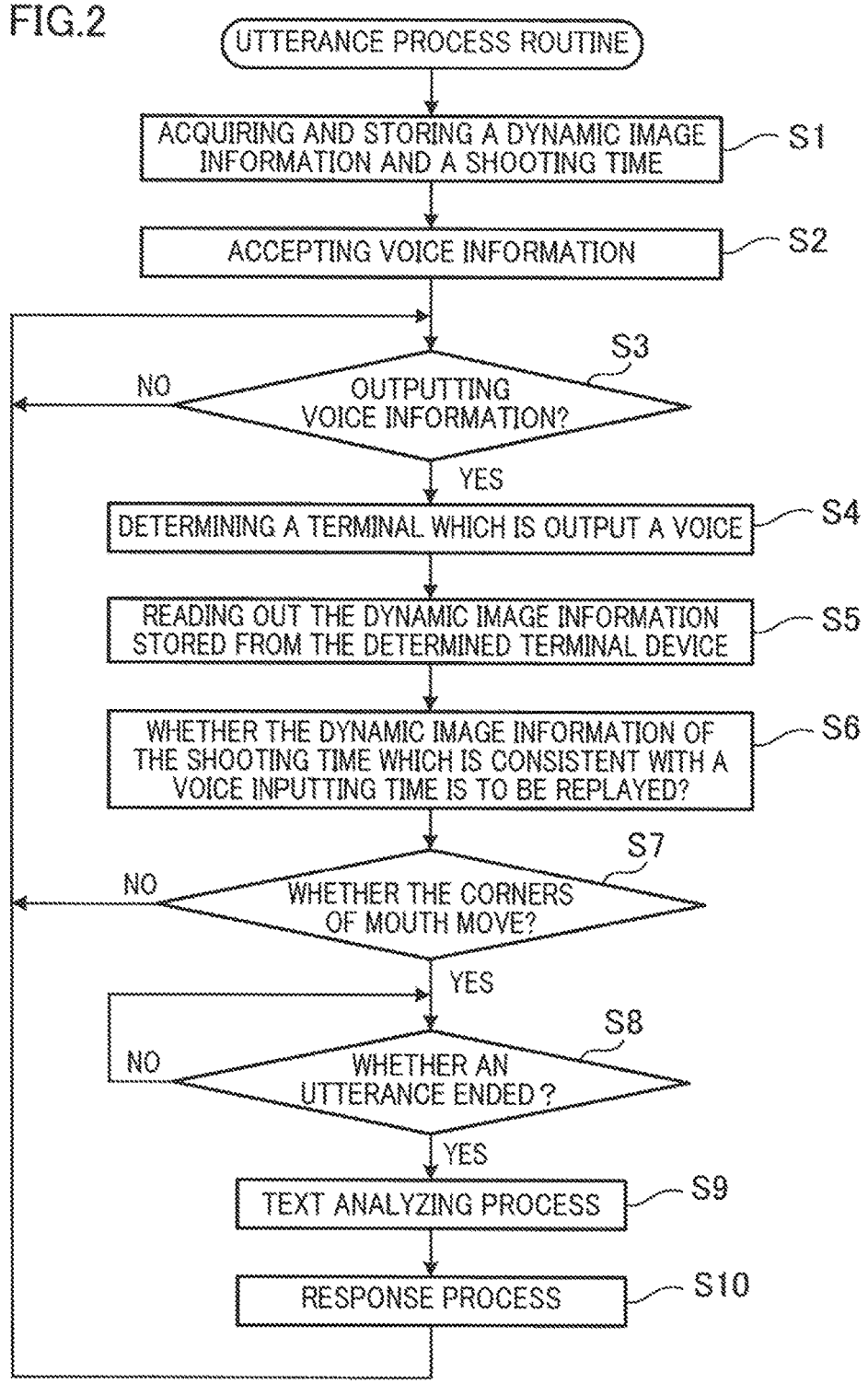
FIG. 2 is a flowchart of an utterance process routine.

The main unit 101 performs an utterance process routine of FIG. 2. The utterance process routine is configured to determine a player who utters from a plurality of players (an utterance recognition process), analyze the conversation contents of the player who is determined, and take an action responsive to an analysis result.

In this regard, various player analyzing devices 5A, 5B and 5C acquire an dynamic image information, an elapsed time, and a shooting time representing a filming moment in various terminal devices 4A-4C, and sends a dynamic image information with the shooting time to the main unit 101. In addition, in the condition that a player conducts a game through the terminal devices 4A-4C, the camera devices 511 and 512 take photos of a portion or entirety of a face including the corners of mouth of a player, and on the other hand, in the condition that a player does not conduct a game, the camera device 511 and 512 take pictures of a background video of the terminal devices 4A-4C. In addition, various player analyzing devices 5A, 5B and 5C acquire the voice of a player who conducts a game through the terminal devices 4A-4C by means of the microphone device 513, and send a voice information to the main unit 101, and the voice information is, for example, a data obtained by forming a text from the voice. Besides, these dynamic image information and voice information are continually sent during running the gaming machine 1.

As shown in FIG. 2, as mentioned above, the dynamic image information and the voice information are input to the main unit 101 through the player analyzing devices 5A, 5B and 5C, and the main unit 101 obtains the dynamic image information and the shooting time and stores the dynamic image information and the shooting time (S1).

Next, the main unit 101 receives the voice information from the player analyzing device 5A, 5B and 5C (S2), and judges whether the voice information is input or not (S3). If various player analyzing devices 5A, 5B and 5C each does not input a voice information to it (S3: NO), perform S3 again, and keep stand by before the voice information is input.

On the other hand, if more than one of the player analyzing device 5A, 5B and 5C inputs the voice information to it (S3: YES), a terminal device is determined according to the player information acquiring device 51 to which the voice information is input (S4), and a dynamic image information in the terminal device which is determined is read out (S5). Then, a dynamic image information including a shooting time which is consistent with the input time of the voice information is replayed (S6), and it is determined that whether the corners of mouth of a player move or not at a time which is consistent with the shooting time (S7). In addition, the "operation of the corners of mouth" may be determined by observing that whether the corners of mouth wriggle continually or not during a certain period from the moment of an utterance. If the corners of mouth do not wriggle (S7: NO), return to S3. On the other hand, if the corners of mouth wriggle (S7: YES), it is determined that a player utters.

Figure 3:
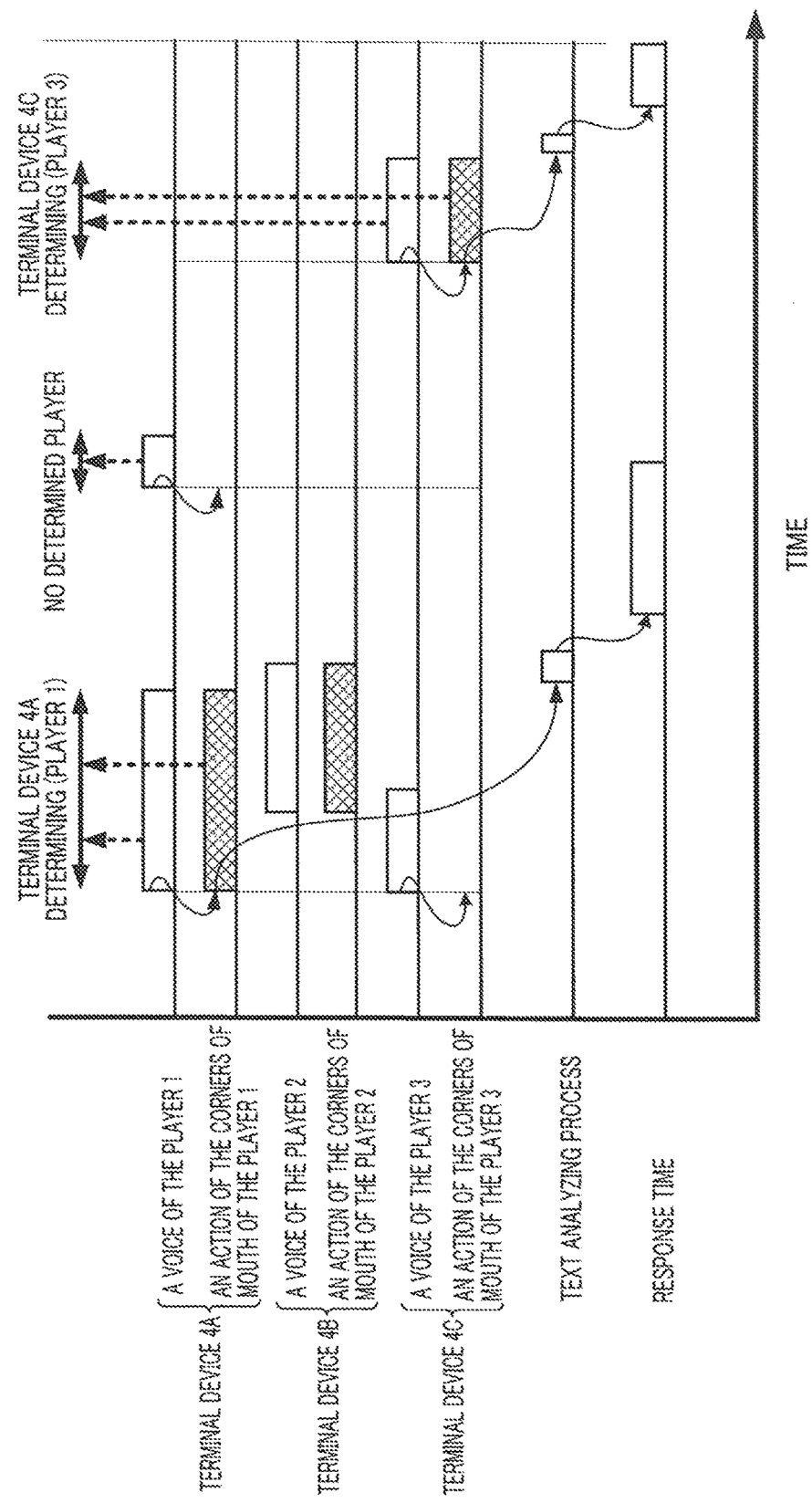
FIG. 3 is a timing chart when the utterance process routine is performed.

For example, as shown in "a first determining period" in FIG. 3, in the condition that the voice information is input by two player analyzing devices 5A and 5C, the dynamic image information in the various player analyzing devices 5A and 5C is read out, and it is determined that whether the corners of mouth wriggle or not at a shooting time which is consistent with the input time of the information. Wherein, a video of the motion of the corners of mouth presents in the dynamic image information of the player analyzing device 5A. On the other hand, as shown in a background video and a video of a closed state of the corners of mouth, a video of the motion of the corners of mouth does not present in the dynamic image information of the player analyzing device 5C. Therefore, it is determined that the player 1 who conducts a game through the terminal device 4A corresponding to the player analyzing device 5A is uttering. In addition, in the first determining period of the player 1 being uttering, even if the other player 2 is uttering, the utterance of the player 2 may be not accepted.

In addition, as shown in "a second determining period", in the condition that the voice information is input by the player analyzing devices 5A, the dynamic image information in the player analyzing devices 5A is read out, and it is determined that whether the corners of mouth wriggle or not at a shooting time which is consistent with the input time of the voice information. Wherein, a video of the motion of the corners of mouth presents in the dynamic image information of the player analyzing device 5A. Therefore, it is determined that the player 1 who conducts a game through the terminal device 4A corresponding to the player analyzing device 5A is not uttering.

In addition, as shown in "a third determining period", in the condition that the voice information is input by the player analyzing devices 5C, the dynamic image information in the player analyzing devices 5C is read out, and it is determined that whether the corners of mouth wriggle or not at a shooting time which is consistent with the input time of the voice information. Wherein, a video of the motion of the corners of mouth presents in the dynamic image information of the player analyzing device 5C. Therefore, it is determined that the player 3 who conducts a game through the terminal device 4C corresponding to the player analyzing device 5C is uttering.

As mentioned above, if the utterance recognition device 5 is carried in the gaming machine 1, even if the gaming machine 1 is configured in a noisy environment, a player who utters may be determined in a highly reliable manner.

As shown in FIG. 2, thereafter, it is determined that whether the player who is determined (terminal device) ends the utterance thereof (S8). The "utterance ends" refers to that if there is no voice input in a certain period such as 0.5 second or 1 second, it is determined that the utterance ended. If the utterance does not end (S8: NO), it is determined whether the utterance ended or not by re-performing S8 over and over again. On the other hand, if the utterance ended (S8: YES), a text analyzing process is performed according to a text data obtained by forming a text from the utterance contents (S9). Thereafter, a response process such as an effect operation corresponding to a text analysis result is performed (S10). Therefore, the utterance recognition device 5 may determine the player who utters in a highly reliable manner, and thus a high reliability of the effect operation may be achieved. As a result, the present embodiment is suitable to the gaming machine 1 without a dealer, and such gaming machine 1 requires a player to conduct an effect operation in a highly reliable manner.

(Gaming Machine 1: Utterance Recognition Device 5: Modification)

In the utterance recognition device 5 of the present embodiment, the player information acquiring device 51 comprises the camera devices 511 and 512 which are set to take photos for various players respectively, and the microphone device 513 which is set to acquire the voice of the utterance of various players respectively. That is to say, the player information acquiring device 51 is configured to be that the players are set to correspond to the camera devices 511 and 512 by one to one, and the player who utters may be determined in a highly reliable manner by setting a one to one correspondence relationship between the players and the microphone devices 513, however, the present invention is not limited thereto.

For example, it may be also set to be that the player information acquiring device 51 takes photos for a plurality of players by more than one camera devices 511 and 512, and the voice of the plurality of players is acquired by more than one microphone devices 513. In this condition, the player who utters may be also determined from the plurality of players by determining that whether the corners of mouth of a player performs an operation or not, according to the dynamic image information of the shooting time when the voice is acquired.

In addition, the utterance recognition device 5 of the present embodiment may be also configured to comprise a camera device which is used to take a dynamic image including the corners of mouth of a player, a microphone device which is used to acquire a voice of an utterance of a player, and a control device which is used to determine whether the player utters or not according to an action of the corners of mouth captured by the camera device after the voice is acquired by the microphone device. Based on the above structure, it is determined whether a person utters or not according to the voice acquired by the microphone device and the motion of corners of mouth captured by the camera device, and thus it is determined whether a person utters or not in a highly reliable manner even if in a situation that the microphone device easily acquires other voice in addition to that of the person.

(Gaming Machine 1: Overlooking Camera Recognition Device 5)

The gaming machine 1 comprises two types of camera devices 711 and 712 which are used to take dynamic images of the peripheral area including the terminal devices 4A-4C, and the main unit 101 (a control device) which is used to analyze an operation of a person in the peripheral area according to the dynamic images of the peripheral area taken by the camera devices 711 and 712, and perform a control to cause the robotic dealer 2 to conduct an operation corresponding to the analysis result. Therefore, in the gaming machine 1, it is also able to cause the robotic dealer 2 to perform various operations corresponding to the analysis result directed to the person in the peripheral area of the gaming machine 1 including the terminal devices 4A-4C, in addition to the player who conducts a game through the terminal devices 4A-4C, and therefore a game environment of the gaming machine 1 is able to get close to a environment when a human dealer performs an operation.

Figure 7:
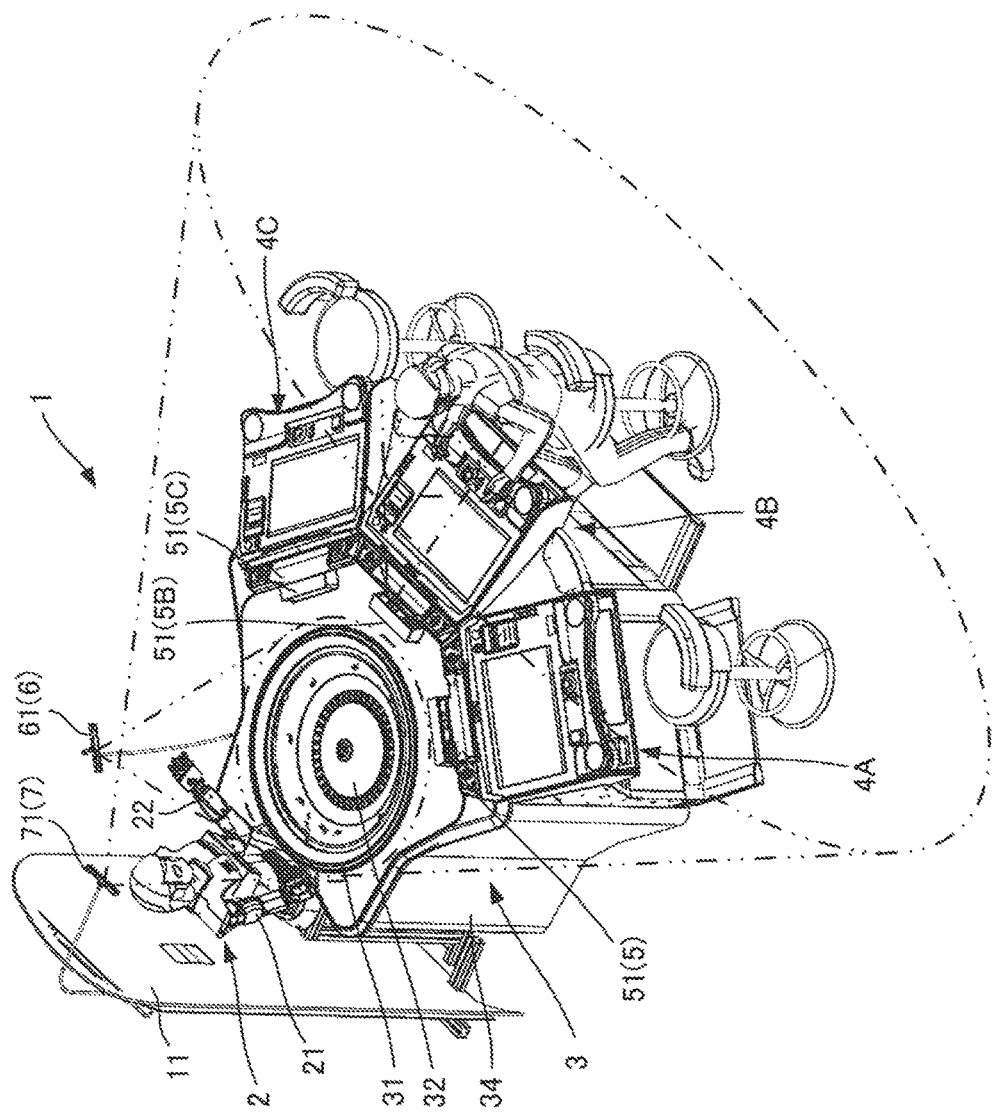
FIG. 7 is a perspective view of a gaming machine.

Wherein, the "peripheral area including the terminal devices 4A-4C" refers to, as shown in FIG. 7, an area including the back of the terminal devices 4A-4C which is observed through the overlooking information acquiring device 71. The "peripheral area" may be an entirety or a portion of the filming range set by the angle of view of the camera devices 711 and 712. The "person in the peripheral area" is a person taken by the camera devices 711 and 712, which includes a player who conducts a game through the terminal devices 4A-4C and the person in addition to the player. As a person in addition to the player, the example thereof may be a customer who is watching a roulette game, a person crossing the peripheral area of the back side of the terminal devices 4A-4C, a person who is next to the gaming machine 1, a person who leaves from the gaming machine 1 and so on.

The "action of a person" includes an action pattern of a part of a human body such as a head, a wrist, a shoulder, a body and so on, and an action pattern of an entirety of a human body. As an action pattern of a part of a human body, the example thereof may be an action that a head and a wrist move from side to side, an action that a wrist move up and down, an action that an upper body leans backward and so on. As an action pattern of an entirety of a human body, the example thereof may be an action of standing, an action of leaving, an action of seating, an action of crossing and so on. The "action analysis" refers to that the analysis result of the action that a head and a wrist move side to side and the action of standing etc. by analyzing the action pattern of a part or an entirety of a human body.

In addition, if the analysis result is an emotion action associated to an emotion, the main unit 101 may acquire an emotion corresponding to the emotion action as the emotion of a person at the current moment, and cause the robotic dealer 2 to perform an action responsive to the emotion.

FIG. 5 is an illustrative view of a data table in which an emotion corresponds to an emotion action each other. Specifically, an emotion action of "disgust" refers to an action of a face and turning a face or a body back toward each other. An emotion action of "fear" refers to an action of a head and a body receding, an action of a body rigidity, an action of escaping, an action of a pitch of a voice rising, an action of suddenly taking a deep breath and so on. An emotion action of "anger" refers to an action of a head and chin bending forward, an action of muscle tension of a whole body, an action of an intimidating voice, a rough voice, a loud voice and so on.

An emotion action of "happiness" refers to an action of sounds exciting and an action of close to another person. An emotion action of "sadness" refers to an action of a head and a line of sight drooping, an action of nutation, an action of a sound lowering, an action of being a little bit quiet and so on. An emotion action of "contempt" refers to an action of hypsokinesis of a head as like to look the tip of nose of oneself and an action of the head unidirectionally inclining toward the left or right under the state mentioned above. An emotion action of "astonishment" refers to an action of a shoulder lifting, an action of taking a deep breath and so on.

Besides, the main unit 101 may be configured to acquire a micro expression of a player and other persons according to a video dynamic image captured by the camera devices 711 and 712 of the overlooking information acquiring device 71 and a video dynamic image captured by the camera devices 511 and 512 of the player information acquiring device 51, distinguish the emotion thereof with the micro expression, and cause the robotic dealer 2 to take an action responsive to the emotion.

Wherein the "micro expression" refers to an expression which changes instantaneously in a certain time, for example 0.25 seconds, in a partial area of face of a person according to the different types of emotion. The main unit 101 is configured to analyze the micro expression thereof according to the video dynamic image (a dynamic image obtained by taking photos for a person) and distinguish the type of the emotion, and a face of a person is divided into a plurality of areas, an instantaneous change in various areas is checked, and the type of the emotion corresponding to the condition that is consistent with a combination of the change states is determined.

The main unit 101 stores a response data corresponding to the above various action patterns. The response data is a change of response factors such as a voice, an effect light, an operation in the robotic dealer 2 and a combination of the response factors. The "change of response factors" refers to various changes in the "voice", for example, a high pitch, a low pitch, a male voice, a female voice, a loud voice, a low voice and so on. The "effect light" refers to a change of an illuminant color, flicker and so on. The "operation" refers to mechanical changes that a part such as a left arm 22, a right arm 21, a head 24 shakes front and back or right and left, or moving quickly or slowly.

The response data is illustrated specifically in the below. For example, a response data corresponding to an analysis result of a person being close to the gaming machine 1 is a data to perform the following series of operations, that is to say, the robotic dealer 2 moves the head 24 and the body 23 thereof facing to the person close to the gaming machine 1, utters loudly to arouse the person to take part in a game, and waves with the right arm 21 thereof, and so on. A response data corresponding to an analysis result of a player leaving from the terminal devices 4A-4C is a data to perform the following series of operations, that is to say, the robotic dealer 2 moves its body 23 facing to the player who is to leave, lower its head and utters to express its thanks. A response data corresponding to an analysis result of a player making an emotion action of "enjoyment" is a data to perform the following series of operations, that is to say, the robotic dealer 2 utters to bless facing to the player.

The camera devices 711 and 712 taking dynamic images for the peripheral area are configured to be able to take pictures for the entirety of the roulette device 3 and the background of the terminal devices 4A-4C. One type of the camera device 711 is a high definition video camera. The other type of the camera device 712 is an infrared camera. In addition, the camera devices 711 and 712 may be also any type of camera device. The camera devices 711 and 712 are configured in the overlooking information acquiring device 71. The overlooking information acquiring device 71 may also apply the "RealSense" (registered trademark) produced by the Intel Corporation as well as the player information acquiring device 51. In the condition that the overlooking information acquiring device 71 is composed of the "RealSense", the various processes such as a process of observing as a human eye, a process of checking a depth, and a process of tracking an action of a player are able to be performed by three cameras (a 1080p HD camera, an infrared camera, and an infrared laser projector) cooperating.

The overlooking information acquiring device 71 is connected with an overlooking camera unit 72. An overlooking camera recognition device 7 is composed of the overlooking information acquiring device 71 and the overlooking camera unit 72. The overlooking camera unit 72 is configured to perform a read-in process of a camera video, an image analyzing process, an analyzing process of the number of persons, a location of a person, and an action, a get-in process of a video of an application and a video distributing process according to the video dynamic images from the camera devices 711 and 712. In addition, these processes may be performed by one of the overlooking camera unit 72 and the main unit 101.

Wherein, the "get-in process of a video of an application" refers to forming an application video according to the dynamic images of the peripheral area by associating a personage as an analysis object with an analysis result obtained by analyzing an action of the personage, and distributing the video, and wherein in the application video, a text of the analysis result is displayed near the personage. The gaming machine 1 is easily able to monitor the personage presented in the peripheral area by displaying the application video which is distributed into a manage device (a monitor screen).

(Gaming Machine 1: Overlooking Camera Recognition Device 5: Operation)

Next, the following operations are illustrated, that are, the main unit 101 performs an overlooking process routine as shown in FIG. 4, analyzes the action of the personage presented in the peripheral area of the gaming machine 1 thereby according to the video dynamic images from the overlooking camera recognition device 7, and causes the robotic dealer 2 to perform an operation corresponding to the analysis result.

As shown in FIG. 4, when the main unit 101 performs the overlooking process routine, a dynamic image information including the video dynamic image from the overlooking camera recognition device 7 therein is acquired (S21). The whole personages presented in the predetermined peripheral area are extracted according to the dynamic image information (S22).

Thereafter, the character of the personages who are extracted is analyzed (S23). As the "character of the personages", the example thereof may be the gender, the age, the player, the personages in addition to the player, and so on. In addition, it is able to determine whether the personage who is extracted is the player or not according to whether the location of the personage in the image is consistent with the location of the personage who operates the terminal devices 4A-4C. In addition, in the condition that the personage who is extracted is the player, a double determination may be performed by the player analyzing devices 5A, 5B and 5C of the utterance recognition device 5 according to whether the face of the personage is captured or not. In the condition that the double determination is performed for the player through the overlooking camera recognition device 7 and the player analyzing devices 5A, 5B and 5C, it is able to distinguish the player and other personages in addition to the player in a highly accurate manner. In addition, the character of the player may be analyzed by the player analyzing devices 5A, 5B and 5C in a highly accurate manner. Then, the personage who is extracted as mentioned above and the analysis result thereof are displayed in a manage device 9 (S24).

Figure 10:
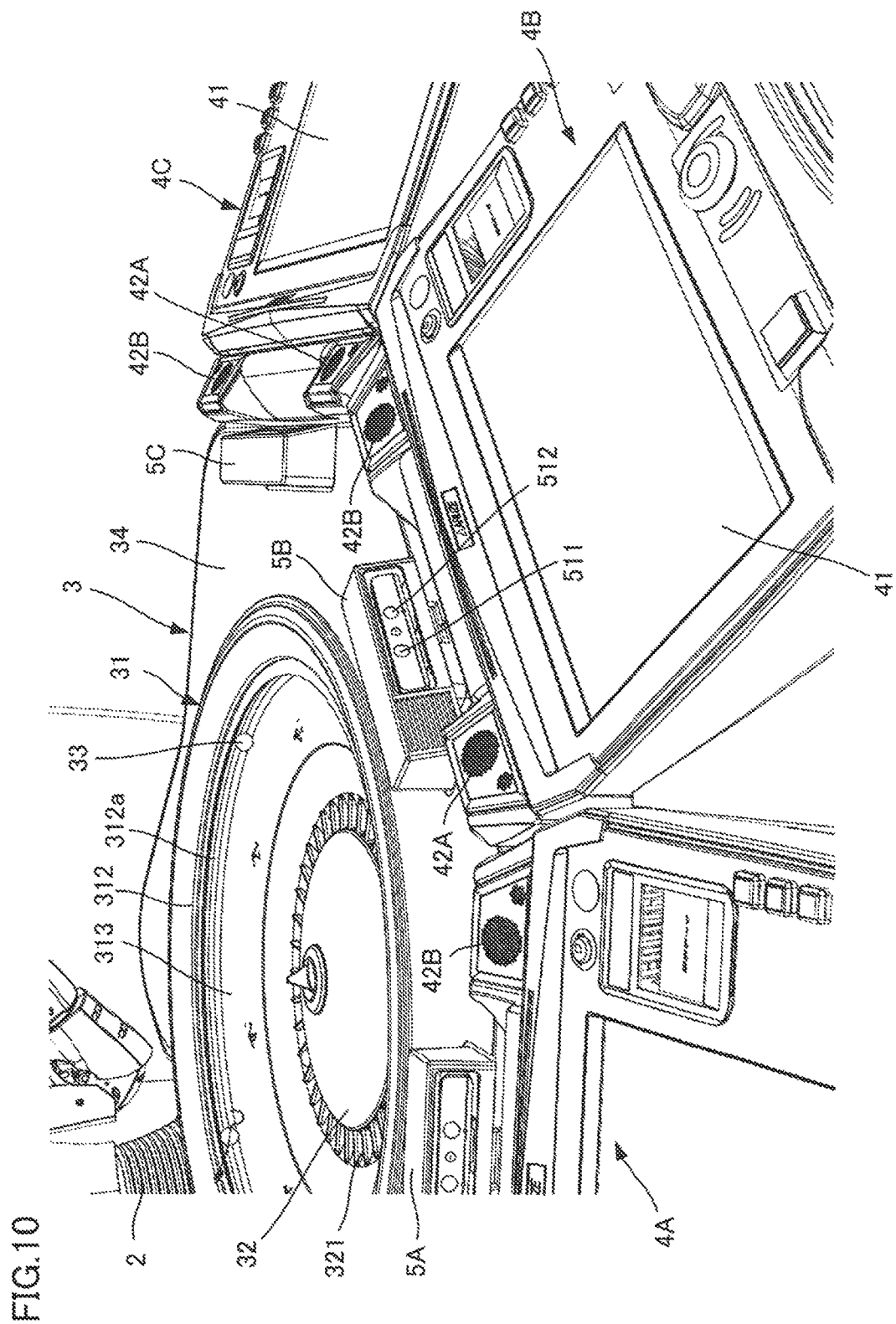
FIG. 10 is a main enlarged view of a gaming machine.

Next, aiming at the dynamic image information of the overlooking camera recognition device 7, a variation of a certain time difference is calculated (S26). Thereafter, it is determined whether a unit game ends or not (S26). Wherein, as shown in FIG. 10, the "unit game" is one game which is from a roulette ball 33 in a roulette wheel 31 beginning to move to the roulette ball 33 being taken into a pocket 321 and obtaining a game result.

If the unit game does not end (S26: NO), the robotic dealer 2 performs an operation responsive to the action of the whole personages or a portion of personages during the game. In addition, it is preferably that, the main unit 101 gives a preferred order for the personage who is extracted in advance and causes the robotic dealer 2 to perform an operation responsive to a portion personages with a higher preferred order according to the game conducting condition and the number of the personages. Therefore, the game in which the robotic dealer 2 takes part conducts smoothly.

The whole personages with variations thereof more than a predetermined value are extracted according to the video dynamic image from the camera devices 711 and 712 (S27). The action of the personages who are extracted is analyzed (S28). Aiming at various personages who are extracted, a response operation corresponding to the action thereof is performed (S29). Therefore, for example, when the personage traverses from the gaming machine, in order to attract the attention of the personages as the pedestrian to the gaming machine 1, the robotic dealer 2 performs the following actions, for example, waving the right arm 21, uttering to introduce a roulette game, and so on.

In addition, in the condition that the unit game ended (S26: YES), aiming at the emotion of the whole players or a portion of the players who just ended a game, the robotic dealer 2 performs a response operation. In addition, it is preferably that, the main unit 101 gives a preferred order to the emotion of the player, and causes the robotic dealer 2 to perform the response operation one by one from the player showing an emotion with a higher preferred order as the preferred order.

The whole players with variations thereof more than a predetermined value are extracted according to the video dynamic image from the camera devices 711 and 712 of the overlooking information acquiring device 71 and the camera devices 511 and 512 of the player information acquiring devices 51 (S30). An emotion of a player is analyzed according to a data table, and wherein, in the data table, the variation is regarded as the emotion action, and the emotion corresponds to the emotion action each other in FIG. 5 (S31). In addition, the emotion thereof may be also analyzed with a micro expression. Aiming at various players who are extracted, a response operation corresponding to the emotion thereof is performed (S32). Therefore, for example, when a player shows an emotion of "enjoyment", the robotic dealer 2 performs the following actions facing to the player, for example, moving the body 23, uttering to bless, and so on.

(Gaming Machine 1: Safety Camera Recognition Device 5)

As shown in FIG. 1, the gaming machine 1 comprises the robotic dealer 2 (a dealer replacement device) which is used to perform various operations including a handling operation of a gaming equipment used in a game, a safety information acquiring device 61 including two types of camera devices 611 and 612 which take the dynamic images for a game area for conducting a game, and the main unit 101 (the control device) determining whether there is an anomaly in the game area according to the dynamic images taken by the camera device 611 and 612 and performing a control to cause the robotic dealer 2 to conduct an operation corresponding to the anomaly mentioned above. Therefore, the gaming machine 1 is able to cause the game environment approaching the environment operated by a human dealer by causing the robotic dealer 2 to perform the operation corresponding to the anomaly.

Wherein, the "gaming equipment" is a tool used by a game directly or indirectly. The gaming equipment used by the game directly is a component which determines a game result, which is the roulette ball 33 in the roulette game and a card in a card game, and a dice in a dice game. As a gaming equipment used indirectly, it is a tool facilitating to conduct a game, for example, a card shoe for accepting a card, a tool for recycling a dice, and so on.

Figure 20:
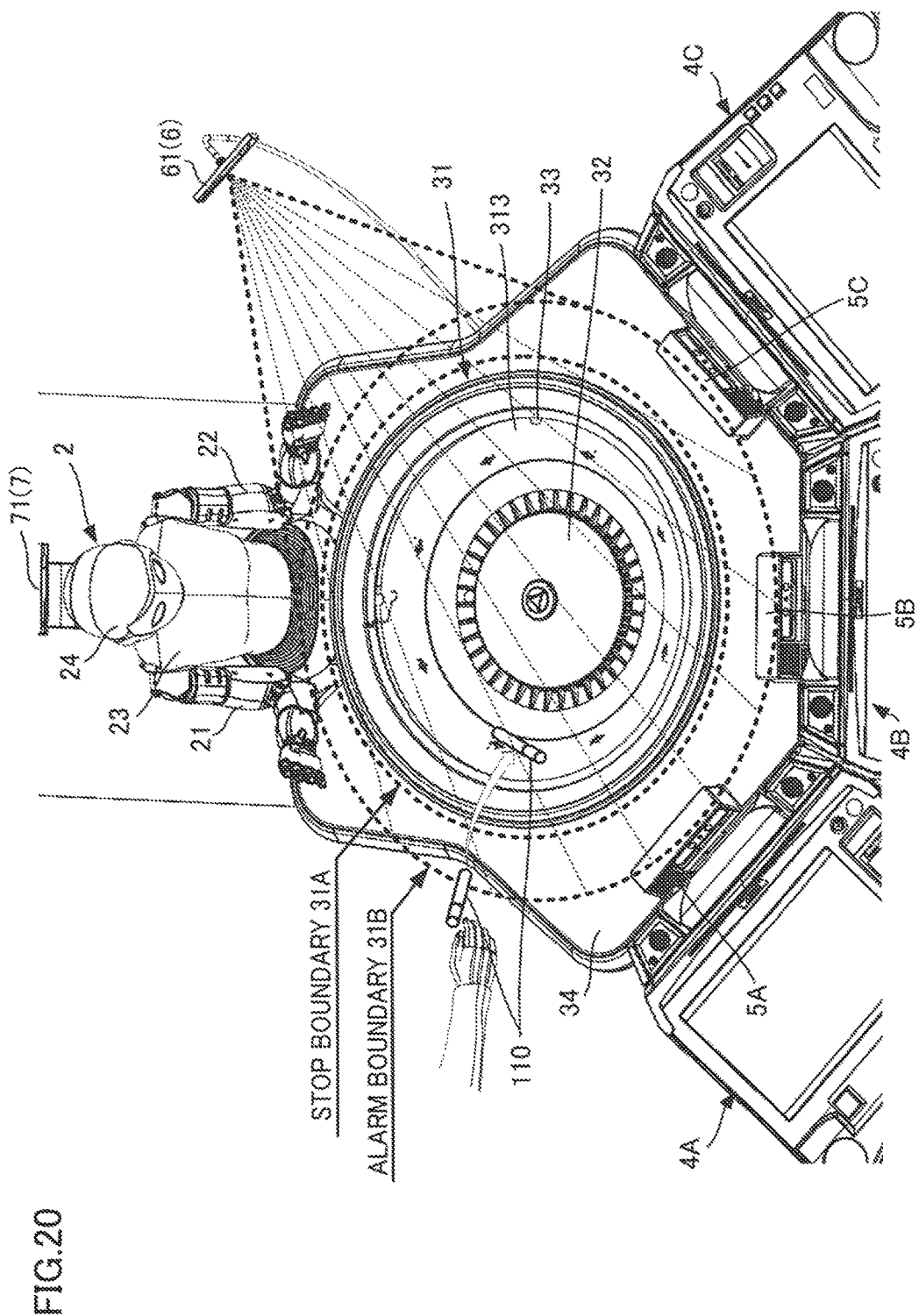
FIG. 20 is an illustrative view representing the states of an alarm boundary line and a stop boundary line.

The "game area" as shown in FIG. 20 has a stop boundary area 31A which may conducts a game directly. The stop boundary area 31A is approximately consistent with the area of the internal circumference of the roulette wheel 31. When there is an anomaly in the stop boundary area 31A, the robotic dealer 2 performs an operation corresponding to the anomaly in the stop boundary area and stops the game. Wherein, the "anomaly in the stop boundary area 31A" represents a state that a foreign object 110 in addition to the gaming equipment intrudes into the stop boundary area 31A, for example, an action that a player or a customer puts the foreign object 110 such as a cigarette and a metal into the roulette wheel 31, an action that a player or a customer touches a rotating wheel 32 with an instrument such as a finger or a stick, and so on. A change of the game result coming into an anomaly may be prevented through answering the anomaly occurred in the stop boundary area 31A, and the robotic dealer 2 is able to inform the player or the customer of an information suspending the game because of the occurrence of the anomaly.

In addition, the "game area" has an alarm boundary area 31B, and the internal circumference of the alarm boundary area 31B comprises the stop boundary area 31A, such that the peripheral area of the roulette wheel 31 is surrounded. That is to say, the "game area" has the stop boundary area 31A which is used to stop a game and the alarm boundary area 31B which is used to warn, and the alarm boundary area is configured to stop at the peripheral side of the stop boundary area 31A. In addition, it is preferably that, the alarm boundary area 31B includes the player analyzing devices 5A, 5B and 5C. Therefore, it may also warn, for example, in an abnormal condition such as the foreign object 110 crashing the player analyzing devices 5A, 5B and 5C.

When there is an anomaly in the alarm boundary area 31B, the robotic dealer 2 performs an operation corresponding to the anomaly in the alarm boundary area. The anomaly in the alarm boundary area 31B is different from that of the stop boundary area 31A, and the game continue. Wherein, the "anomaly in the alarm boundary area 31B" represents a state that a foreign object 110 in addition to the gaming equipment intrudes into the alarm boundary area 31B, for example, an action that a player or a customer puts the foreign object 110 such as a cigarette and a metal close to the roulette wheel 31, an action that a player or a customer puts an instrument such as a finger or a stick close to the roulette wheel 31, and so on. The robotic dealer 2 is able to prevent the occurrence of a situation that the game suspends because of the occurrence of the anomaly, by answering to the anomaly occurred in the alarm boundary area 31B.

In addition, the robotic dealer 2 may also change the response operation according to the time of duration of the anomaly in the alarm boundary area 31B. That is to say, as the time of duration of the anomaly get long, the response operation of the robotic dealer 2 may be notably highlighted to the player and the customer by enlarging the gesture of the robotic dealer 2 or the voice of the alarm.

The "operation corresponding to the anomaly" refers to an operation informing the player and the customer of the information that the game will suspend because of the occurrence of the anomaly, for example, the robotic dealer 2 pointing to the foreign object 110 with a hand, and then the two arms 21 and 22 swinging horizontally on the roulette wheel 31, in the condition that the anomaly occurs in the stop boundary area 31A.

In the condition that the anomaly occurs in the alarm boundary area 31B, the operation which is performed is an operation to prevent the game suspending because of the anomaly, for example, an operation of the robotic dealer 2 stopping the foreign object intruding. That is to say, if the contents of the anomaly represent the alarm boundary area 31B being intruded by the foreign object 110, a control is performed to cause the robotic dealer 2 to perform an operation to prevent the foreign object intruding. Therefore, the gaming machine 110 is able to prevent the game suspending because of the invasion of the foreign object 110 with the aid of the robotic dealer 2.

In this regard, the robotic dealer 2 comprises the arms 21 and 22 which are used to move a handling part in a 3D space and locate them at and position in the 3D space, and the handling part is used to handle the gaming equipment, and the body 23 which is used to support the arms 21 and 22. The main unit 101 performs a control to cause the robotic dealer 2 to perform an operation to prevent the foreign object 110 intruding with at least one of the arms 21 and 22. Therefore, the operation of the robotic dealer 2 gets close to the operation of a human dealer.

The safety information acquiring device 61 comprising the camera devices 611 and 612 is configured to at least take pictures for the roulette wheel 31. In addition, the safety information acquiring device 61 is further configured to take pictures for the roulette device 3 overall. As shown in FIG. 1, one type of the camera device 611 in the safety information acquiring device 61 is a high definition video camera. The other type of the camera device 612 is an infrared camera. In addition, the camera devices 611 and 612 may be also any type of camera device. The safety information acquiring device 61 may also apply the "RealSense" (registered trademark) produced by the Intel Corporation as well as the player information acquiring device 51. In the condition that the safety information acquiring device 61 is composed of the "RealSense", the various processes such as a process of observing as a human eye, a process of checking a depth, and a process of tracking an action of a player are able to be performed by three cameras (a 1080p HD camera, an infrared camera, and an infrared laser projector) cooperating.

The safety information acquiring device 61 is connected with a roulette state camera unit 72. A safety camera recognition device 7 is composed of the safety information acquiring device 61 and the roulette state camera unit 72. The roulette state camera unit 72 is configured to perform a read-in process of a camera video and an image analyzing process according to the video dynamic images from the camera devices 611 and 612. In addition, these processes may be performed by one of the roulette state camera unit 72 and the main unit 101.

(Gaming Machine 1: Safety Camera Recognition Device 5: Operation)

Figure 6:
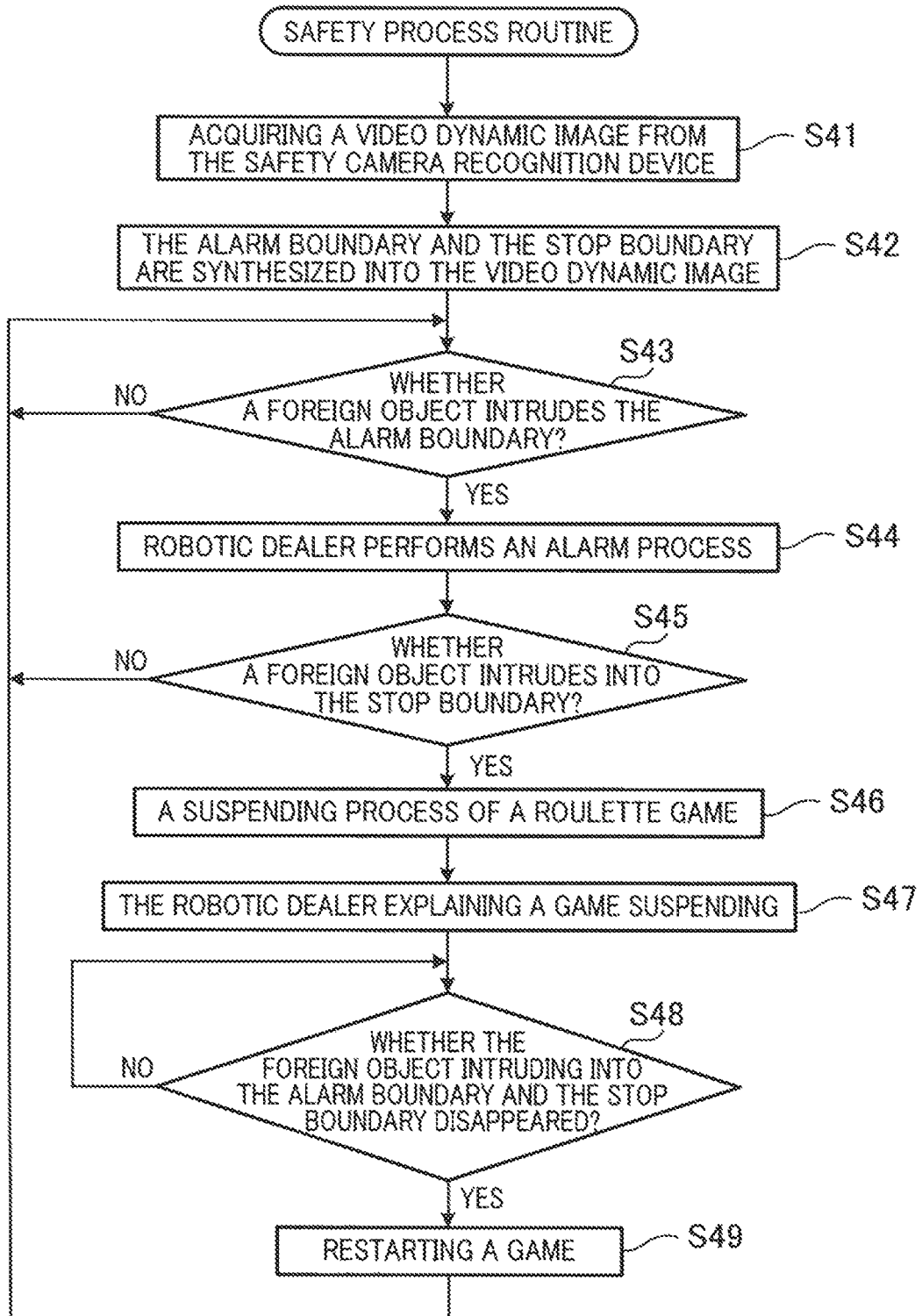
FIG. 6 is a flowchart of a safety process routine.

Next, the following operations are illustrated, that are, the main unit 101 performs an safety process routine as shown in FIG. 6, determines whether the anomaly occurs within the roulette wheel 31 and in the peripheral area of the roulette wheel 31 thereby according to the video dynamic images from the safety camera recognition device 6, and causes the robotic dealer 2 to perform an operation corresponding to the anomaly determining result.

As shown in FIG. 6 and FIG. 20, when the main unit 101 performs the safety process routine, the dynamic image information from the safety information acquiring device 61 is acquired, and the dynamic image information includes a video dynamic image therein (S41). Then, in a video memory which is not shown, the stop boundary area 31A and the alarm boundary area 31B are merged into the video dynamic image (S42). In addition, the video dynamic image is updated real time.

Next, it is determined whether the foreign object 110 intrudes into the alarm boundary area 31B according to the merged video of the video memory. If there is no foreign object 110 intruding (S43: NO), S43 is re-performed, and the invasion of the foreign object 110 is monitored.

If there is foreign object 110 intruding (S43: YES), an alarm process of the robotic dealer 2 is performed (S44). For example, in FIG. 20, in the condition that the foreign object 110 composed of a cigarette or a wrist intrudes into the alarm boundary area 31B, the robotic dealer 2 performs an operation extending the right arm 21 toward the direction of the foreign object 110 to prevent the foreign object 110 intruding.

At this moment, it is preferably that, the manner of the alarm process changes as the retention time of the foreign object 110 in the alarm boundary area 31B and the distance of invasion. For example, it changes as the following manner, that is, the movement range of the robotic dealer 2 to prevent the invasion is enlarged, or combines a plurality of movement factors (forward and backward directions, left and right directions, etc.), or causes the movement to speed up, and so on, according to the retention time and the distance of invasion.

In addition, as changes of the manner corresponding to the retention time and the distance of invasion, the example thereof may be adding the movements of the body 23 and the head 24 into the movements of the arms 21 and 22. Furthermore, as changes corresponding to the retention time and the distance of invasion, the example thereof may be also adding an alarming voice, or the voice gathering volume, or the interval and the speed of the voice accelerating, and so on. In addition, it may be also that the arms 21 and 22 of the robotic dealer 2 comprise an illuminant device, and an alarm is sent through the illuminant device giving out light while the alarm action is performed by the arms 21 and 22.

Next, it is determined whether the foreign object 110 intrudes into the stop boundary area 31A (S45). If there is no foreign object 110 intruding (S45: NO), S43 is re-performed, and it is monitored whether the situation that the foreign object 110 intrude into the stop boundary area 31A is eliminated or not.

On the other hand, if there is foreign object 110 intruding into the stop boundary area 31A (S45: YES), a suspending process is performed for the roulette game (S46) in which the roulette game is suspended, and the robotic dealer 2 makes an action for informing of suspending the game. Then, the robotic dealer 2 explains that the game is suspended as the influence of the foreign object 110 through a voice (S47).

Thereafter, it is determined whether the foreign object 110 in the alarm boundary area 31B and the stop boundary area 31A is faded away by the measure such as remove (S48). If the foreign object 110 does not disappear (S48: NO), S48 is re-performed, and the suspending state of the game continues until the foreign object 110 is removed. If the foreign object 110 disappeared (S48: YES), the game restarts (S49), is re-conducted from S43, and monitors the alarm boundary area 31.

(Gaming Machine 1: A Mechanical Structure)

As shown in FIG. 7, the gaming machine 1 comprises the robotic dealer 2, the roulette device 3 which is configured before the robotic dealer 2, and three terminal devices 4A-4C which are configured around the roulette device 3.

(Gaming Machine 1: The Mechanical Structure: The Robotic Dealer 2)

The robotic dealer 2 is configured to be able to replace a dealer to perform a portion or an entirety of actions of the roulette game as like the actions handling the roulette ball 33 (see the FIG. 10) used in the roulette game. That is to say, the robotic dealer 2 is configured to perform various actions including a handling operation performed for the gaming equipment such as the roulette ball 33 used in the game.

Figure 8:
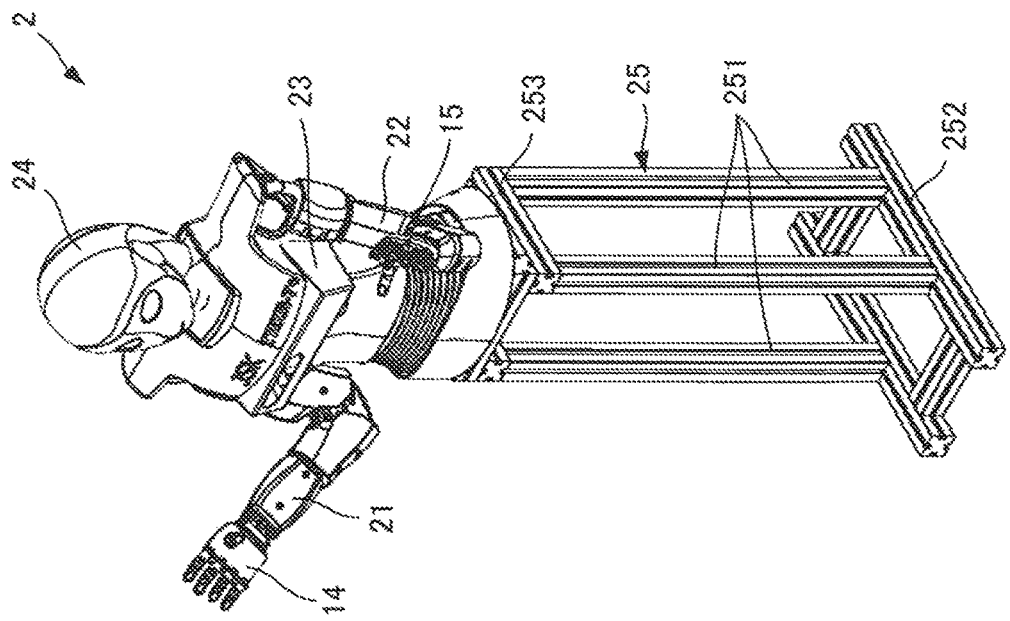
FIG. 8 is a perspective view of a robotic dealer.

In this regard, as shown in FIG. 8, the robotic dealer 2 comprises the right arm 21 (a first arm) and the left arm 22 (a second arm), the body 23 supporting the two arms 21 and 22 as a bilateral symmetry, and the head 24 which is disposed at the upper end of the body 23 and is swingable on all sides. Each of the arms 21 and 22 has a multiple degree of freedom corresponding to the elbow and the wrist of a human, and the roots of arms are connected to the body 23 and have a degree of freedom no all sides such that they are able to make actions like the shoulder of a human body. Therefore, the arms 21 and 22 are able to move the hands 14 and 15 in a 3D space, and locate them at any position in the 3D space.

The body 23 has a multiple degree of freedom to rotate the lower end and swing the lower end in forward and backward directions. Since the body 23 has the multiple degree of freedom mentioned above, the effect operation may be performed for the personages such as a player of the terminal devices 4A-4C, and a passer and a visitor in addition to the player, through changing the gestures of the robotic dealer 2. Therefore, the robotic dealer 2 handles the roulette ball 33 with the arms 21 and 22 which may move the hands 14 and 15 to any position in a 3D space, and performs the effect operation for the player with the body 23 which supports the arms 21 and 22 and the arms 21 and 22 such that the actions approaching the actions of the arms and the body of the dealer handling the roulette ball 33 may be achieved. As a result, the robotic dealer 2 is able to provide a game environment approximating an atmosphere in which the roulette ball 33 is handled by the human dealer for the player and the personages around the gaming machine 1.

In addition, in the present embodiment, in order to achieve a bodily form closest approaching the human dealer, the robotic dealer 2 comprising two arms, that is the right arm 21 and the left arm 22, is illustrated, however the present invention is not limited thereto, as long as comprising more than one arm.

A conversation device with the player is disposed in the head of the robotic dealer 2. The conversation device comprises an information output device for outputting a response information to the player. In addition, the conversation device may also comprise an information acquiring device which is used for the player to acquire various external information such as a voice, a gesture, an action, and an expression. As the information output device, the example thereof may be a speaker device which is used to output a voice. The speaker device comprises a digital amplifier which is used to amplify an audio signal, and a speaker which converts an electric signal from the digital amplifier into a sound wave and then output the sound wave. As the information acquiring device, the example thereof may be a camera device which is used to acquire a video and a microphone device which is used to acquire a voice. The camera device comprises more than one of a voice angle sensor, a 3D sensor, a Full HD Camera.

The body 23 of the robotic dealer 2 is disposed at the top surface of a supporting stage 25. The supporting stage 25 has a square bottom 252 which is disposed on the floor surface, four feet 251 which stand from the feet of the bottom 252, and a supporting part 253 which is disposed at the upper end of the feet 251 and is connected with the body 23. The height position of the top surface of the supporting stage 25 is set such that the bottom of the body 23 is a little lower than the top surface position of the roulette device 3.

(Gaming Machine 1: The Mechanical Structure: The Overlooking Information Acquiring Device 71)

Figure 9:
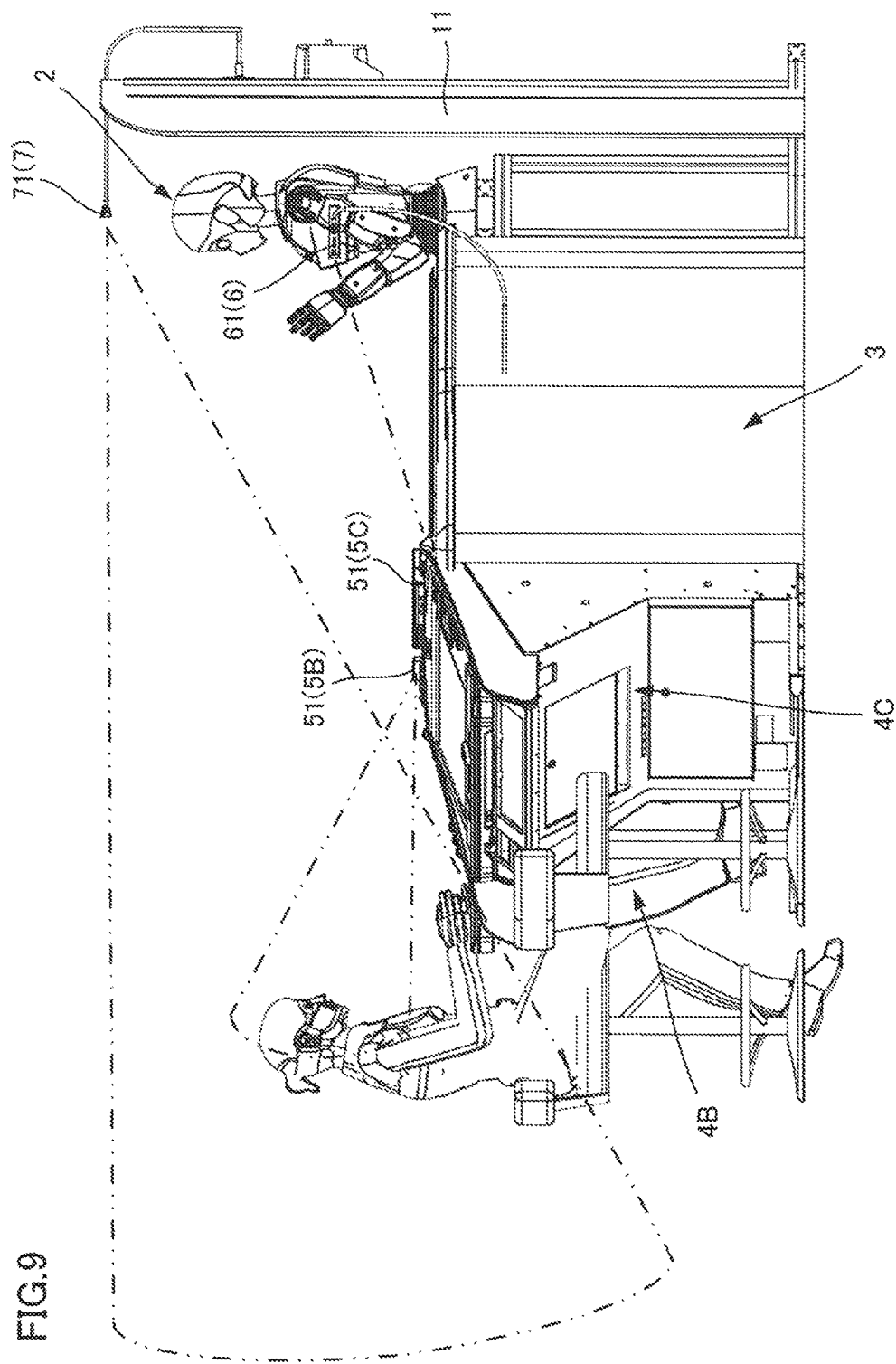
FIG. 9 is an illustrative view representing a shooting state of a gaming machine.

As shown in FIG. 7 and FIG. 9, a wall part 11 is disposed at the back side of the robotic dealer 2. The wall part 11 provide a support to the overlooking information acquiring device 71 which is used to take the dynamic images. The overlooking information acquiring device 71 is configured over the robotic dealer 2. The overlooking information acquiring device 71 is set to take at least the back of the terminal devices 4A-4C as the picture area. Therefore, the overlooking information acquiring device 71 is able to recognize the environment around the gaming machine 1.

(Gaming Machine 1: The Mechanical Structure: The Roulette Device 3)

The roulette device 3 is configured before the robotic dealer 2. As shown in FIG. 10, the roulette device 3 has a roulette stage 34, the roulette wheel 31 which is disposed on the roulette stage 34, and a rotating wheel 32 which is disposed at the internal circumference of the roulette wheel 31 rotationally free. The roulette wheel 31 has a circular ring periphery frame 311 which is secured at the top surface wall of the roulette stage 34, an internal circumference wall 312 which goes down from the internal circumference end of the periphery fram3 311, and an inclined wall 313 which titles down from the internal circumference end of the internal circumference wall 312 to the center. A ditch-shaped guiding wall 312a is formed at the lower part of the internal circumference wall 312. The guiding wall 312a is formed to cause the roulette ball 33 to contact therewith and perform a circling motion under the action of centrifugal force, and the roulette ball 33 which is performing the circling motion may not fly out from the roulette wheel 31.

The inclined wall 313 of the roulette wheel 31 is formed to be a circular ring. The disc shaped rotating wheel 32 is formed at the internal circumference of the inclined wall 313. With the driving of a driving motor (not shown) which is disposed within the roulette stage 34, the rotating wheel 32 rotates at a predetermined speed along a predetermined direction (for example, a clockwise direction) relative to the roulette wheel 31, in a period before a predetermined time and after the roulette ball 33 just beginning to rotate.

A plurality of pockets 321 are formed at the periphery of the rotating wheel 32. These pockets 321 are configured to be divided with a same interval in the whole area of the periphery thereof. Independent sequence numbers are labeled near respective pockets 321 respectively, and the independent sequence numbers are colored with red, black and green. As mentioned above, the roulette wheel 31 is configured to cause the roulette ball 33 to contact the guiding wall 312a and perform a circling motion under the action of centrifugal force, and then the roulette ball 33 drops toward the central part when the centrifugal force weakens and is stopped at one of the pockets 321.

The respective pocket 321 may accept the roulette ball 33. In addition, the respective pocket 321 has a roulette ball checking sensor which is not shown. After the roulette ball 33 is accept by the pocket 321, the roulette ball checking sensor is able to determine the pocket 321 which accepts the roulette ball 33 through checking the roulette ball 33.

In addition, it is preferably for the roulette device 3 that, the top surface of the roulette wheel 31 in addition to the operating area of the robotic dealer 2 is covered by a covering part which is made of an acrylic resin. Therefore, it is able to reduce the possibility of the roulette ball 33 flying out from the roulette wheel 31. In addition, it is able to reduce the possibility of the foreign object intruding into the roulette wheel 31 or other illegal actions occurring.

(Gaming Machine 1: The Mechanical Structure: The Roulette Device 3: A Delivering Device 37)

Figure 11:
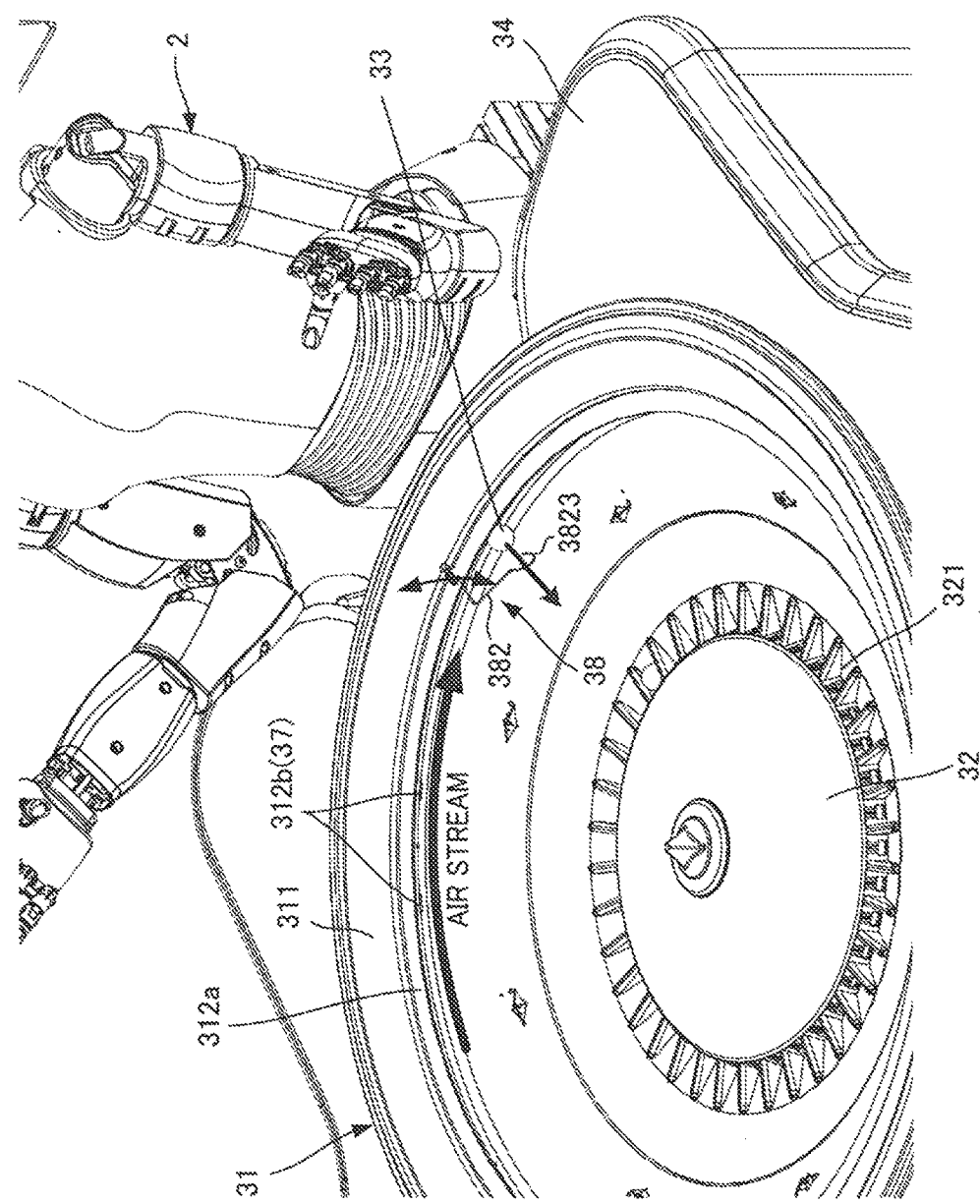
FIG. 11 is an illustrative view representing an operation state of a roulette ball holding device.

As shown in FIG. 11, the roulette device 3 comprises the delivering device 37 which delivers the roulette ball 33 and causes it to perform a circling motion, and a roulette ball holding device 38, the roulette ball holding device 38 comprises a holding component 382 which is used to hold the roulette ball 33 removably at the delivering position, and the delivering position is a position where the roulette ball 33 is delivered by the delivering device 37. Therefore, the roulette device 3 may locate the delivering position of the roulette ball 33 through the holding component 382 of the roulette ball holding device 38 in a high precision such that a stable delivering operation is able to be performed for the roulette ball 33 by the delivering device 37.

In this regard, the delivering device 37 comprises a compressor (not shown) which brings air in from the surrounding environment and compresses it to a predetermined pressure, and an air tube which carries the air which is compressed by the compressor. The compressor and the air tube described above are disposed in the roulette stage 34. The air tube is connected onto spray ports 312b, and the spray ports 312b are configured at a plurality of parts of the guiding wall 312a. The respective spray ports 312b are formed such that the advancing direction of the air which is compressed is slightly toward the internal circumference relative to the tangential direction of the guiding wall 312a. Therefore, an air stream layer of the compressed air from the respective spray ports 312b advancing along the guiding wall 312a in a clockwise direction is formed in the roulette wheel 31.

The roulette ball 33 which is held at the delivering position by the roulette ball holding device 38 is drawn to the air stream layer direction by the air stream, and the roulette ball 33 is moved into the air stream layer under the action of the air stream. Under the action of the air stream, the movement speed of the roulette ball 33 gradually increases, and the roulette ball 33 rotates along the guiding wall 312a in a clockwise direction. On the other hand, the air stream disappears when stopping spraying out the compressed air, and at this moment, the rotation speed of the roulette ball 33 gradually decreases such that centrifugal force is lost. Thereafter, the roulette ball 33 tumbles along the inclined wall 313 and moves towards the inner side of the roulette wheel 31, and arrives at the rotating wheel 32 which is rotating. The roulette ball 33 is accepted in one of the pockets 321, and the pockets 321 are formed in the rotating wheel 32. A winning number is determined by the roulette device 3, and a payout is conducted according to the winning number which is determined and a bet information which is used to represent a game player performing a bet.

(Gaming Machine 1: The Mechanical Structure: The Roulette Device 3: The Roulette Ball Holding Device 38: A Holding Component 382)

Figure 12:
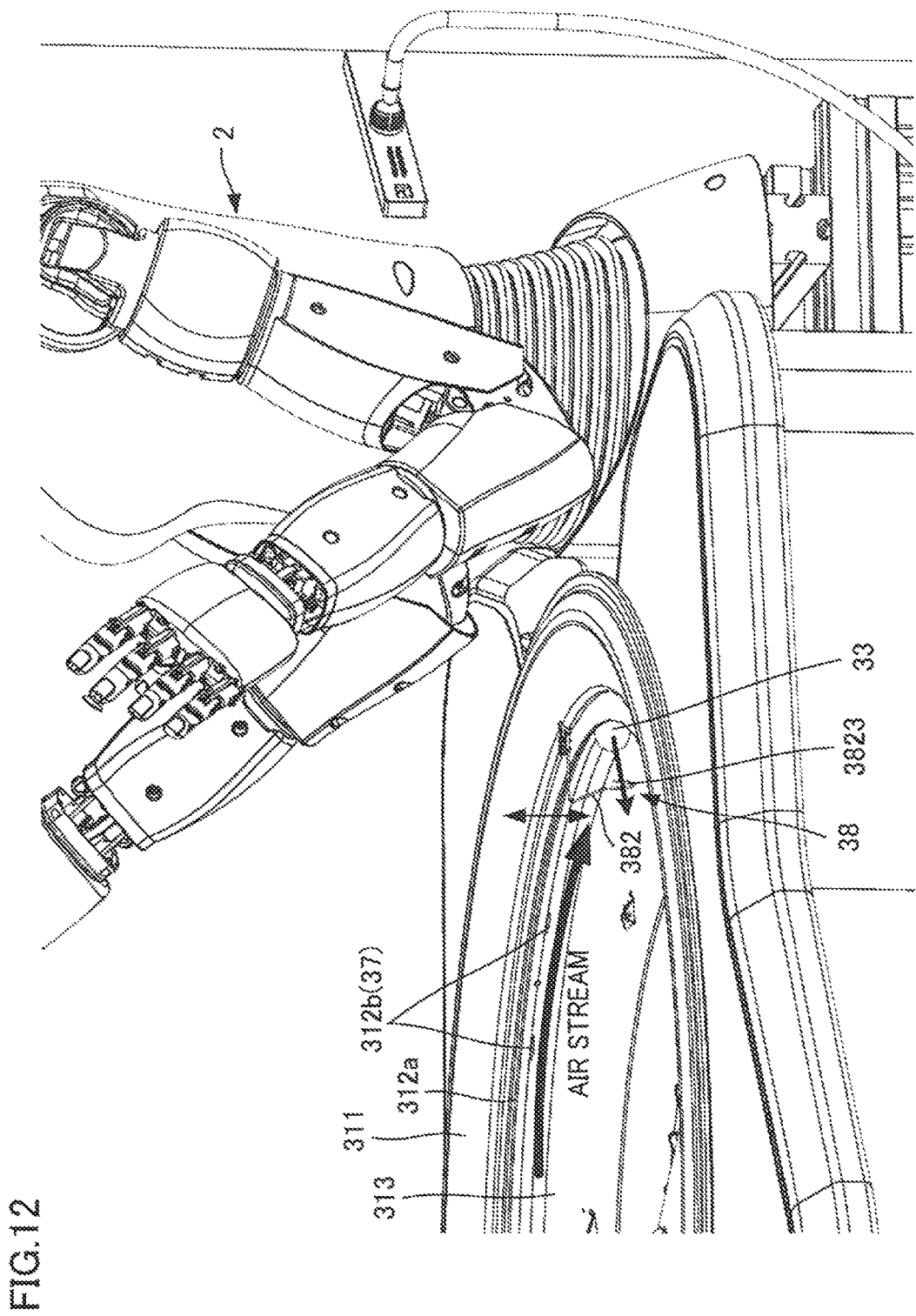
FIG. 12 is an illustrative view representing an operation state of a roulette ball holding device.

The roulette ball holding device 38 comprises the holding component 382, which is also shown in FIG. 12. The holding component 382 is formed to hold the roulette ball 33 at the delivering position of the roulette ball 33 removably. The holding component 382 is configured not to contact the roulette ball 33 which performs the circling motion along the guiding wall 312a. That is to say, the holding component 382 is placed opposite to the guiding wall 312a with a space by a distance larger than the diameter of the roulette ball 33. Therefore, even if the holding component 382 does not keep away from the delivering position, the roulette ball holding device 38 is able to cause the roulette ball 33 to perform the circling motion along the guiding wall 312a. In addition, the delivering position is also the holding position of the roulette ball 33.

Specifically, as shown in FIG. 12, the holding component 382 is made by bending a filament component such as a metal wire, and comprises a holding part 3823 which bends and holds the roulette ball 33, a rotating part 3822 which is formed with the holding part 3823 at the front end thereof, and a rotating shaft 3821, and wherein the back of the rotating part 3822 (at the gyration side) is bent in the right direction. The holding component 382 is set to be that, the bottom 3823a of the holding part 3823 is at slight upper of the inclined wall 313, a bending part 3823b is parallel to a vertical direction and is parallel to the tangential direction of the guiding wall 312a, under the holding state of the roulette ball in which the holding part 3823 is located at the holding position (the delivering position).

Therefore, regarding the holding component 382, as shown in FIG. 11 and FIG. 12, when the roulette ball 33 is carried to the inclined wall 313 over the holding part 3823, the roulette ball 33 advances along the inclined wall 313 in the direction of the holding part 3823 under the action of the gravity and is accepted in the bent holding part 3823. At this moment, even in the condition that the roulette ball 33 arrives at the position slightly deviating from the central part of the holding part 3823, the roulette ball 33 is able to move to the central part of the holding part 3823 under the action of the gravity such that it may be located at the holding position (the delivering position) correctly. As such, the work to dispose the roulette ball 33 in the roulette ball holding device 38 by the robotic dealer 2 automatically becomes easy to perform, and the work of disposing may be accomplished in a highly reliable manner.

(Gaming Machine 1: The Mechanical Structure: The Roulette Device 3: The Roulette Ball Holding Device 38: A Retreat Device 381)

Figure 13:
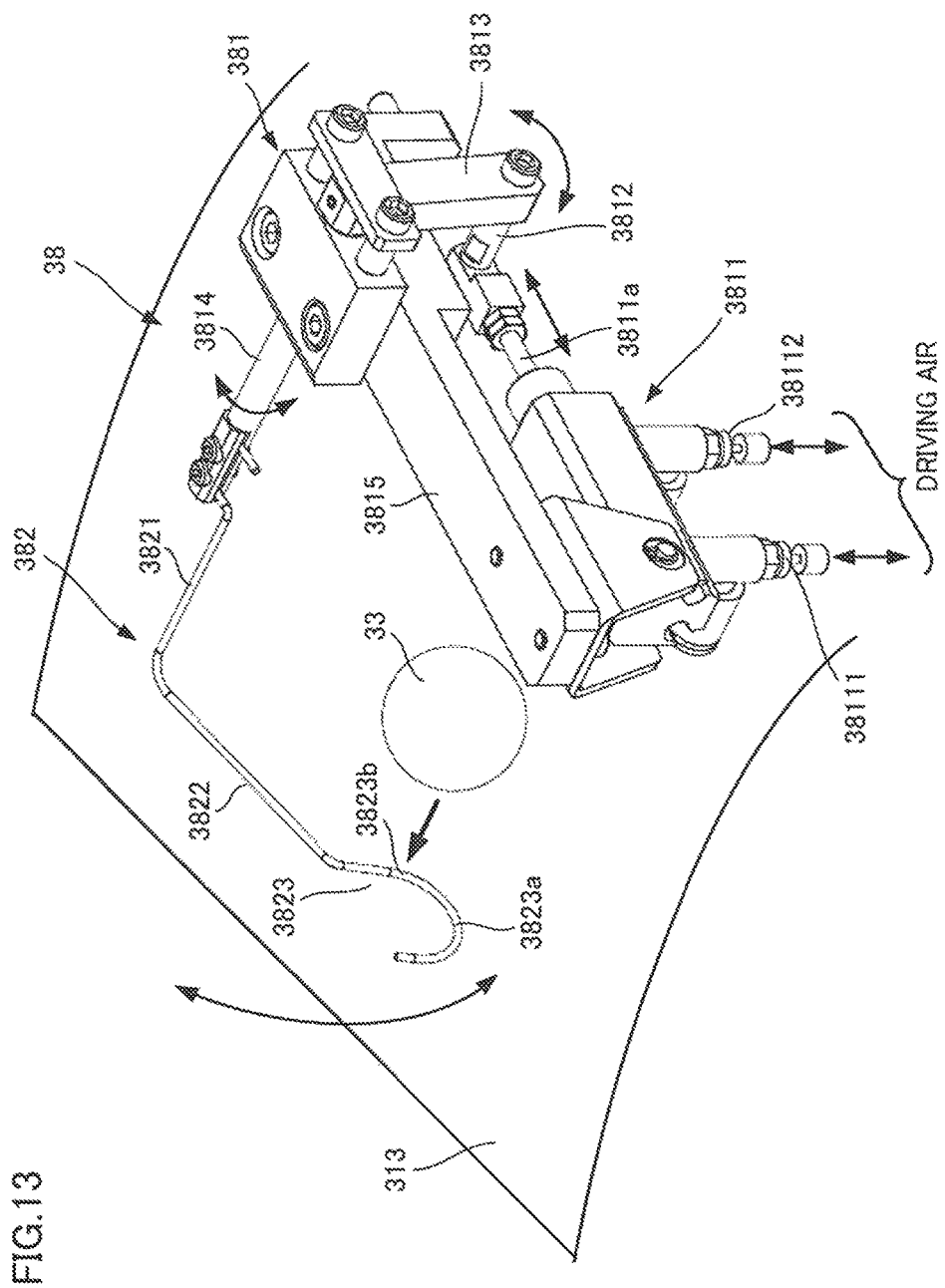
FIG. 13 is a perspective view of a roulette ball holding device.

In addition, as shown in FIG. 13, the roulette ball holding device 38 comprises the retreat device 381 which is used to cause the holding component 382 to switch between a holding gesture and a retreat gesture. Wherein the "holding gesture" refers to the state of the holding component 382 when the holding part 3823 is at the holding position (the delivering position). The "retreat gesture" refers to the state of the holding component 382 when the holding part 3823 is at the retreat position. In the period of the roulette ball 33 performing a circling motion along the guiding wall 312a, the roulette ball holding device 38 causes the holding component 382 in the retreat gesture. Therefore, the roulette ball holding device 38 is able to prevent the following conditions occurring that the holding component 382 is an obstacle for the player who observes the roulette ball 33 moved in the roulette wheel 31 and the roulette ball 33 may contact the holding component 382 when the roulette ball drops along the inclined wall 313.

The retreat device 381 is configured within the roulette wheel 31. The retreat device 381 comprises a rotating shaft component 3814, and the rotating shaft component 3814 provides a support to the end of a rotating shaft part 3821 in the holding component 382 with a fixing state. The axle center of the rotating shaft component 3814 is consistent with the rotating center axis of the holding component 382. Therefore, the rotating shaft part 3821 of the holding component 382 rotates along a forward direction and a reverse direction when the rotating shaft component 3814 rotates along the forward direction and the reverse direction. As a result, the holding part 3823 performs an up-and-down motion through the rotating part 3822 such that the holding part 3823 is separated from or approaches to the inclined wall 313.

The rotating shaft component 3814 is supported by the installing stage 3815 and may rotate freely. Other ends of the rotating shaft component 3814 are connected to the upper end of the rod-like first connecting component 3813 with a fixing state. The first connecting component 3813 is configured to be orthogonal to the axle center of the rotating shaft component 3814. Therefore, when the lower end of the first connecting component 3813 swings, the rotating shaft component 3814 which is connected with the upper end of the first connecting component 3813 rotates with a rotation angle corresponding to the above swinging, and thus the holding component 382 rotates in the up and down direction relative to the inclined wall 313 with the rotation angle corresponding to the above swinging.

The lower end of the first connecting component 3813 may be connected on one end of a cylindrical second connecting component 3812 free rotationally. The axle center of the second connecting component 3812 is configured to be parallel to the axle center of the rotating shaft component 3814. Other ends of the second connecting component 3812 may be connected on the shaft component 3811a of the cylinder device 3811 free rotationally. The axle center of the shaft component 3811a is configured to be orthogonal to the axle center of the second connecting component 3812. The shaft component 3811a of the cylinder device 3811 is configured on one end of the cylinder device 3811. Other ends of the cylinder device 3811 are connected with the installing stage 3815. The installing stage 3815 causes the cylinder device 3811 to swing corresponding to the swinging of the first connecting component 3813 by providing a support to the cylinder device 3811 and causing it to free rotate in the up and down direction.

In addition, the cylinder device 3811 comprises terminal parts 38111 and 38112 which may drive the gas to inflow and outflow. The cylinder device 3811 is switched by driving the gas to inflow and outflow such that the shaft component 3811*a* is caused to advance and retreat. Therefore, when the cylinder device 3811 causes the shaft component 3811*a* to entrance and egress, the lower end of the first connecting component 3813 reverses in the entrancing and egressing direction through the second connecting component 3812 such that the holding part 3823 of the holding component 382 is caused to decline and approach to the inclined wall 313 through the rotating shaft component 3814. On the other hand, when the cylinder device 3811 causes the shaft component 3811*a* to recede, the lower end of the first connecting component 3813 reverses in the receding direction through the second connecting component 3812 such that the holding part 3823 of the holding component 382 is caused to rise and be away from the inclined wall 313 through the rotating shaft component 3814.

The entrancing and egressing position and the receding position of the shaft component 3811*a* of the cylinder device 3811 is set to be a certain position. The entrancing and egressing position of the shaft component 3811*a* is set such that the holding part 3823 of the holding component 382 is able to hold the roulette ball 33 at the delivering position. That is to say, the holding component 382 is set to be a holding gesture at the entrancing and egressing position of the shaft component 3811*a*. On the other hand, the receding position of the shaft component 3811*a* is set to be the retreating position, and at the retreating position, the holding component 382 may not obstruct the roulette ball 33 to perform the circling motion under the action of the compressed air, and may also not obstruct the player to observe the roulette ball 33. That is to say, the holding component 382 is set to be a retreating gesture at the receding position of the shaft component 3811*a*.

(Gaming Machine 1: The Mechanical Structure: The Roulette Device 3: The Roulette Ball Holding Device 38: A Modification of the Holding Component 382)

Figure 14:
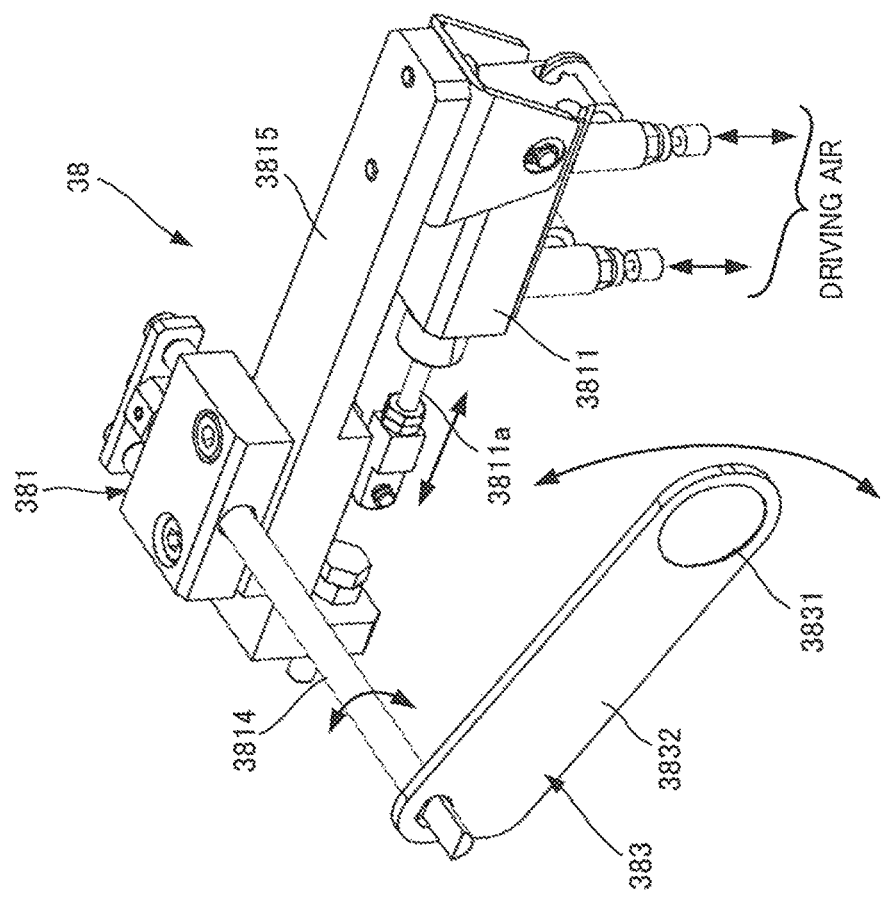
FIG. 14 is a perspective view of a roulette ball holding device.
Figure 15:
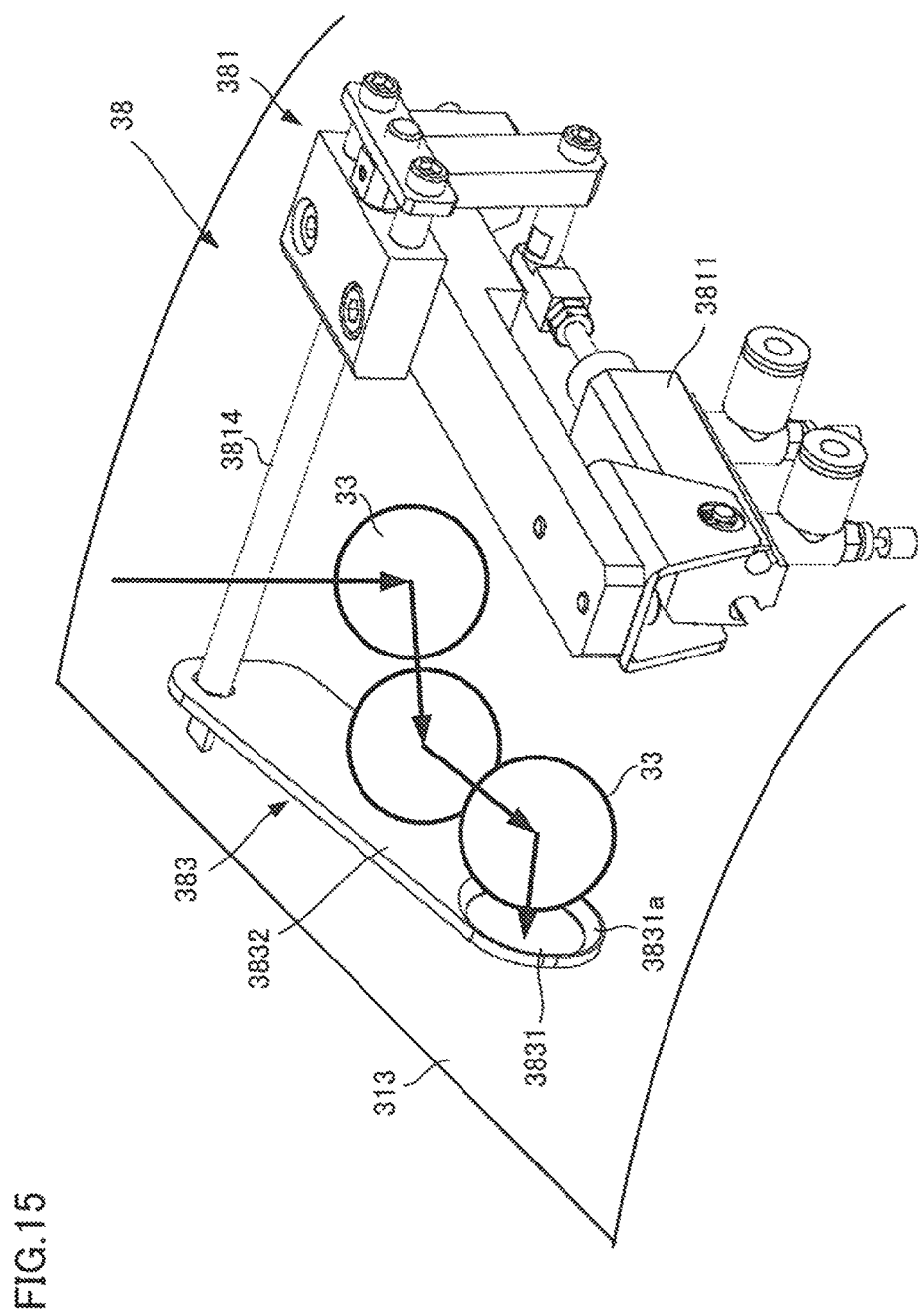
FIG. 15 is an illustrative view representing a holding process of a roulette ball in a roulette ball holding device.

The holding component 382 mentioned above is made by bending the filament component such as a metal wire, however the present invention is not limited thereto, and it may be made by cutting a flakiness component. In this regard, as shown in FIG. 14, the holding component 383 comprises the holding part 3831 which is used to hold the roulette ball 33 and the guiding part 3813 which is used to guide the roulette ball 33 which moves in the center part direction of the roulette wheel 31 to the direction of the holding part 3831. According to the structure mentioned above, even in the condition that the roulette ball 33 moves to the guiding part 3832 deviated from the holding part 3831, the operation to cause the guiding part 3832 to hold the roulette ball 33 is able to be performed steadily because the guiding part 3832 may cause the roulette ball 33 to move the holding part 3831 and holding it. In addition, it is preferably that, as shown in FIG. 15, the holding part 3831 comprises a inclined part 3831*a*, and the inclined part 3831*a* is consistent with the tangent line of the roulette ball 33 such that the roulette ball 33 is held when holding a facial contacting with the roulette ball 33.

The holding part 3831 is configured at one end of the holding component 383. Other ends of the holding component 383 are supported on the rotating shaft component 3814 of the retreating device 381 in a fixing state. Therefore, when the rotating shaft component 3814 in the retreating device 381 rotates in the forward direction and the reverse direction, the holding component 383 is caused to rotate in the up and down direction with other ends of the holding component 383 as the reversing center such that the retreating gesture and the holding gesture are achieved.

Figure 16:
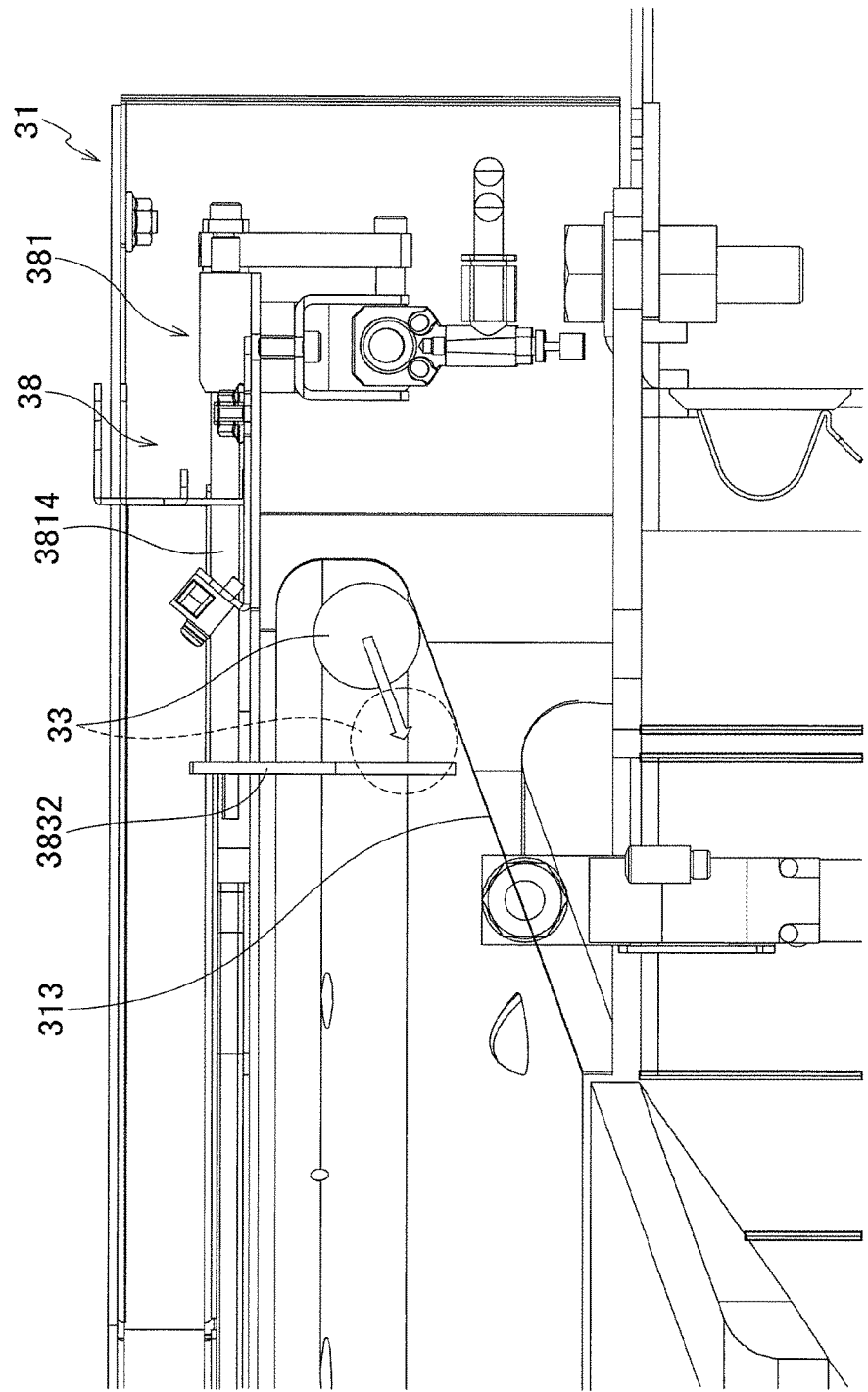
FIG. 16 is a main cross-section view of a roulette device.

In addition, the holding component 383 is able to serve as the guiding wall which is used to guide the roulette ball 33 to the holding part 3831 because the holding component is formed to be flakiness. In this regard, as shown in FIG. 16, when the roulette ball 33 is carried onto the inclined wall 313 over the sides of the rotating shaft component 3814 deviated from the holding component 3831, the roulette ball 33 advances along the inclined wall 313 in the direction of the holding part 3831 under the action of the gravity and touches the guiding part 3832. Then, the roulette ball 33 contacts the holding part 3832 and moves toward the direction of the holding part 3831 and is held by the holding part 3831. As such, the work to dispose the roulette ball 33 in the roulette ball holding device 38 by the robotic dealer 2 automatically becomes easy to perform, and the work of disposing may be accomplished in a highly reliable manner.

Figure 17:
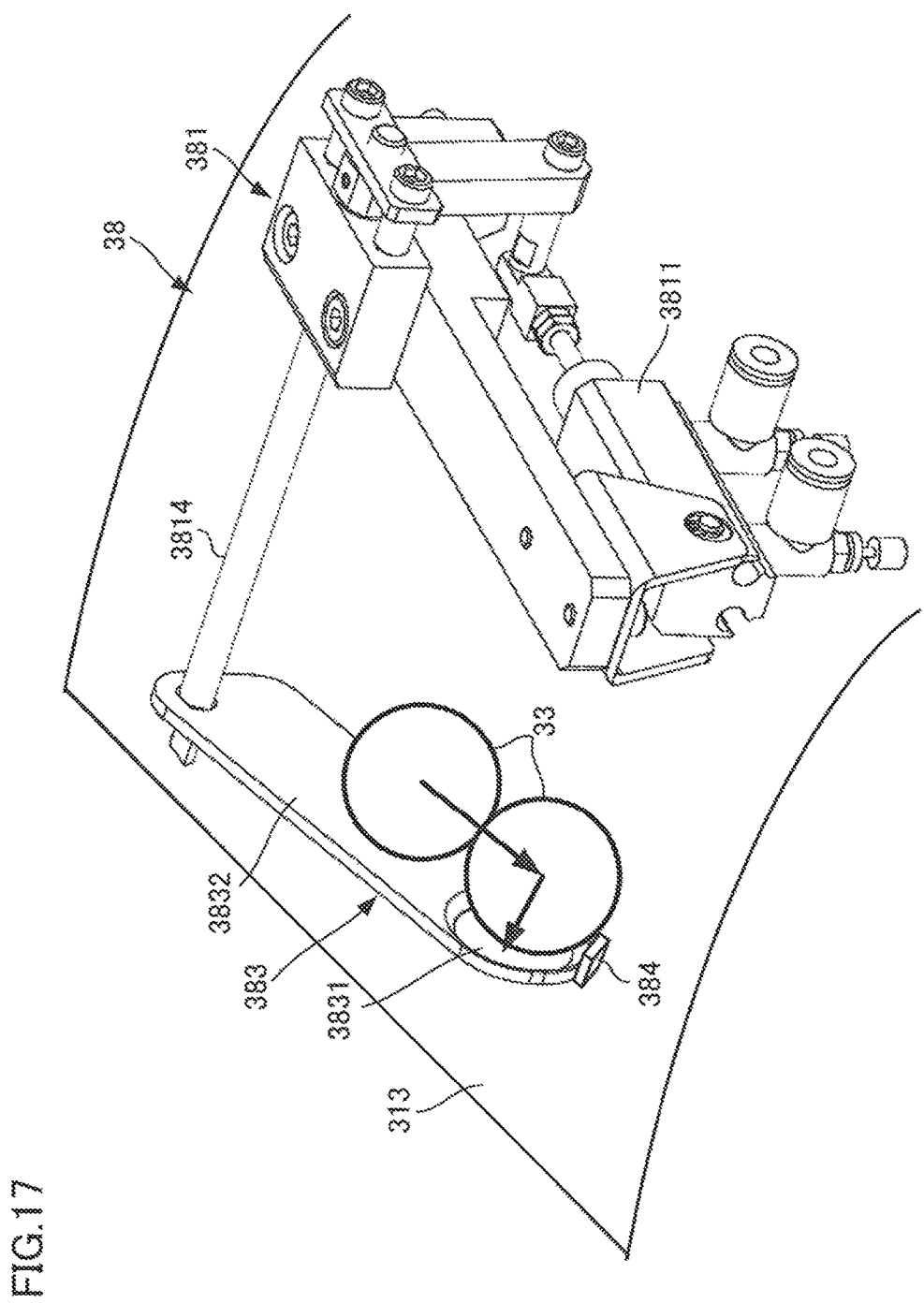
FIG. 17 is an illustrative view representing a holding process of a roulette ball in a roulette ball holding device.

In addition, as shown in FIG. 17, one end of the robotic dealer 2 is disposed with a protruding part 384. The protruding part 384 severs as a stopper of the roulette ball 33 which moves along the guiding part 3832, thus assisting the holding part 3831 to hold the roulette ball 33, and assisting to move the roulette ball 33 deviated from the holding part 3831 into the air stream.

Figure 18:
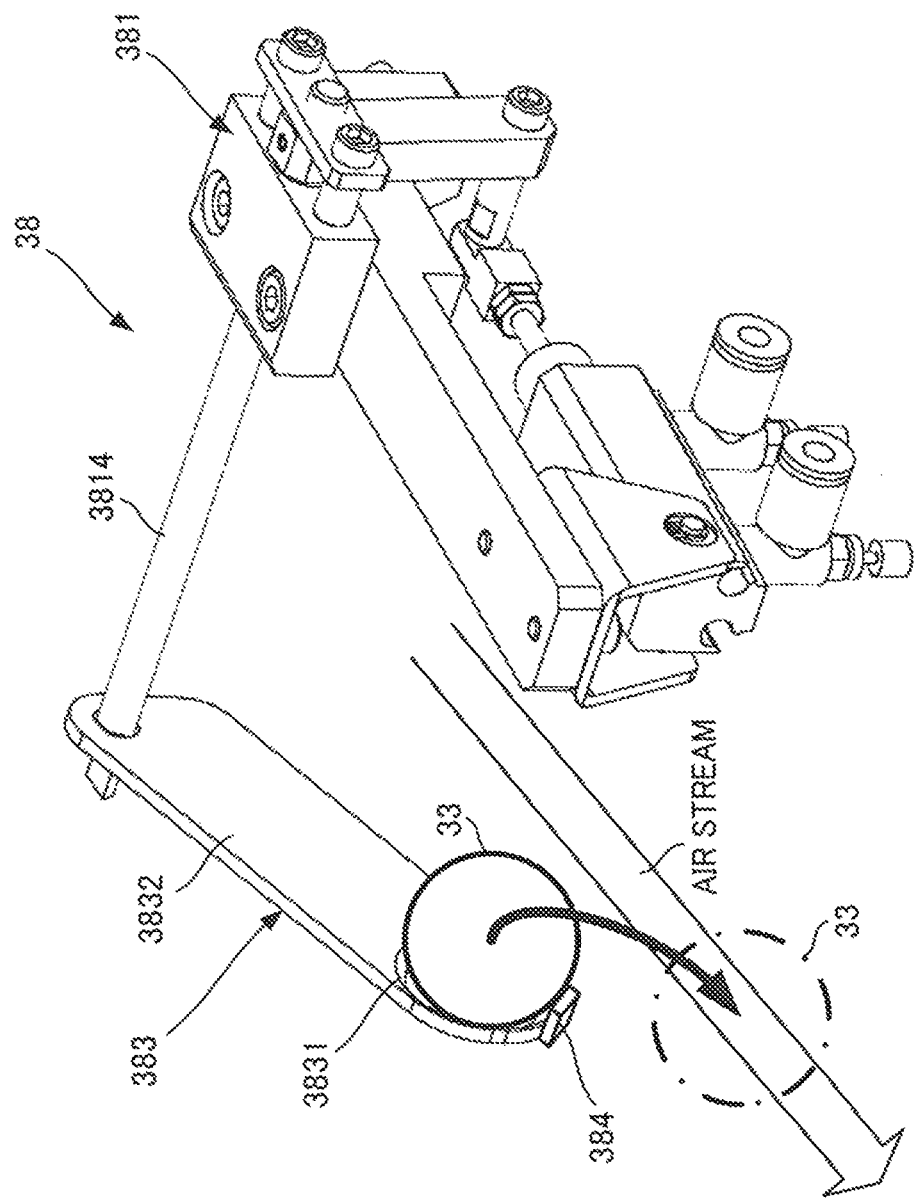
FIG. 18 is an illustrative view representing a separating process of a roulette ball in a roulette ball holding device.

Specifically, as further shown in FIG. 18, comparing with the holding part 3831, the protruding part 384 is configured at the downstream side of the circling motion direction (air stream) of the roulette ball 33. That is to say, the protruding part 384 is disposed at one end of the holding component 383, and thus comparing with the holding part 3831 which is formed at one end of the holding component 383, the protruding part 384 is configured at the downstream side of the circling motion direction (air stream) of the roulette ball 33. The protruding part 384 protrudes toward the wall face direction of the roulette wheel 31.

Figure 19:
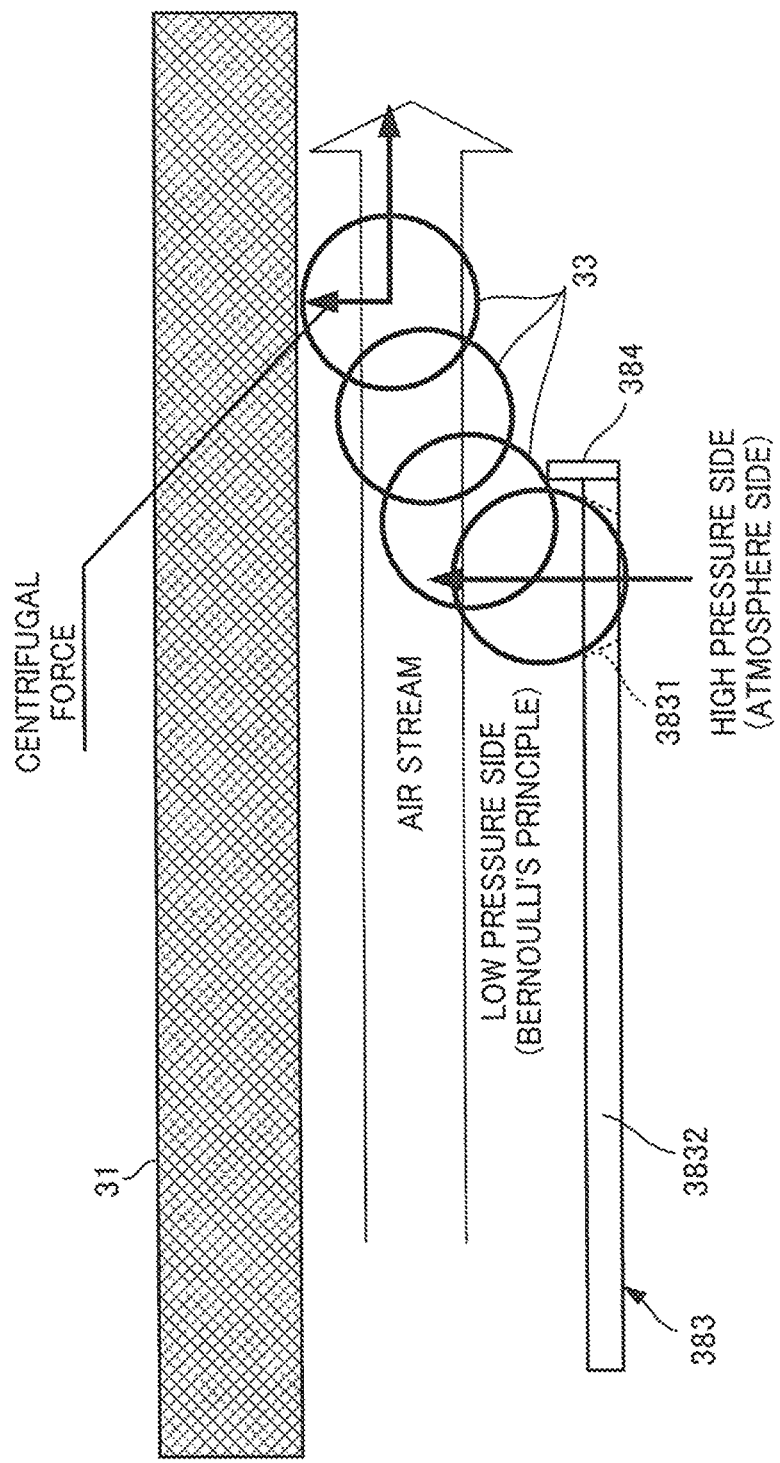
FIG. 19 is an illustrative view representing an operation state of a roulette ball in a roulette ball holding device.

Therefore, as shown in FIG. 19, because the roulette ball 33 is caused to perform the circling motion with the aid of the air stream, in the condition that the roulette ball 33 is caused to deviate from the holding part 3831, the pressure and the flow rate decreases accordingly near the air stream based on the Bernoulli's principle. Therefore, a low pressure side of the air stream and a high pressure side of the atmosphere are formed with the holding component 383 sandwiched therebetween, and as such, the roulette ball 33 advances toward the direction of the air direction (the wall face direction of the roulette wheel 31) under the action of the pressure difference. In addition, when the roulette ball 33 moves to the downstream side under the action of the air stream, the protruding part 384 which is configured at the downstream side causes the roulette ball 33 to move toward the internal direction of the air (the wall face direction of the roulette wheel 31) forcefully, and therefore it is easy to cause the roulette ball 33 to enter into the compressed air stream reflowing along the wall face of the roulette wheel 31.

(Gaming Machine 1: The Mechanical Structure: The Safety Information Acquiring Device 61)

As shown in FIG. 7 and FIG. 9, the safety information acquiring device 61 is disposed above the diagonal of the roulette device 3 and at the side direction of the robotic dealer 2. The safety information acquiring device 61 is disposed on the roulette stage 34. The safety information acquiring device 61 is set to take the roulette wheel as the picture area. Therefore, the safety information acquiring device 61 is able to check the abnormal operation applied to the roulette device 3 by the external. Wherein, as the example of the "abnormal operation", it may be an action that a player would like to touch the rotating wheel 32 and the roulette ball 33 and an operation that the items such as a cigarette, a lighter and a portable set which are not used in the roulette game into the roulette wheel 31.

(Gaming Machine 1: The Mechanical Structure: The Terminal Devices 4a-4c)

Various terminal devices 4A-4C are configured such that the player who has a seat faces to the robotic dealer 2 spaced with the roulette device 3. That is to say, the second terminal device 4B is configured to face to the front side of the robotic dealer 2, the first terminal device 4A and the third terminal device 4C take the second terminal device 4B as the center and are configured at both sides of the second terminal device 4B.

As shown in FIG. 19, various terminal devices 4A-4C have a touch-sensitive display device 41. The display device 41 is able to display a roulette table which is used to represent a bet state. The display device 41 displays the bet state in the various terminal device 4A-4C and sets and changes the bet which is conducted with a touching operation performed by the player.

In addition, respective terminal devices 4A-4C comprise two speaker devices 42A and 42B. Respective speaker devices 42A and 42B are configured at one end and other ends of the roulette device 3 respectively. The speaker device 42A and 42B mentioned above output the operation sound of the roulette device 3, the operation sound of 33, the effect sound of betting, and so on.

(Gaming Machine 1: The Mechanical Structure: The Player Analyzing Devices 5A, 5B and 5C)

The player information acquiring device 51 is configured between the speaker device 42A and 42B of respective terminal devices 4A-4C. The player information acquiring device 51 comprises the camera devices 511 and 512 and the microphone device 513. The camera devices 511 and 512 are set to take the face of a player as the picture area as shown in FIG. 9. Therefore, the player analyzing devices 5A and 5B are able to perform an emotion determining process, a gender determining process, a process that determines whether there is a conversation or not, and a process forming the application video.

(A System Configuration of the Gaming Machine 1)

As shown in FIG. 1, the gaming machine 1 comprises a robotic dealer 2, which simulates a human dealer through a robot, a roulette device 3 conducting a roulette game, and three terminal devices 4A-4C (FIG. 7), which are configured around the roulette device 3. The gaming machine 1 further comprises the player analyzing devices 5A, 5B and 5C configured correspondingly to the respective terminal devices 4A-4C and used to acquire the voice and the video of the respective player and analyze them, the safety camera recognition device 6 which is able to check the abnormal operation applied to the roulette device 3 by the external, the camera recognition device 7 which is able to recognize the condition around the gaming machine 1, and a CAIWA server 8 which is able to take an action responsive to the utterance of the player.

The player analyzing devices 5A, 5B and 5C comprise the player information acquiring device 51 and the player camera unit 52. The player information acquiring device 51 comprises two types of camera devices 511 and 512 and the microphone device 513.

The safety camera recognition device 6 comprises the safety information acquiring device 61 and the roulette state camera unit 62. The safety information acquiring device 61 comprises two types of camera devices 611 and 612. The camera devices 611 and 612 mentioned above are configured to be able to take pictures for the top surface of the roulette device 3. One type of the camera device 611 is a high definition video camera. The other type of the camera device 612 is an infrared camera. The roulette state camera unit 62 outputs the dynamic image information of the roulette device 3 (a video delivering process) according to the video from the camera devices 611 and 612.

The overlooking camera recognition device 7 comprises the overlooking information acquiring device 71 and the overlooking camera unit 62. The overlooking information acquiring device 71 comprises two types of camera devices 711 and 712. The camera devices 711 and 712 mentioned above are configured to be able to take pictures for the entirety of the roulette device 3 and the background of the terminal devices 4A-4C. One type of the camera device 711 is a high definition video camera. The other type of the camera device 712 is an infrared camera. The overlooking camera unit 72 is configured to perform a read-in process of a camera video, an image analyzing process, an analyzing process of the number of persons, a location of a person, and an action, a get-in process of a video of an application and a video distributing process according to the video from the camera devices 711 and 712.

In addition, the gaming machine 1 further comprise the main unit 101 which is used to perform a variety of process. The main unit 101 connects the player analyzing devices 5A, 5B and 5C, the safety camera recognition device 6, the camera recognition device 7, and the server 8 through the hub 102. The gaming machine 1 performs a variety of process by cooperating with the 52, 62, and 72 of the respective devices 5, 6 and 7 and the CAIWA server 8. The specific contents regarding the variety of process are described in the below.

(Gaming Machine 1: A Display Device for Management)

Figure 21:
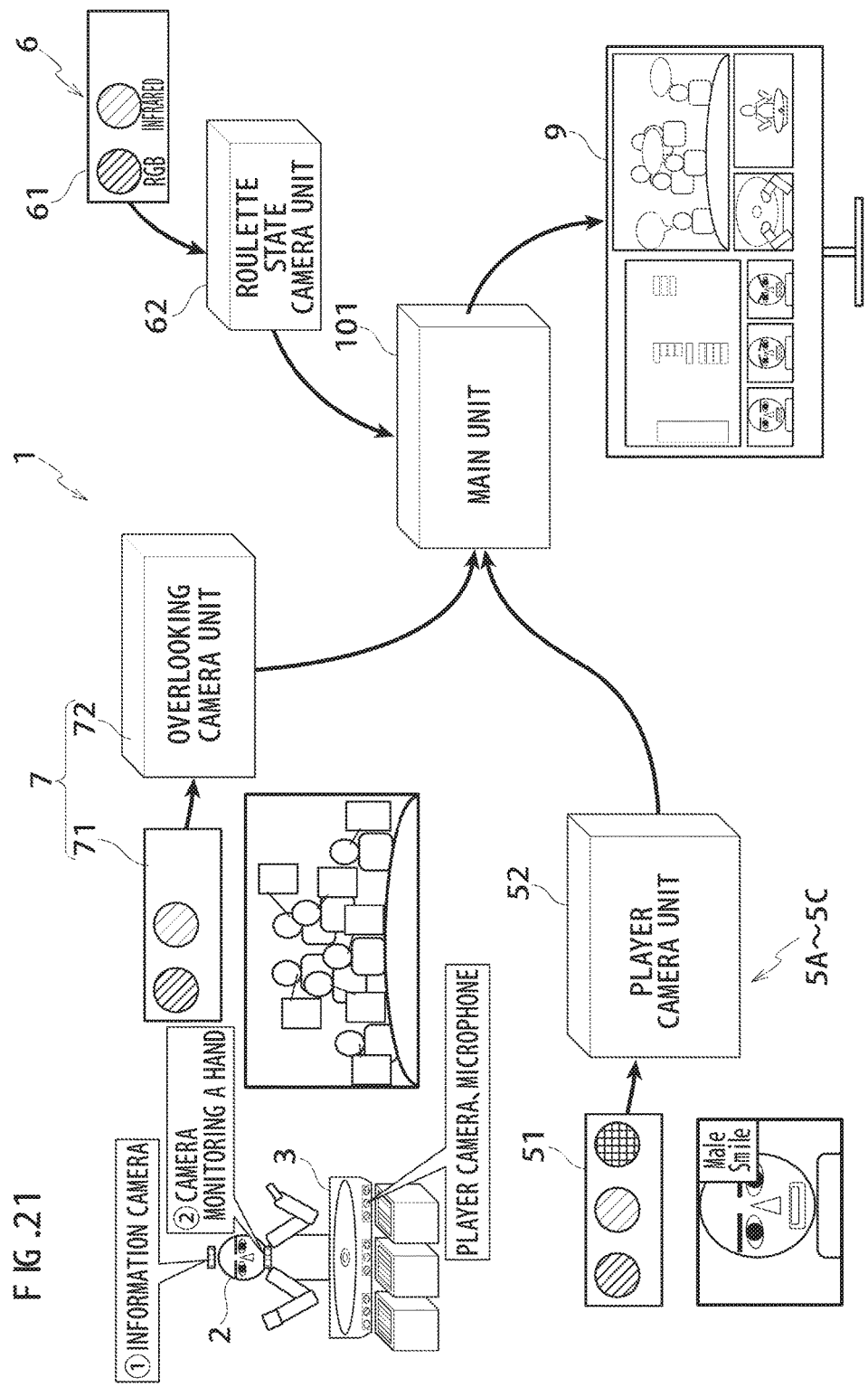
FIG. 21 is an illustrative view representing the outline of a gaming machine.

As shown in FIG. 21, the main unit 101 is connected to the display device for management 9. The display device for management 9 intensively display the information from the player analyzing devices 5A, 5B and 5C, the safety camera recognition device 6 and the overlooking camera recognition device 7 such that a plurality of information may be managed very easy. In this regard, as shown in FIG. 22, the display device for management 9 comprises a human detail area 91, a overlooking camera delivering video area 92, a first player delivering video area 93, a second player delivering video area 94, a third player delivering video area 95, a safety camera delivering video area 96, and a 3D simulator area.

The human detail area 91 comprises an ID area 911 which is used to determine respective personages, and a character area 912 which is used to represent the character of the respective personages. The ID area 911, for example, displays ID1, ID2, ID3, and so on. For example, the character area 912 displays the following various information: the gender of the personage represented by ID1, the orientation where the player is located when observed by the robotic dealer 2, the distance from the robotic dealer 2, the body height of the personage, whether it is the player, an emotion such as anger or enjoyment, the setting state regarding whether it is allowed to make a conversation with the robotic dealer 2, and so on.

In the safety camera delivering video area 96, the whole personages presented in the predetermined area behind (a direction opposite to the robotic dealer 2 side) the roulette device 3 are displayed according to the video from the overlooking camera recognition device 7 in FIG. 21. Besides, the safety camera delivering video area 96 further display the gender and the age of the respective personages, whether there is a player, and the utterance contents, in addition to displaying the personages.

The first to third player delivering video areas 93-95 display the facial images of the respective players according to the video from the player analyzing devices 5A, 5B and 5C in FIG. 21 and display the gender and the emotion of the respective players. The safety camera delivering video area 96 displays the video from the safety camera recognition device 6 in FIG. 21. In the 3D simulator area 97, the robotic dealer 2 displays the operation state of the robotic dealer 2 in the virtual space.

(The Handling Operation of the Gaming Machine 1: A Condition Seizing Process)

The contents of the process in the gaming machine 1 is illustrated in detail in the below. As shown in FIG. 23A, the gaming machine 1 performs the condition seizing process (A1). The condition seizing process includes a condition seizing process based on the visual sense (A11), a condition seizing process based on the voice (A12), a game condition seizing process (A13), a voice target determination process (A14), and a precedence action determination process (A15)

The condition seizing process based on the visual sense (A11) includes a process to search the target object according to the video from the overlooking camera recognition device 7 (A111), and in this process, the type of the personage is analyzed, and the number of persons and the location thereof are seized according to the image analysis and the infrared ray, and the conversation target personage is determined according to the image analysis and the microphone direction.

In addition, the condition seizing process based on the visual (A11) includes the process that the target object condition is seized by the action history (A12). In this process, the gradual behavior of the target object is analyzed. Wherein, the "target object" refers to the personage (player) who conducts a game through the gaming machine 1 and the personage presented around the gaming machine 1. The "gradual behavior" is the following actions 1-5. Action 1: the personage walking. Action 2: the personage stopping walking before the roulette device 3. Action 3: the personage approaching to the roulette device 3. Action 4: the personage observing the roulette device 3. Action 5: the personage greeting the robotic dealer 2. Besides, the condition of the personage as the target object is seized with the gradual behavior 1-5 mentioned above.

In addition, the condition seizing process based on the visual sense (A11) includes the process that the condition of the roulette device 3 is seized according to the information from the safety camera recognition device 6 (A113). In addition, the condition seizing process based on the visual sense (A11) includes the process that the condition of the player is seized according to the information from the player analyzing devices 5A, 5B and 5C (A114). In this process, the psychological states of the player in the game is analyzed. The psychological states are analyzed according to the expression, the animal heat, the reaction, and the face recognition of the player.

The condition seizing process based on the voice (A12) includes the process that the condition is seized according to the video from the camera devices 511 and 512 of the player information acquiring device 51 (A121). The game condition seizing process (A13) is the process that the states of the player in the game are analyzed. The analysis is performed according to "winning or losing", "winning streak", and "losing streak".

The voice target determination process (A14) is the process which is used to determine the player who utters. The player who utters is determined by the utterance recognition device 5. The precedence action determination process (A15) is the modes switching process including the audit therein. For example, the modes include a gaming mode, a conversation mode, an advertising mode, a show demonstration mode, an audit mode, and so on.

(The Handling Operation of the Gaming Machine 1: A Conversation Process)

Figure 23B:
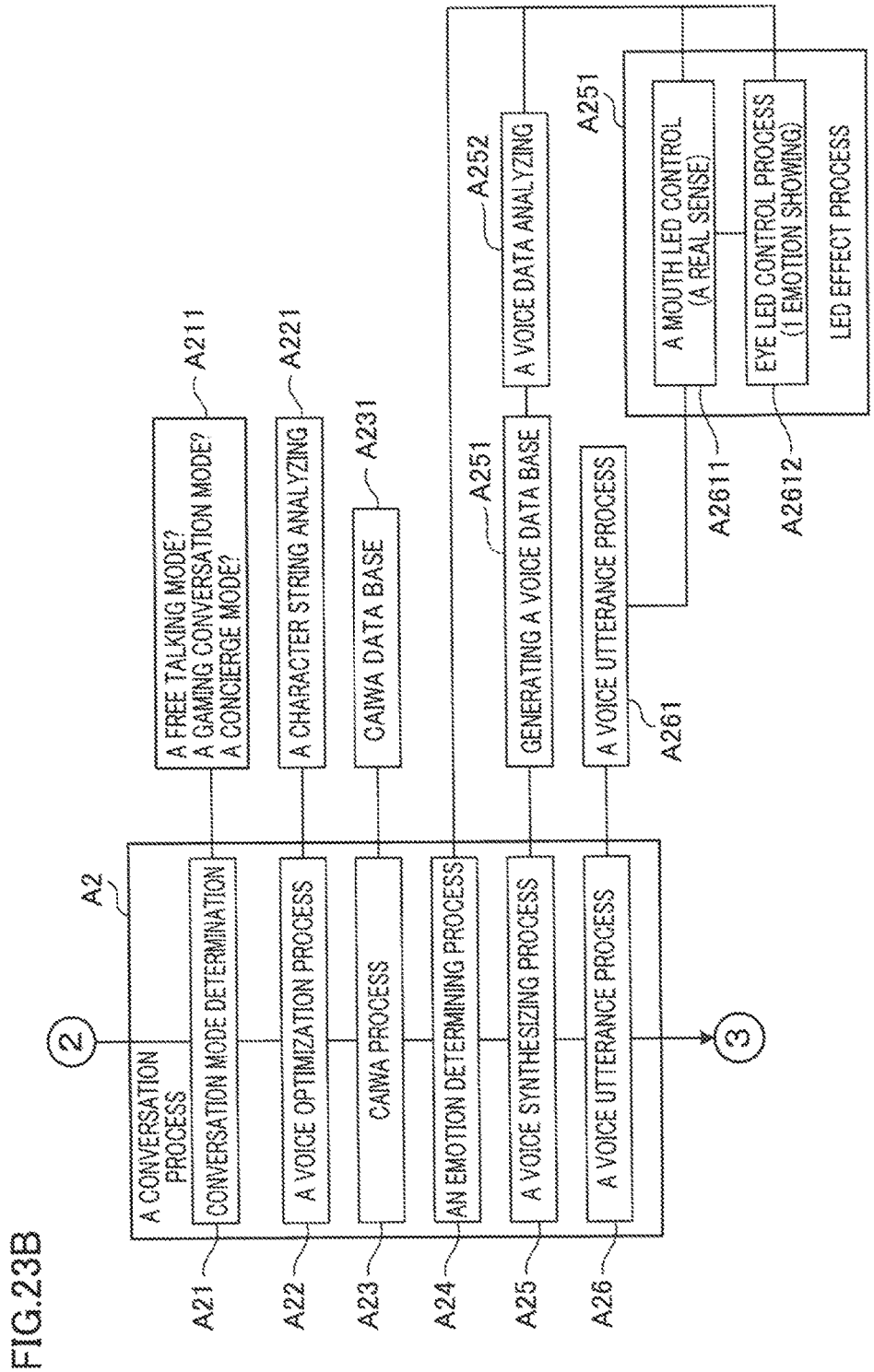
FIG. 23B is an illustrative view representing a conversation handle of a gaming machine.

After the condition seizing process (A1) is performed, as shown in FIG. 23B, the conversation process (A2) is performed. The conversation process (A2) includes a conversation mode determination process (A21), a voice optimization process (A22), a CAIWA process (A23), an emotion determination process (A24), a voice synthesis process (A25), and a voice utterance process (A26).

In the conversation mode determination process (A21), it is able to switch a free talking mode, a gaming conversation mode, and a concierge mode. In the voice optimization process (A22), the character string is analyzed (A221). For example, it is analyzed whether it is the word which may be understood by the CAIWA server 8. In the CAIWA process (A23), log in the CAIWA server 8, and make a conversation with the player (A231) according to the information from the CAIWA server 8.

In the emotion determination process (A24), the emotion corresponding to the conversation with the player is determined (S24). Thereafter, in the voice synthesis process (A25), a voice data is generated (A251) and the voice data is analyzed (A252). Then, in the voice utterance process (A26), the utterance is performed with the voice data (A261). At this moment, an LED control process is performed (A2611) according to the emotion determined in A24, the voice data analysis result in A252 and the voice utterance in A261. In this process, the color and the blink mode of the illumination light are switched according to the timing corresponding to the conversation, the illumination light provides an illumination to the surrounding part of the mouth of the robotic dealer 2, and thus the conversation and the operation of the robotic dealer 2 are able to have a sense of reality.

In addition, an eye LED control process is performed according to the mouth LED control process (A2611) and the emotion which is determined in A24. In this process, the color and the blink mode of the illumination light are switched according to the emotion changes, the illumination light provides an illumination to the surrounding part of the eye of the robotic dealer 2, and thus the robotic dealer 2 is able to show its emotion. In addition, the structure of the emotion of the robotic dealer 2 is shown by the way of the color and the blink of the illumination light, which will be described in the below.

(The Handling Operation of the Gaming Machine 1: An Action Process)

Figure 23C:
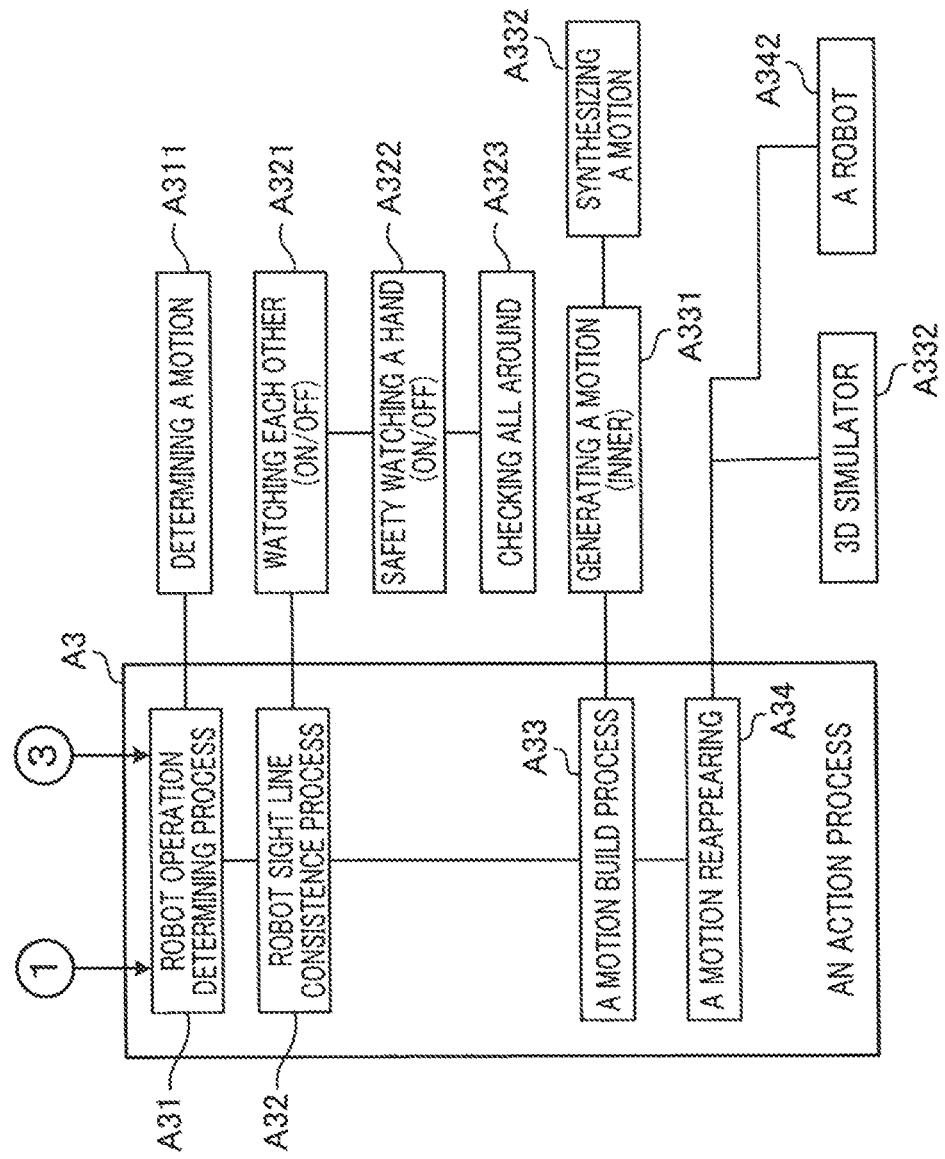
FIG. 23C is an illustrative view representing an action handle of a gaming machine.

After the condition seizing process (A1) or the conversation process (A2) is performed, as shown in FIG. 23C, the action process (A3) is performed. The action process (A3) has a robot operation determination process (A31), a robot sight consistence process (A32), a motion build process (A33) and an operation replay process (A34).

In the robot operation determination process (A31), the operation of the robotic dealer 2 is determined (A311). In the robot sight consistence process (A32), the robotic dealer 2 observes the target object corresponding to the game mode. For example, the following operations are performed correspondingly to the game mode: the operation of the robotic dealer 2 observing the player (A321), the operation of the robotic dealer 2 observing the hands, and the operation of the robotic dealer 2 observing in all directions (A323).

In the motion build process (A33), the position information of respective factors (the arms 21 and 22, the body 23, the head 24 and so on) corresponding to the operations of the robotic dealer 2 are generated (A331). Then, a synthesis is performed for the position information of these factors (A332). Thereafter, in the operation replay process (A34), the robotic dealer 2 is caused to perform operations in the virtual space by the 3D simulator process (A341). In addition, in the virtual space, there are some components which may be the obstacle acquired in the roulette device, the overlooking information acquiring device 71 and so on virtually, in addition to the robotic dealer 2.

Thereafter, an actual operation is performed by the robotic dealer 2 through the robot process (A342). At this moment, in the process of the actual operation of the robotic dealer 2, a 3D position is calculated in advance before the robotic dealer 2 actually arrives by performing a conflict preventing roulette game of FIG. 24, and it is determined whether the robotic dealer 2 collides the respective components such as the roulette device 3. If colliding, the position information of the respective factors is recalculated to prevent colliding, or the robotic dealer 2 is caused to stop the operation. The conflict preventing process is illustrated in detail in the below.

(The Handling Operation of the Gaming Machine 1: The Action Process: the Conflict Preventing Process)

Figure 25:
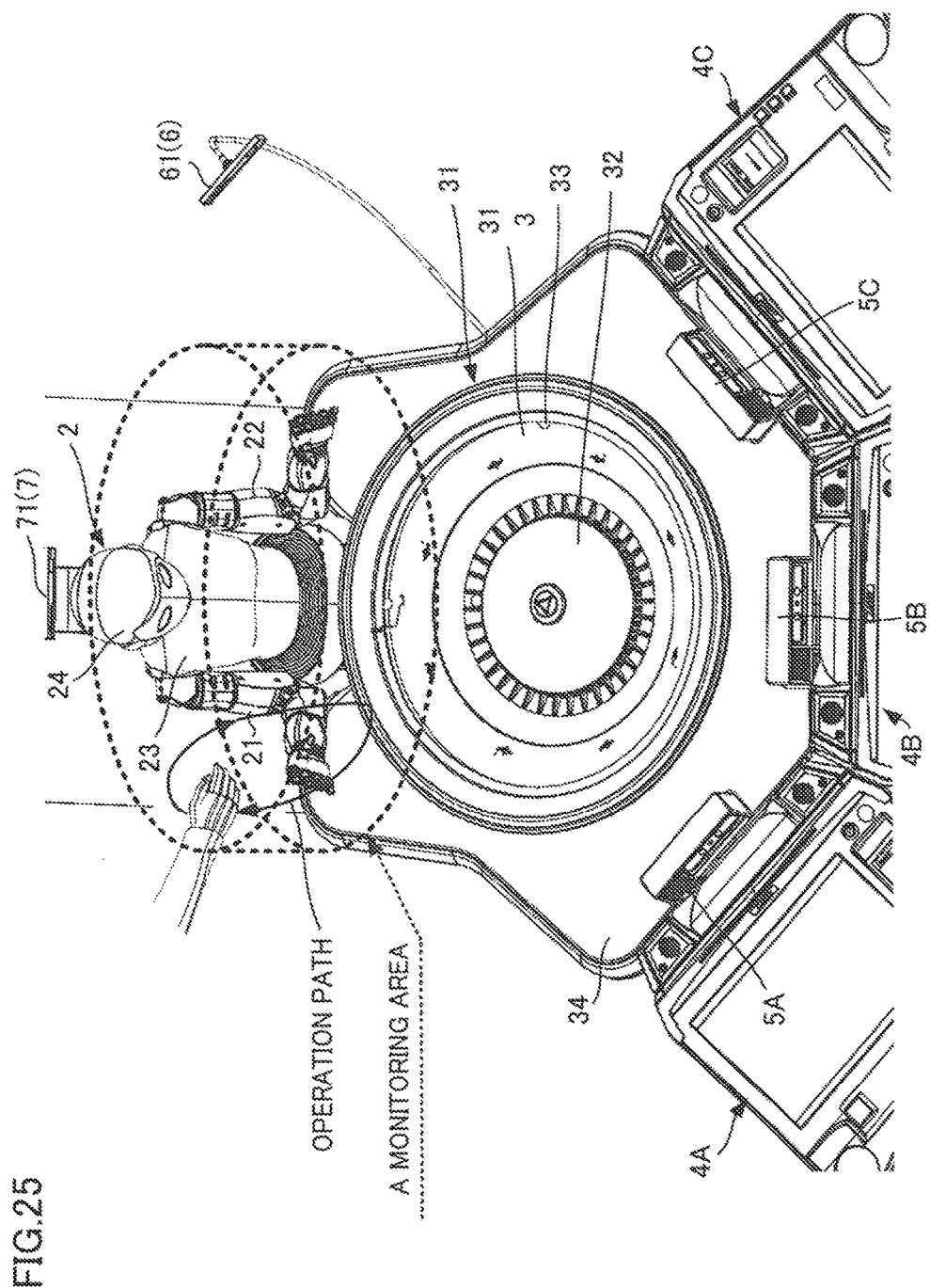
FIG. 25 is an illustrative view representing an operation path of a robotic dealer.

As shown in FIG. 25, the gaming machine 1 which performs the conflict preventing process has the following structure. That is to say, the gaming machine 1 has the robotic dealer 2 (the dealer replacement device) which is used to perform a variety of operations including the handling operation which handles the roulette ball 33 (the gaming equipment) used in the game, an obstacle checking device (the overlooking camera recognition device 7, the safety camera recognition device 6, the main unit 101 and so on) which is used to check the obstacle 111 such as the arms of a person in the monitoring area including the motion range of the robotic dealer 2, and the main unit 101 (the control device) in FIG. 1, which simulates the operation of the robotic dealer 2 in advance before and during the motion of the robotic dealer 2, and if the obstacle is presented on the operation which is simulated, a control is performed to cause the robotic dealer 2 to perform an operation corresponding to the abnormal state.

Wherein, the "operation corresponding to the abnormal state" refers to all operations which are adopted to prevent the robotic dealer 2 colliding with the obstacle 111. For example, the robotic dealer 2 during the motion stops before the obstacle 111, or the robotic dealer 2 performs an operation avoiding the obstacle 111 or sends an alarm by the manner such as a sound or a light while performing the avoiding operation.

According to the structure mentioned above, before and during the operation of the robotic dealer 2, if the obstacle is presented on the operation which is simulated in advance, it is able to prevent the robotic dealer 2 colliding with the unexpected obstacle 111 by causing the robotic dealer 2 to perform the operation corresponding to the abnormal state.

Figure 24:
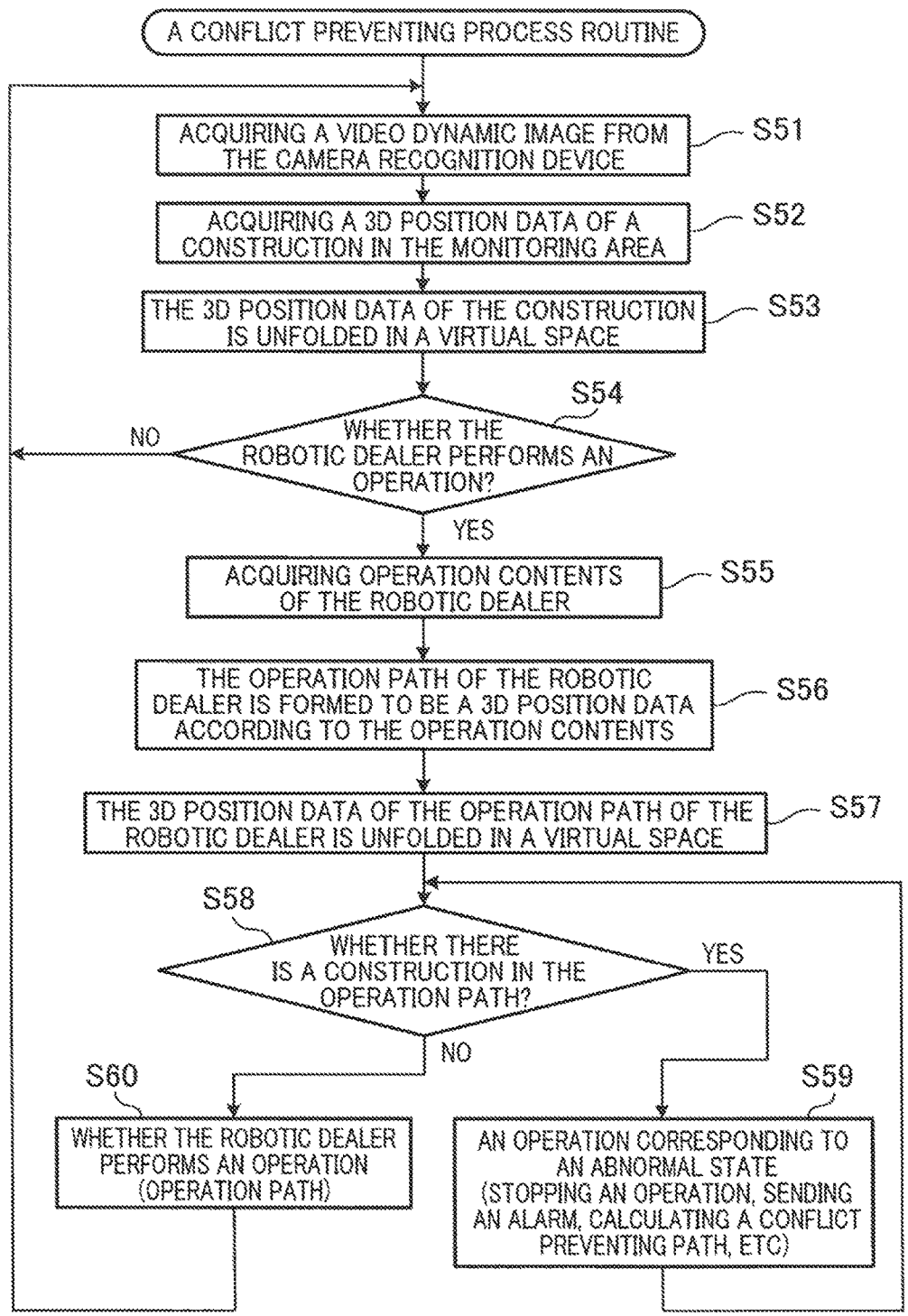
FIG. 24 is an illustrative view representing the states of an alarm boundary line and a stop boundary line.

Specifically, as shown in FIG. 24, when the main unit 101 performs the conflict preventing process routine, the video dynamic images taken by the camera devices 711 and 712 of the overlooking information acquiring device 71, the camera devices 611 and 612 of the safety information acquiring device 61, and other camera devices which are not shown are acquired (S51). Then, a 3D position data of the construction in the monitoring area is acquired according to the video dynamic image in advance, and the monitoring area is set to include the motion range of the robotic dealer 2. In addition, the construction in a part of the gaming machine 1, for example, the roulette device 3, the robotic dealer 2 and so on, and it is also the obstacle 111 such as a person and a component in addition to the gaming machine 1. The 3D data of the construction mentioned above is unfolded in the virtual space constructed in a memory. Therefore, a part of the gaming machine 1 and the obstacle 111 in the monitoring area are recovered virtually. In addition, in order to allow the managers to observe the construction in the virtual space, the construction in the virtual space is displayed in the management device 9.

Thereafter, it is determined whether the robotic dealer 2 performs an operation or not (S54). If the robotic dealer 2 does not perform an operation (S54: NO), a construction based on a new video operation is recovered virtually by re-performing the operation from S51.

If the robotic dealer 2 performs an operation (S54: YES), the operation contents of the robotic dealer 2 are acquired (S65). The operation of the robotic dealer 2 is formed to be the 3D position data according to the operation contents (S56). And the 3D position data is unfolded in the virtual space (S57). Therefore, in the virtual space of the monitoring area, a synthesis is performed for the operation path of the robotic dealer 2 and the construction. In addition, in order to allow the managers to observe the operation path of the robotic dealer 2 in the virtual space, it is displayed in the management device 9.

Next, it is determined whether the there is a construction as the obstacle 111 in the operation path or not (S58). That is to say, it is determined whether the respective factors such as the arms 21 and 22 of the robotic dealer 2 which move in the operation path collide with the obstacle 111. If there is no construction in the operation path (S58: NO), the robotic dealer 2 performs an operation (S60), re-performing from S1. Therefore, the robotic dealer 2 performs a normal operation as the operation path.

On the other hand, if there is a construction in the operation path (S58: YES), an operation corresponding to the abnormal state is performed (S59) because the robotic dealer 2 will collide with the obstacle 111. For example, the robotic dealer 2 is caused to stop the operation, sends a voice of warning, calculates a conflict preventing path, and so on. Then, re-performing operation from S58, and before the obstacle 111 is removed, the robotic dealer 2 is caused to stop operations thereof.

In addition, regarding the operation corresponding to the abnormal state, it is also set to be that the dynamic images of the robotic dealer 2 may change as the time of the abnormal state goes by. For example, if it is the first abnormal state, the robotic dealer 2 stops, and after the first time goes by, the robotic dealer 2 in the condition of being stopped outputs the alarm by the manner of the voice or the light, and after the second time goes by, the robotic dealer 2 performs a recover operation such as returning to the initial position. In addition, the operation corresponding to the abnormal state may change according to the type of the obstacle 111. For example, it may be that if the obstacle 111 is a human, it is preferably that, the robotic dealer 2 is caused to stop the action, and the operation stopping and the alarm voice occurring are performed at the same time, and if the obstacle 111 is an object, the operation is stopped first, and the alarm voice is output after a predetermined time.

(The Expression of Emotion of the Robotic Dealer 2)

The face of the robotic dealer 2 changes through the color and the blink of the illumination light such that the expression of emotion of the robotic dealer 2 is achieved. The structure is illustrated in the below.

Figure 26:
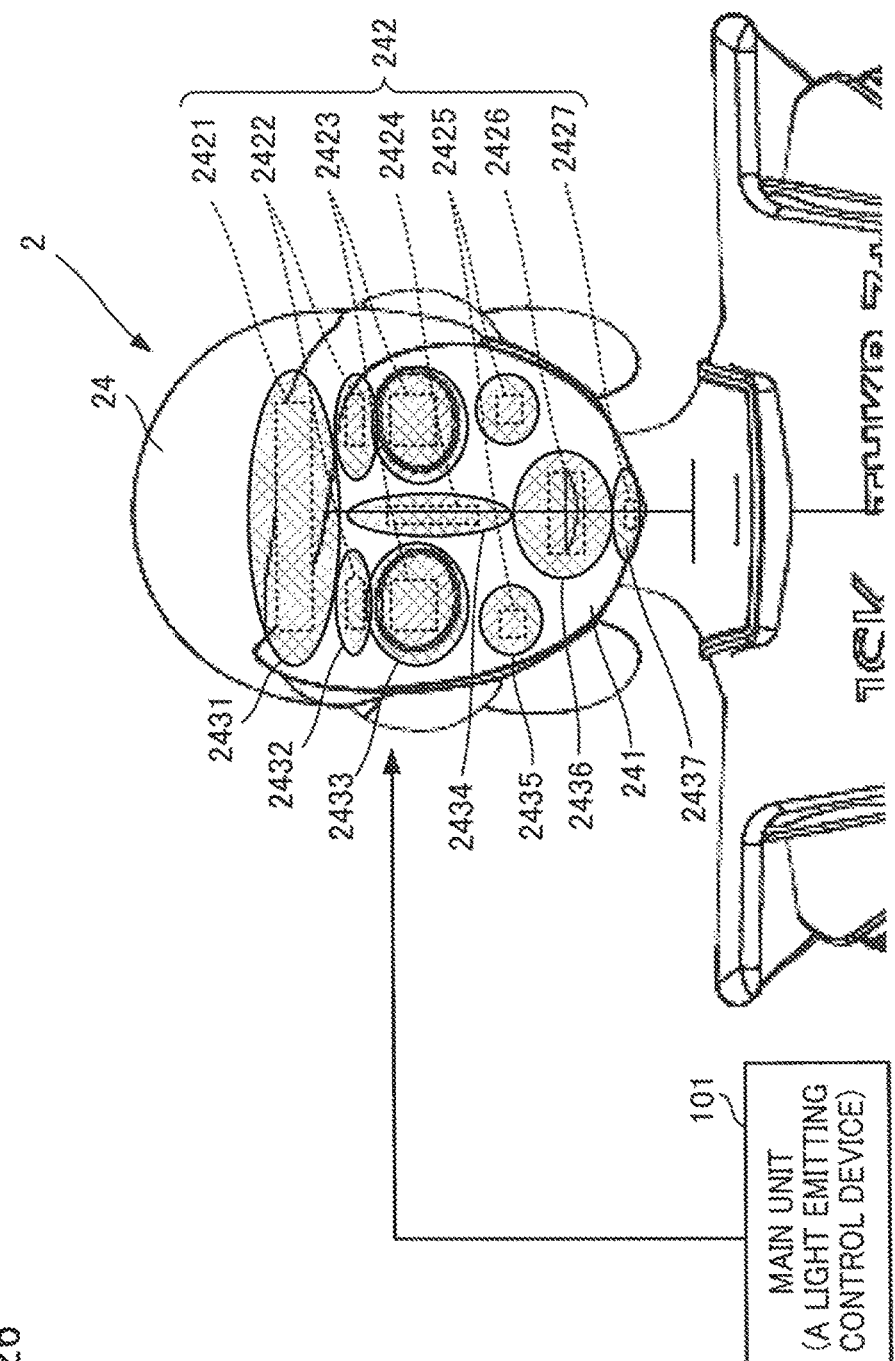
FIG. 26 is an illustrative view representing an expression lighted region of a face of a robotic dealer.

As shown in FIG. 26, the robotic dealer 2 has a face-formed-body 241 which forms a shape of face by the translucent resin, a light emitting device 242 which is configured inside of the face-formed-body 241 and is able to project the light with a variety of color switchably to any area of the face-formed-body 241, and the main unit 101 (the light emitting control device) which controls the light emitting device 242 and causes it to select the color of the light and the irradiation area of the face-formed-body 241 according to the different situation and project the light of the selected color into the selected irradiation area. The light emitting device 242 is set correspondingly to the respective areas and may adopt the full color LED and so on.

Therefore, the robotic dealer 2 selects the color of the light penetrating the face-formed-body 241 and the area penetrated by the light according to the different situation, and expresses the emotion with the color of the light and the area, and thus it is able to allow the game environment to approach to the atmosphere in which the operation is performed by the human dealer.

Specifically, the face-formed-body of the robotic dealer 2 has a forehead area 2431, an eye area 2433, a nose area 2434, a mouth area 2436, and a cheek area 2435. The main unit 101 selects the following various states according to the different situation, that are, a general state in which the eye area 2433 is irradiated by a blue light, a enjoyment state in which the eye area 2433 is irradiated by the blue light and the cheek area 2435 is irradiated by a pink light, a anger state in which the eye area 2433 is irradiated by the pink light, and a sadness state in which the forehead area 2431 is irradiated by the blue light. Therefore, the robotic dealer 2 is able to achieve abundant expressions of emotion with the color of the light and the irradiated area. In addition, it is preferably that, the main unit 101 blinks the mouth area 2436 with the blue light when the robotic dealer 2 is uttering. In this condition, the state of the utterance when various emotions are expressed may be represented by the blue light of the mouth area 2436.

Wherein, regarding the "irradiated area", the dividing manner of the areas is to perform the expression of the various emotions, and there is no particular definition, however it is preferably that, it is divided to be the eye area 2433, a brows area 2432, the nose area 2434, the cheek area 2435, the mouth area 2436 and a mandible area 2437. In addition, it is preferably for the light emitting device 242 that, the light emitting devices 2421, 2422, 2423, 2424, 2425, 2426, and 2427 are disposed approximately in the center part of the respective areas 2433, 2432, 2435, 2436, and 2437 independently. In the condition that the irradiated area is divided into the above areas 2432-2437, the robotic dealer 2 may be allowed to have the expression or micro expression corresponding to the type of the emotion by the combination of the areas 2431-2437.

In addition, as mentioned above, the "micro expression" refers to an expression which changes instantaneously in a certain time, for example 0.25 second, in a partial area of face of a person according to the different types of emotion. Therefore, when the robotic dealer 2 outputs the micro expression, the illumination is provided to the irradiated area consisted of the combination of the areas 2431-2437 in a certain time (for example, 0.25 seconds), or the color of the illumination light is caused to change.

(The Relationship Between the Expression/Micro Expression and the Type of the Emotion)

As shown in FIG. 27, the expression and micro expression are the expression that a partial area of the face changes because of the different types of the emotion. Besides, the "micro expression" refers to the expression which changes instantaneously in a certain time, for example 0.25 second, in a partial area. For example, the expression or micro expression of "disgust" refers to the action of the skin of the nose pursing up. The expression or micro expression of "fear" refers to the combination of the following action, that are, an action of the brows rising, an action of the brows gathering toward the middle, an action of eyes opening greatly, an action of the blephar putting forth its strength, and an action of the corners of mouth transverse stretching. The expression or micro expression of "anger" refers to the combination of the following action, that are, an action of the brows gathering toward the middle, an action of eyes opening greatly, an action of the blephar putting forth its strength, and an action of the lips closing tightly, and an action of opening the mouth.

The expression or micro expression of "happiness" refers to the combination of both the action of cheeks rising and the corners of mouth rising, or just the action of the corners of mouth rising. The expression or micro expression of "sadness" refers to the combination of the following action, that are, an action of the inside of the brows rising, an action of the brows gathering toward the middle, an action of the corners of mouth drooping downward, and an action of the lower lip pouting upward. The expression and micro expression of "contempt" refers to an action of the corner of one side of mouth rising. The expression or micro expression of "astonishment" refers to the combination of the following action: an action of the brows rising, an action of eyes opening greatly, and an action of opening mouth.

In the present embodiment, the main unit 101 conserves the data table, and in the data table, an association is built between the types of emotion of FIG. 27 and the action of the respective area of the expression. Besides, the main unit 101 allows the association between the respective actions of the expression or micro expression and the light amount, the light color, and the irradiated area of the illumination light to be built, and is able to allow the personage seeing the irradiated state from outside to associate the respective actions by controlling the light emitting device 242. For example, if it is the action of "eyes opening greatly", the area of the illumination light of the eye area 2433 increases.

In addition, it is preferably that, the main unit 101 changes the light amount, the light color, and the irradiated area of the illumination light according to the game state, which allows a person to associate the respective actions of the expression or micro expression. For example, there is the foreign object 110 presented in the alarm boundary area 31B of FIG. 20, and there is the foreign object 110 presented in the stop boundary area 31A, and in the both condition, even if the expression or micro expression of "astonishment" is represented as well, the stop boundary area 31A may be set to be a more important condition than the alarm boundary area 31B such that the light emitting device 242 increases its light intense or changes its light color.

Besides, the main unit 101 may also cause the robotic dealer 2 to perform the operation of FIG. 5 corresponding to the type of the emotion while controlling the light emitting device 242 according to the change of the game state. For example, in the condition that there is the foreign object 110 presented in the alarm boundary area 31B, the light emitting device 242 may be controlled to show the expression or micro expression of "astonishment", and in the condition that there is the foreign object 110 presented in the stop boundary area 31A, the light emitting device 242 may be controlled to show the expression or micro expression of "astonishment" while the robotic dealer 2 is caused to perform an action of shoulders lifting and an action of taking a deep breath. In addition, the expression and micro expression may be preferably switched according to the different condition. For example, when a game result such as the roulette ball 33 is accepted in the pocket occurs just now, the robotic dealer 2 may be controlled to show the micro expression and then show the general expression, and when a person such as a player performs a general conversation, the robotic dealer 2 may be controlled to show an expression.

(The Reception Device)

In the above description, the present invention is illustrated with the robotic dealer 2 and the gaming machine 1, however the present invention is not limited thereto. That is to say, the present invention is a reception device, which may has an operation device which performs a variety of operations, a camera device taking the dynamic images for the peripheral area of the operation device, and a control device analyzing the action of the personage presented in the peripheral area according to the dynamic images of the peripheral area taken by the camera device and performing a control to cause the operation device to perform the operation corresponding to the analysis result.

Wherein, as the "reception device", in addition to the gaming machine used in the playground, the example thereof may further comprises a customer service device used in the place such as a hotel, a mall, a shop, a post office, a bank, and a ticket office, a nursing device used in a hospital, a nursing care device used in a nursing agency, and so on. That is to say, the present invention may be applied to a variety of facility. In addition, as the "operation device", in addition to the robotic dealer, the example thereof may further comprises a customer service robot, a nursing robot and a nursing care robot.

According to the above structure, because the operation device performs a variety of operations corresponding to the analysis result for the personage presented in the peripheral area thereof, it is able to allow the environment of the reception device to approach to the atmosphere of the human operation.

In addition, the present invention is a reception device, which may has an operation device which performs a variety of operations, a camera device taking the dynamic images for the operation area of the operation device, and a control device determining whether there is an abnormal condition in the operation area according to the dynamic images taken by the camera device, and if it is determined that there is an abnormal condition, a control is performed to cause the operation device to perform the operation corresponding to the abnormal condition.

According to the above structure, because the operation device performs the operation corresponding to the abnormal condition, it is able to allow the environment of the reception device to approach to the atmosphere of the human operation.

In addition, the present invention is a reception device, which comprises an operation device performing a variety of operations, an obstacle checking device checking the obstacle in the monitoring area which includes the motion range of the operation device, and a control device simulating the operation path of the operation device in advance before the operation device performs an action and during the process of performing the action, and if there is an obstacle in the simulated operation path, a control is performed to cause the operation device to perform the operation corresponding to the abnormal state.

According to the structure mentioned above, before the operation device performs an action and during the process of performing the action, if the obstacle is presented on the operation which is simulated in advance, it is able to prevent the operation device colliding with the obstacle by causing the operation device to perform the operation corresponding to the abnormal state.

In addition, the present invention is an operation device, which comprises a face-formed-body which forms a shape of face by the translucent resin, a light emitting device which is configured inside of the face-formed-body and is able to project the light with a variety of color switchably to any area of the face-formed-body, and a light emitting control device which controls the light emitting device and causes it to select the color of the light and the irradiation area of the face-formed-body according to the different situation and project the light of the selected color into the selected irradiation area.

According to the above structure, the color of the light penetrating the face-formed-body and the area penetrated by the light are selected according to the different situation, and the emotion is shown with the color of the light and the area, and thus it is able to allow the environment to approach to the atmosphere of the human operation.

The Second Embodiment

The second embodiment of the present invention will be illustrated according to the drawings as follows.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A gaming machine according to an embodiment of the present invention is described with reference to FIG. 28 to FIG. 36.

Figure 28:
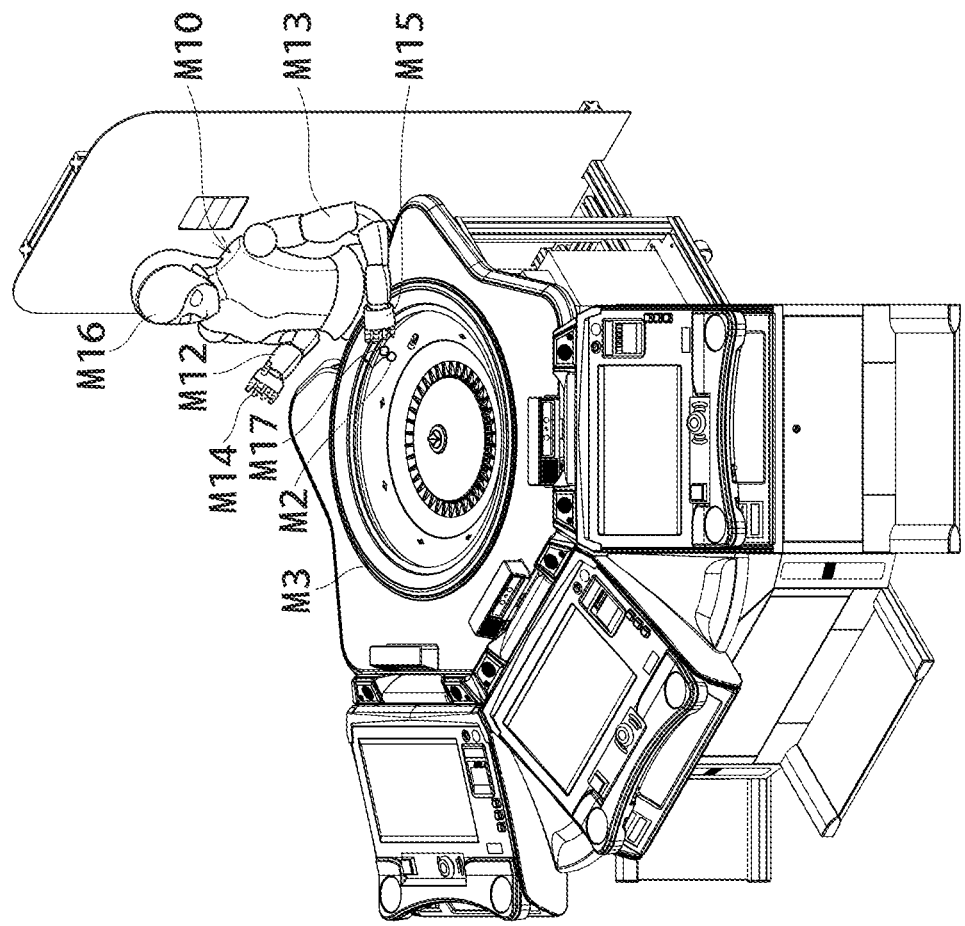
FIG. 28 is a schematic perspective view of a gaming machine according to an embodiment of the present invention.
Figure 29:
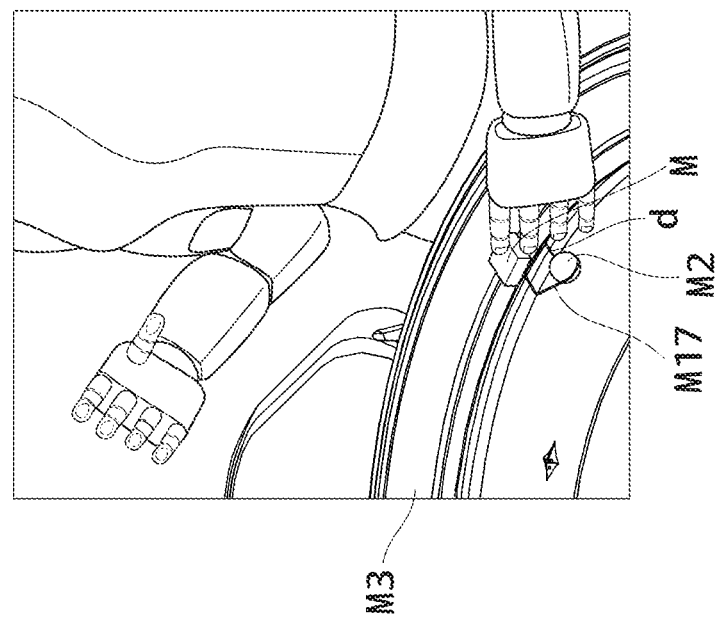
FIG. 29 is an expanded partial view of the gaming machine shown in FIG. 28.
Figure 30:
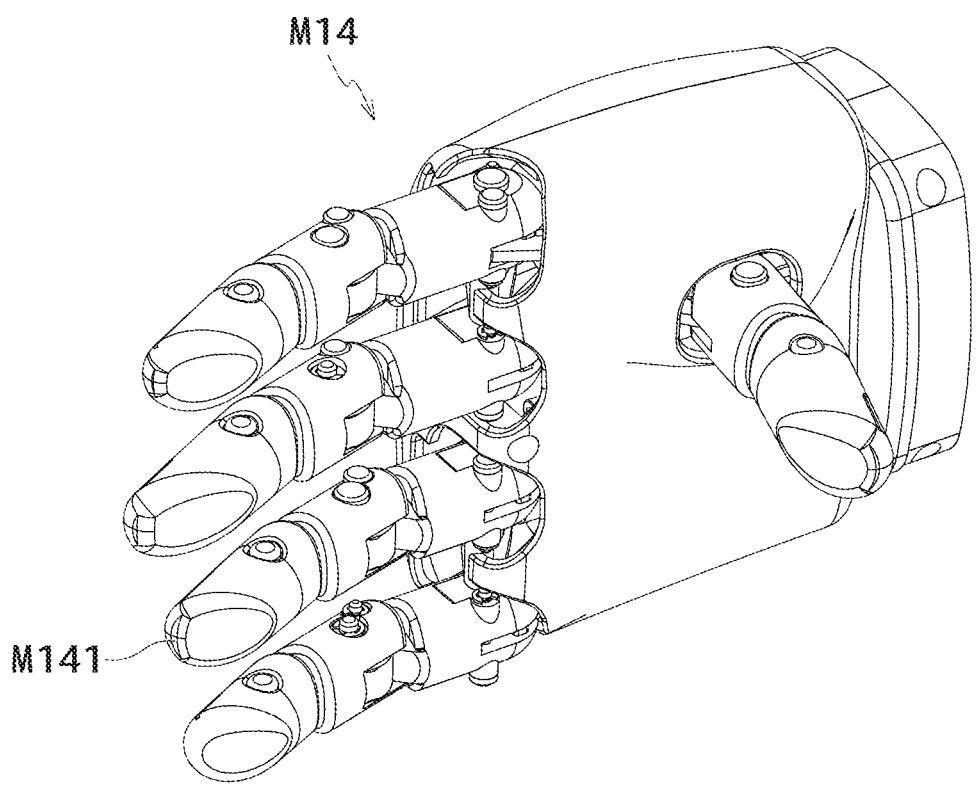
FIG. 30 is a schematic perspective view of a right hand of a gaming machine according to an embodiment of the present invention.
Figure 31:
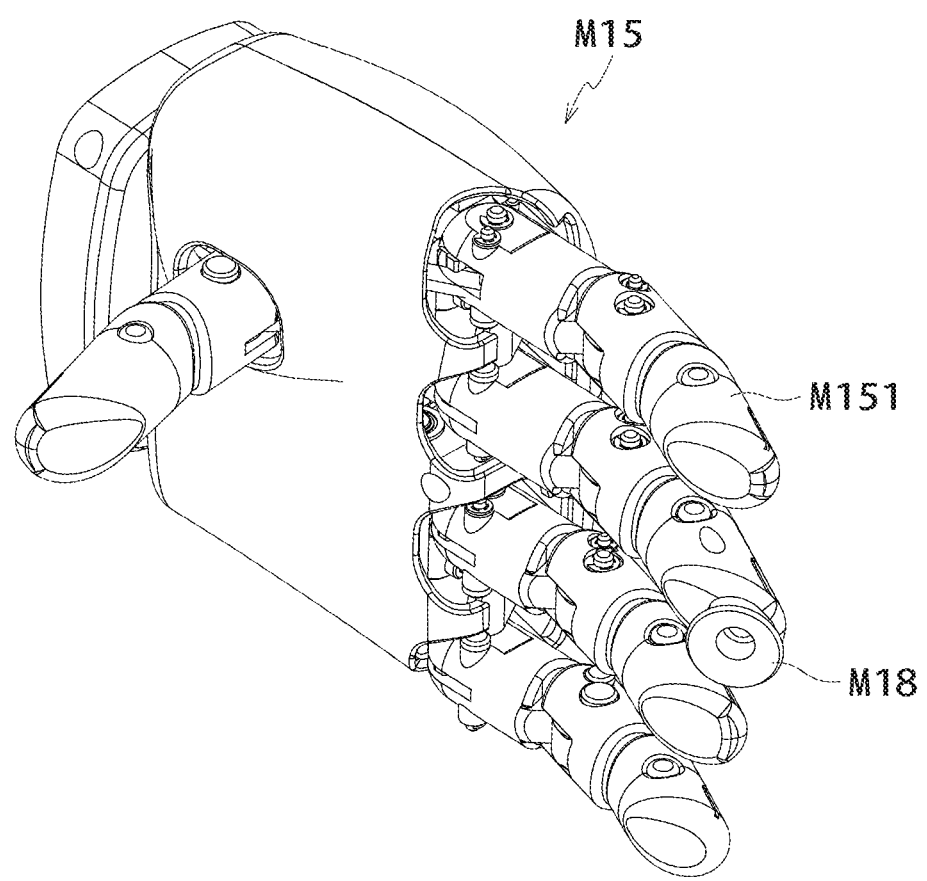
FIG. 31 is a schematic perspective view of a left hand of a gaming machine according to an embodiment of the present invention.
Figure 32:
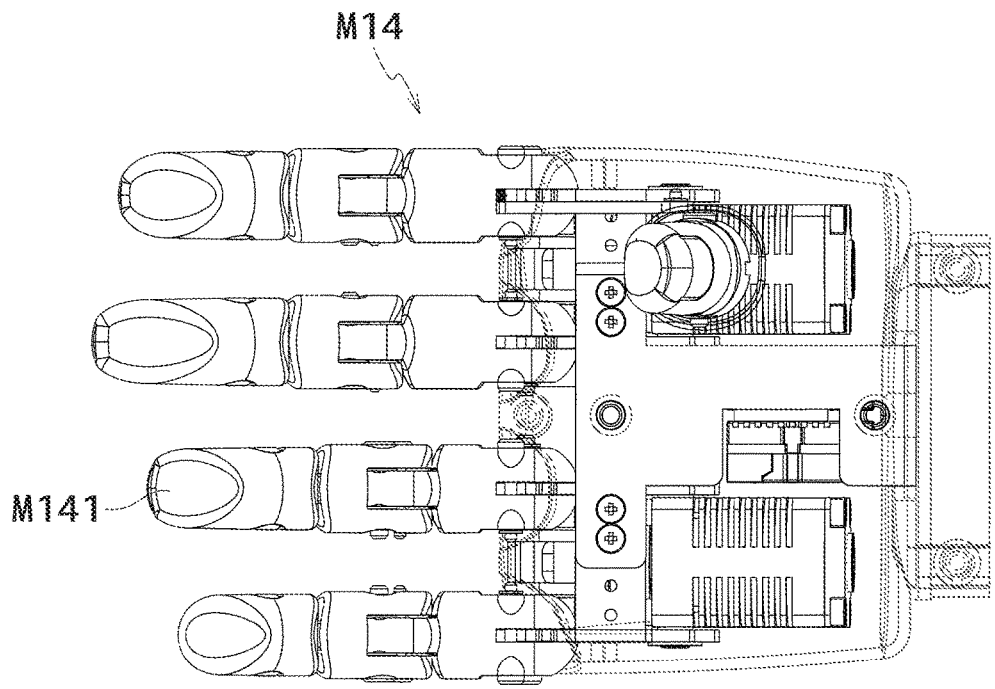
FIG. 32 is a schematic front view of the right hand of a gaming machine according to an embodiment of the present invention.
Figure 33:
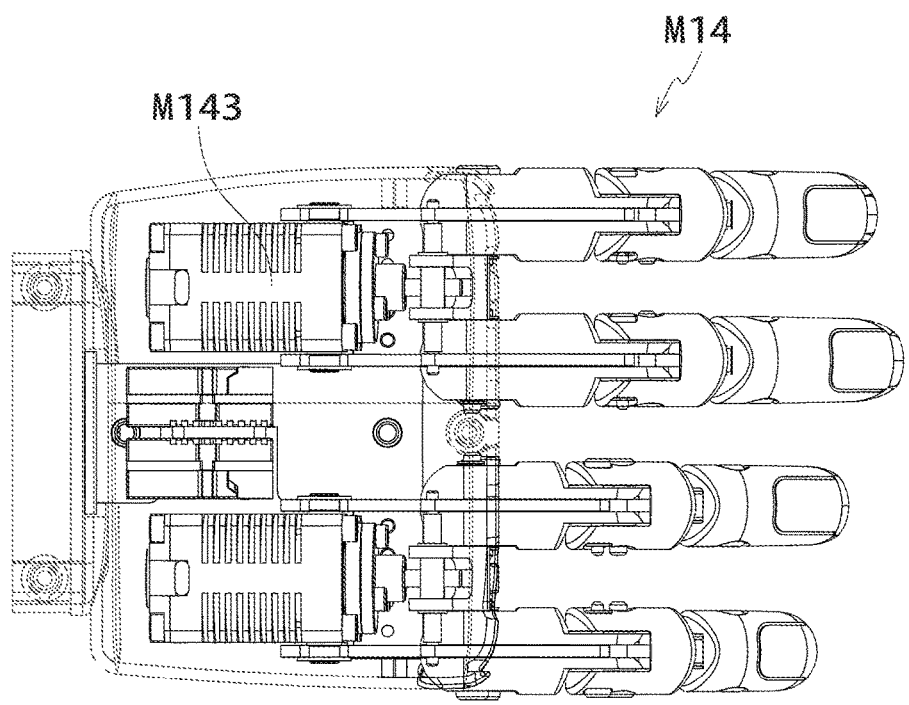
FIG. 33 is a schematic rear view of the right hand of a gaming machine according to an embodiment of the present invention.
Figure 34:
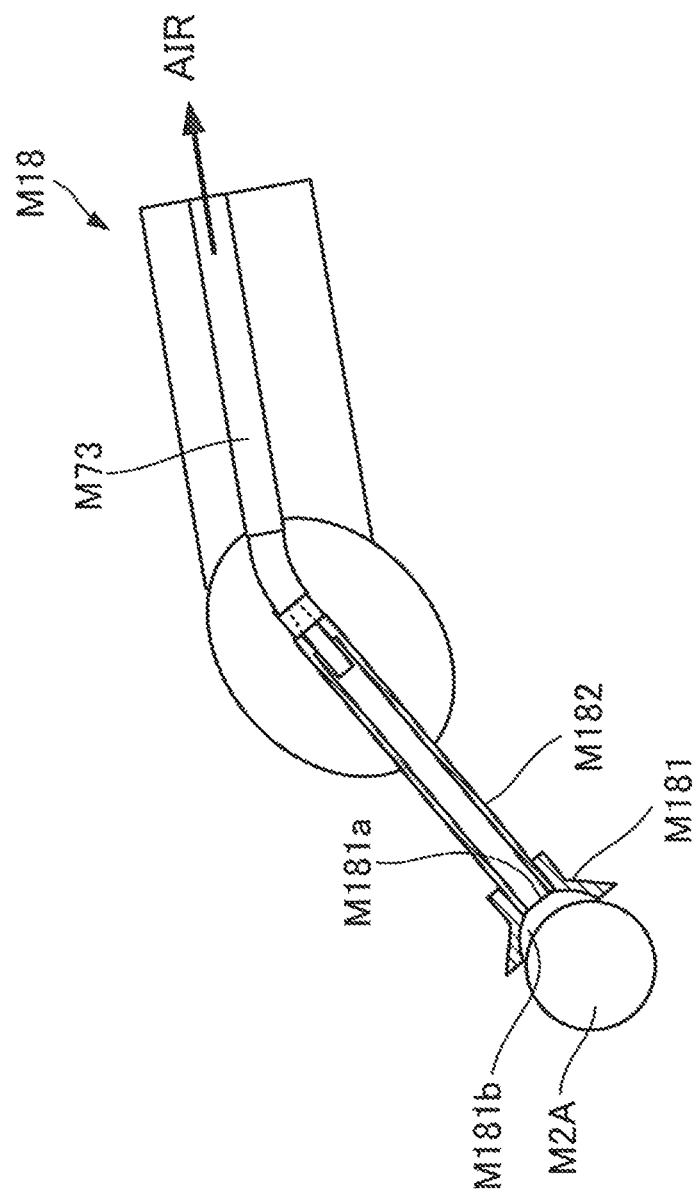
FIG. 34 is a schematic sectional view of an object holder on the left hand of a gaming machine according to an embodiment of the present invention.
Figure 35:
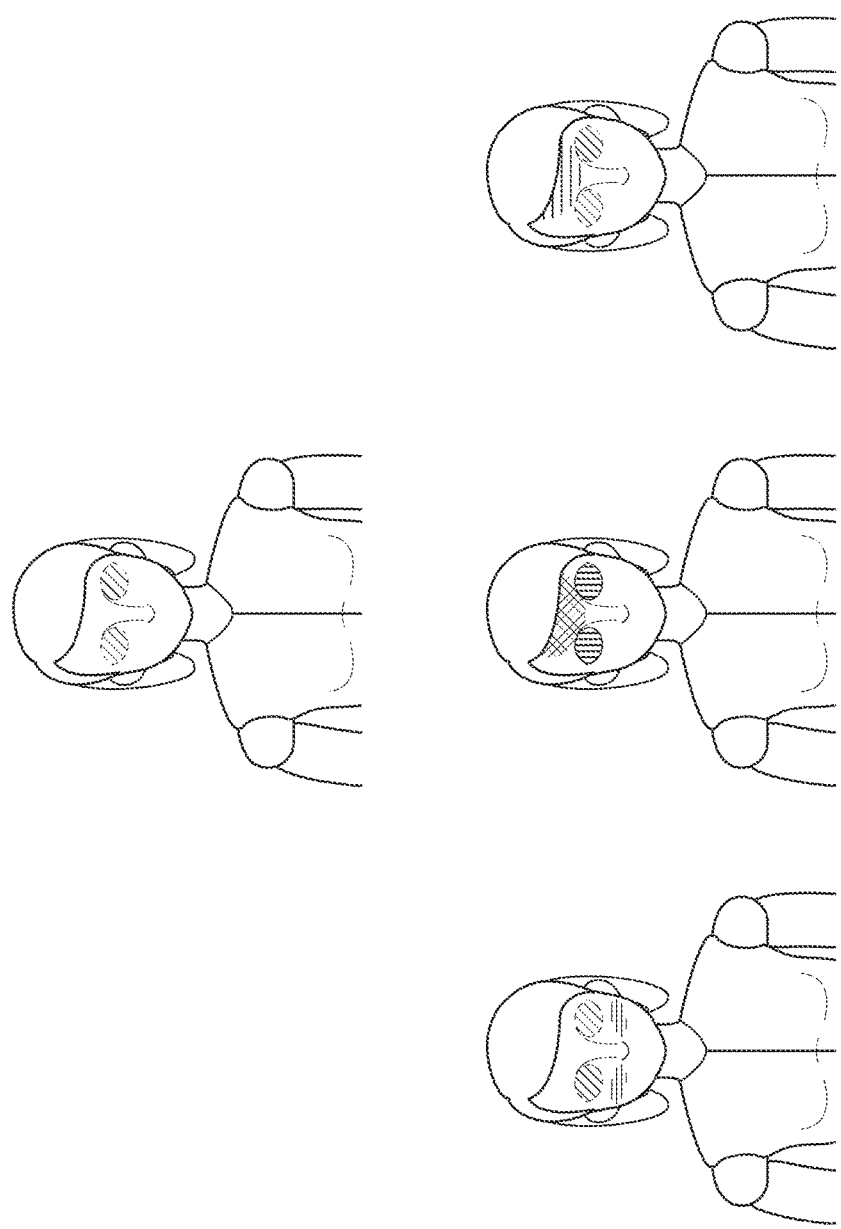
FIG. 35 illustrates facial expressions of a game dealer device according to an embodiment of the present invention.

FIG. 28 is a schematic perspective view of a gaming machine according to an embodiment of the present invention, FIG. 29 is an expanded partial view of the gaming machine shown in FIG. 28, FIG. 30 is a schematic perspective view of a right hand of a gaming machine according to an embodiment of the present invention, FIG. 31 is a schematic perspective view of a left hand of a gaming machine according to an embodiment of the present invention, FIG. 32 is a schematic front view of the right hand of a gaming machine according to an embodiment of the present invention, FIG. 33 is a schematic rear view of the right hand of a gaming machine according to an embodiment of the present invention, FIG. 34 is a schematic sectional view of an object holder on the left hand of a gaming machine according to an embodiment of the present invention, and FIG. 35 illustrates facial expressions of a game dealer device according to an embodiment of the present invention.

Referring to FIG. 28, a gaming machine M1 according to an embodiment of the present invention includes a game dealer device M10, a game device M3 such as a roulette device, and a plurality of player stations PS.

Referring to FIG. 29, the roulette device M3 includes a ball holder M17 disposed near a spinning rail. The ball holder M17 may be made of a bent piano string and connected to a motor M such that the ball holder M17 can rotate around an rotation axis of the motor M to change its position. The ball holder M17 may be configured such that a ball on the ball holder M17 may be spaced apart from the spinning rail by a distance d greater than a diameter of the roulette ball M2.

Referring to FIG. 28 again, the game dealer device M10 handles a game object M2 used for a game such as roulette. The game dealer device M10 is a substitute for a human dealer.

The game dealer device M10 includes a right arm M12, a left arm M13, and a body M11. The arms M12 and M13 has a degree of freedom corresponding to an elbow and a wrist of a human body. The arms M12 and M13 are coupled to the body M11 at a position of shoulders of a human body.

The right arm M12 includes a handling part M14, for example, a hand-like mechanism with a plurality of fingers M141, and each pair of adjacent fingers M141 may be driven by a motor M143. The left arm M13 also includes a handling part M15, for example, a hand-like mechanism with a plurality of fingers M151, which handles the game object M2. The handling part M15 of the left arm M13 includes an object holder M18 that holds the game object M2 by means of pressure reduction. The object holder M18 may be disposed at a tip of a finger M151 of the hand M15, and The object holder M18 includes a cylindrical member M182 and an sucker M181 touching the roulette ball M2A and disposed at the tip of the cylindrical member M182. The cylindrical member M182 is connected to an air compressor (not shown). The sucker M181 includes a sucking face M181b contacting the ball M2 and an inhale hole M181a that is open to the sucking face M181b. The inhale hole M181a is air-communicated to the air compressor through the cylindrical member M182. A part of the sucker M181 contacting the ball M2A includes elastic material. The game dealer device M10 places the ball M2 attached to the ball holder M18 on the ball holder M17 of the roulette device M3 by approaching the attached ball M2 to the ball holder M17 and stopping the air inhale. The game dealer device M10 may make the ball M2 start spinning along the spinning rail by striking the ball M2 on the ball holder M17 of the roulette device M3 into the spinning rail. According to another embodiment, the ball M2 on the ball holder M17 may be pushed out to the spinning rail by moving or rotating the ball holder M17.

The arms M12 and M13 are configured to move the handling parts M14 and M15 in a three-dimensional space. The body M11 includes a head M16 that may move left and right. The body M11 may change its posture by rotating and/or moving forward and backward.

Referring to FIG. 35, the head M16 may include a translucent face and may include a luminant therein for expressing emotion. The luminant includes a plurality of color light sources, and may emit different color lights for different situations. For example, the light sources may be disposed at the eyes, the cheeks, and the forehead. The eyes of the head M16 may be sky blue in a normal situation. The cheeks may become red when expressing pleasure, and the forehead may become deep blue when expressing sorrow. When expressing anger, the eyes may become orange, and the forehead may become red.

Figure 36:
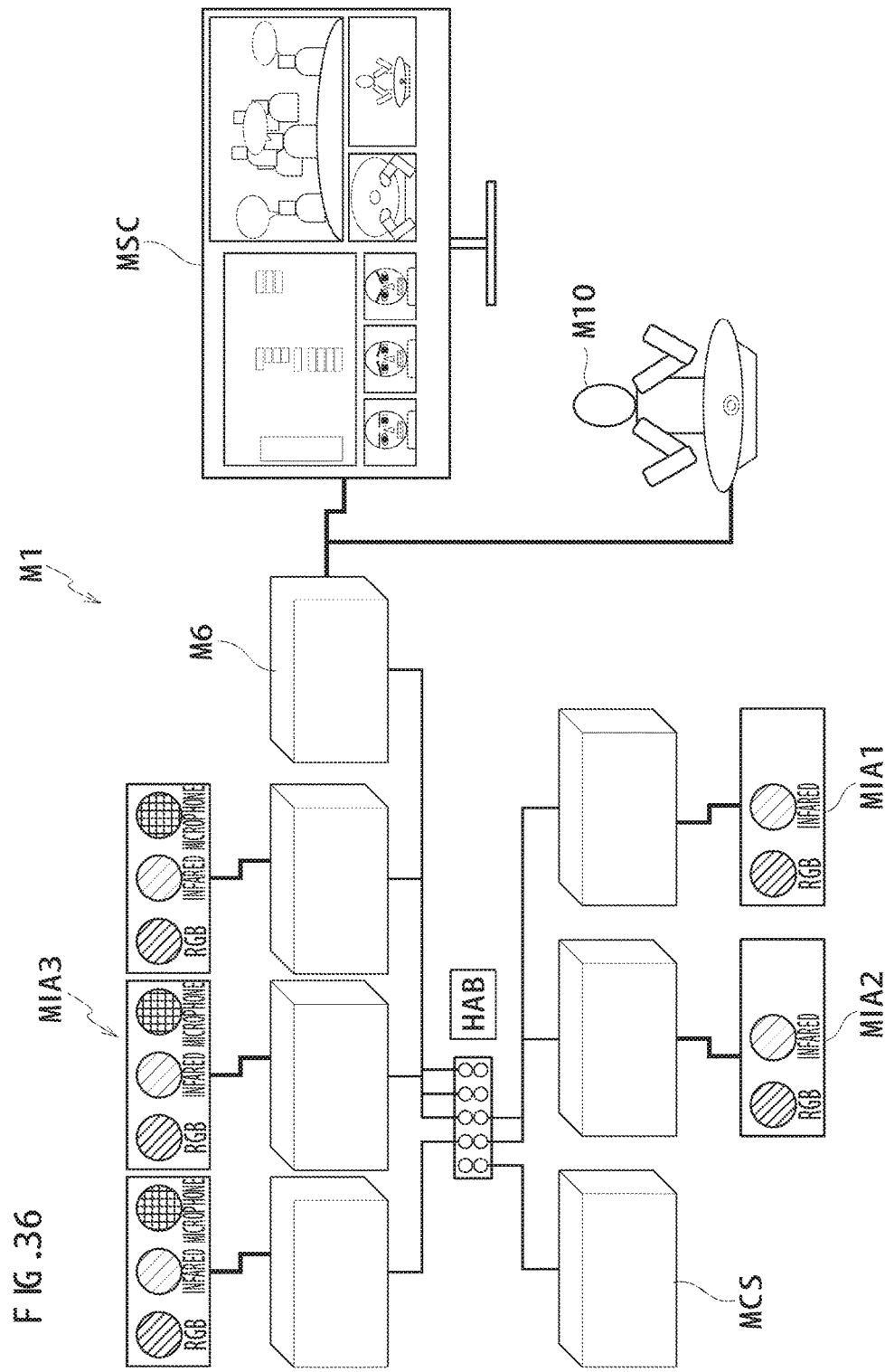
FIG. 36 is a schematic block diagram of a gaming machine according to an embodiment of the present invention.
Figure 37:
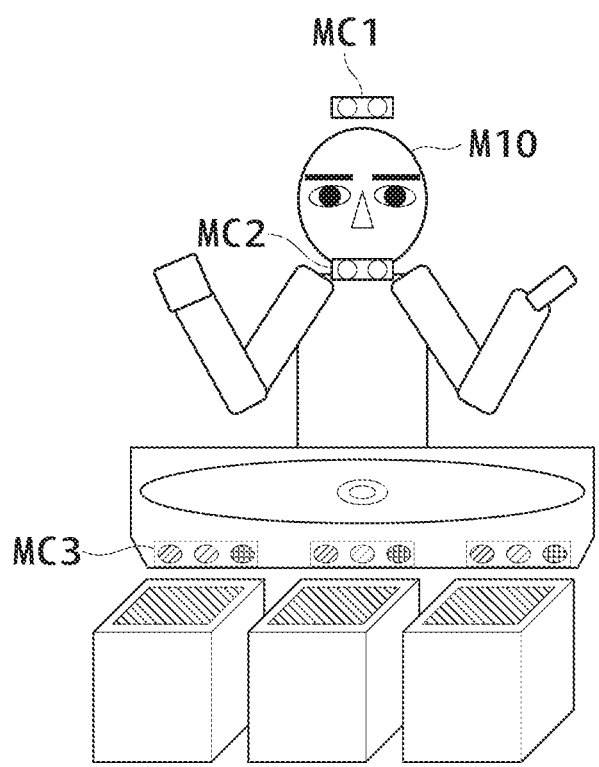
FIG. 37 is a schematic perspective view of a gaming machine according to an embodiment of the present invention.
Figure 38:
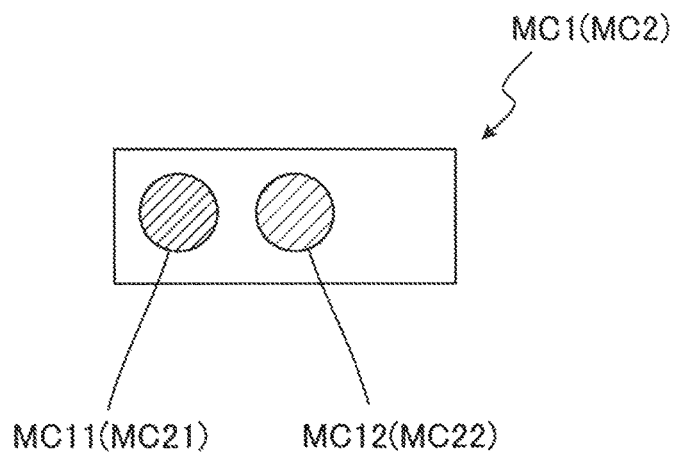
FIG. 38 is a schematic view of an information acquiring unit according to an embodiment of the present invention.

Referring to FIG. 36, the gaming machine M1 further include a plurality of information acquiring units MIA1, MIA2, MIA3 that acquires various external information such as voice, posture, motion, facial expression, etc. The gaming machine M1 further includes a conversation server MCS, and a controller M6, and the information acquiring units MIA1, MIA2, MIA3, the conversation server MCS, and the controller M6 are connected to a hub HUB. The gaming machine M1 further includes a monitor MSC showing the situation or the status of the players, the image of the game area, 3D simulator, etc. The monitor MSC is connected to the controller M6.

According to an embodiment of the invention, the information acquiring units MIA1, MIA2, MIA3 may include at least one of an overview (or kite) camera set MC1, a game area camera set MC2, and a plurality of player camera sets MC3.

Figure 39:
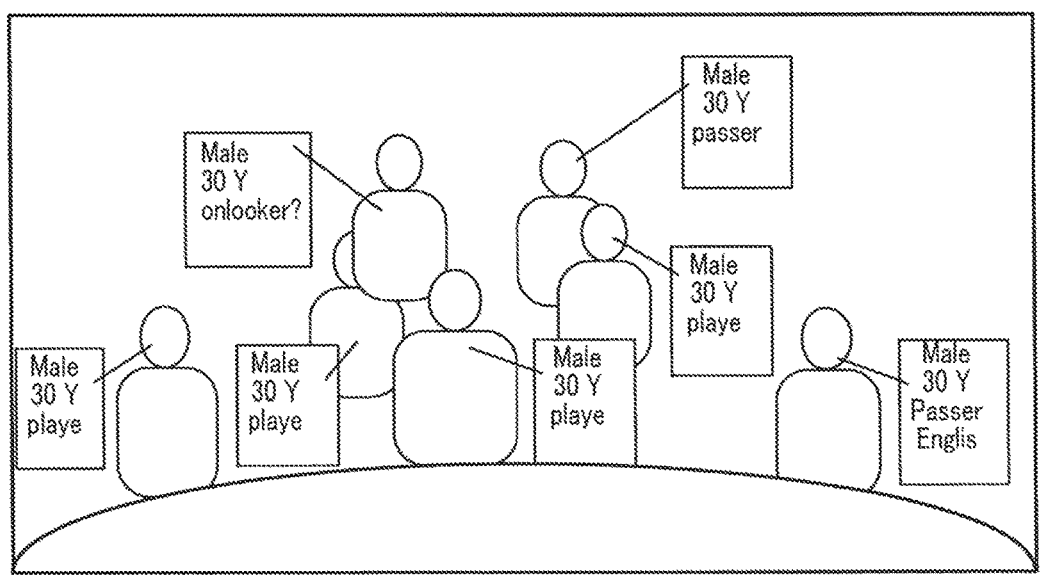
FIG. 39 is a picture taken by an overview camera unit according to an embodiment of the present invention.
Figure 40:
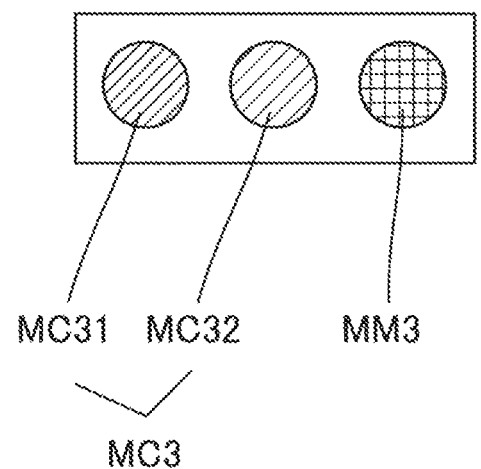
FIG. 40 is a schematic view of an information acquiring unit according to an embodiment of the present invention.

The overview camera set MC1 may be disposed over the game dealer device M10, and may take pictures of the station area (FIG. 39). The overview camera set MC1 reads and interprets the image to determine the number, the positions, and the behaviors of the guests. The overview camera set MC1 captures and sends the application images to the controller M6. The overview camera set MC1 may include an RGB camera MC11 and an ultra-red camera MC12.

The game area camera set MC2 may be disposed at the forehead of the game dealer device M10, and may take pictures of a game area, for example, a roulette table. The game area camera set MC2 may include an RGB camera MC21 and an ultra-red camera MC22.

Figure 41:
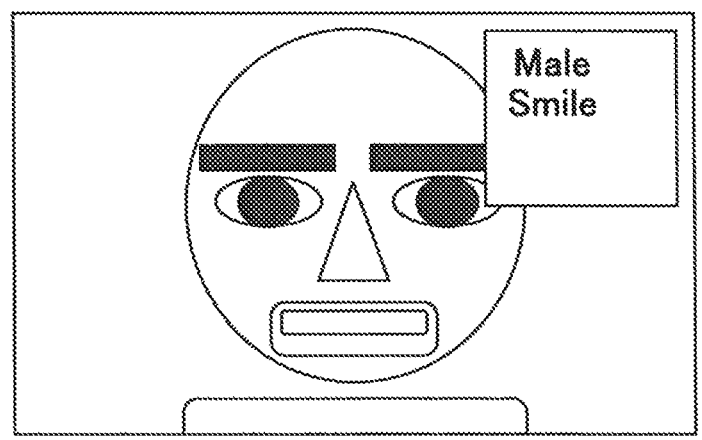
FIG. 41 is a picture taken by an player camera unit according to an embodiment of the present invention.

The player camera set MC3 may be disposed at the player station with facing the player, and may take pictures of the face of the player (FIG. 41). The player camera set MC3 reads and interprets the image to determine the emotion, the gender, the conversation of the player. The player camera set MC3 captures and sends the application images to the controller M6. The player camera set MC3 may include an RGB camera MC31 and an ultra-red camera MC32.

The information acquiring unit MIA3 may further include a microphone acquiring voices disposed at each station and acquiring voices of the player. The microphone recognizes voice and converts the voice into texts to be sent.

The gaming machine may further include a speaker unit including a digital amplifier amplifying a voice signal and a speaker 512 converting the voice signal into sound.

The controller M6 may acquires player information based on the pictures of the players taken by the camera sets MC1, MC2, MC3 and the voices of the players taken by the microphone, and may output the acquired player information to the monitor and the dealer device M10.

The controller M6 is configured to communicate with the dealer device in serial communication and to control the motions of the arms M12 and M13 and the body M11.

The controller M6 is connected to an I/O box (not shown) including an input and an output. The I/O box is connected to an air compressor (not shown) including an air control valve, etc. The air compressor is connected to the holder M18 of the handling part M15 through an air pipe M182, and is configured to inhale air. The controller M6 controls the air control vale of the air compressor to operate the holder M18 at a proper time. In detail, the handling part M15 approaches to the game object (roulette ball) M2 after the game object M2 stops, and the holder M18 contacts the game object M2. Thereafter, the air compressor inhales the air through the air pipe to attach the game object M2 to the holder M18.

Now, an operation of the gaming machine is described with reference to FIG. 42 to FIG. 46.

Figure 42:
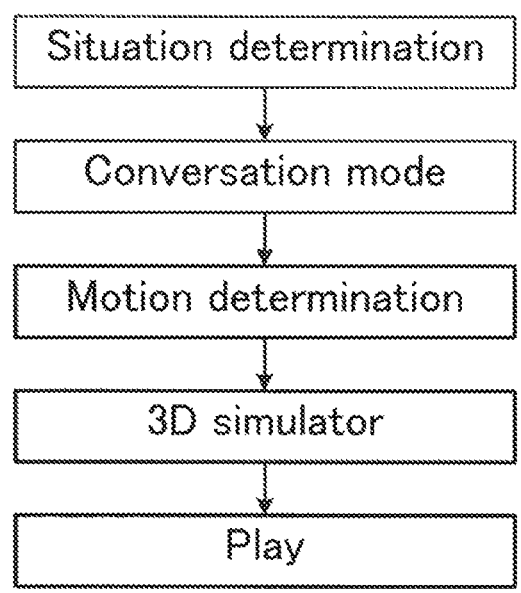
FIG. 42 is a flow diagram illustrating an operation of the gaming machine according to an embodiment of the present invention.

According to an embodiment of the present invention, the controller M6 performs situation determination, conversation mode, motion determination, 3D simulation, and play as shown in FIG. 42.

Figure 43:
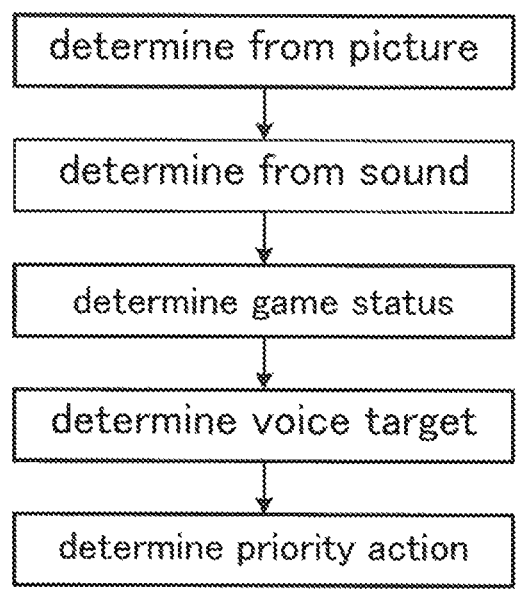
FIG. 43 is a flow diagram illustrating an partial operation of the gaming machine according to an embodiment of the present invention.

Referring to FIG. 43, during the situation determination, the controller M6 determines a situation of an object from the pictures taken by the camera unit. In detail, the controller M6 determines a guest type from the pictures taken by the overview camera set MC1. For example, the number and the positions of the guest are determined by analyzing the pictures taken by the RGB camera MC11 and using the ultra-red camera MC12, and the conversation partner of the guest is determined by analyzing the pictures taken by the RGB camera MC11 and considering the direction of a microphone.

Thereafter, the controller M6 determines the situation of the object based on the action history. For example, the motion of the guest may be analyzed step by step. The controller determines whether the guest walks, stops in front of the dealer device, approaches, looks at, and talks, etc., and then determines the situation of the guest.

The controller M6 may also determine the situation from the pictures taken by the player camera set MC3. For example, the controller M6 determines the emotional condition of the player based on the facial expression determined by interpreting the pictures from the RGB camera MC21, the body temperature by analyzing the ultra-red pictures from the ultra-red camera MC22, and the reaction by analyzing picture status change.

The controller M6 may further determine the situation from the pictures taken by the game area camera set MC2.

The controller M6 also determines the situation of the object from sound or voice input to the microphone. The voice input may be converted into texts.

The controller M6 may determine the game status of the player, for example, win or loss, the number of successive wins or losses, and so on.

The controller M6 may determine the voice target, and may determine a priority action. When determining the priority action, the screen may be changed to include AUDIT as shown in FIG. 44.

Figure 45:
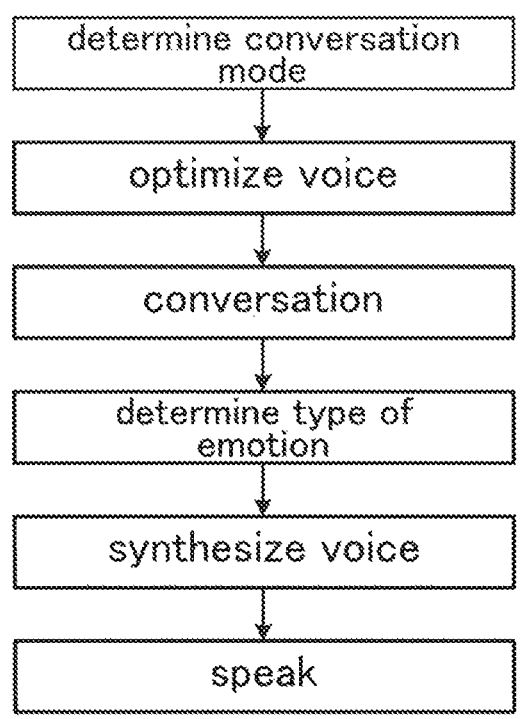
FIG. 45 is a flow diagram illustrating an partial operation of the gaming machine according to an embodiment of the present invention.

Referring to FIG. 45, in the conversation mode, the controller M6 may determine a type of the conversation mode. The type may include free talk, game talk, and talking about information. The controller M6 may analyze the text and optimize voice for the conversation mode. Thereafter, the controller M6 may search for conversation using a conversation database, and determines the type of emotion. Subsequently, the controller M6 synthesizes voice and writes and interprets voice data. Finally, the controller M6 makes voice, that is, speaks.

Figure 46:
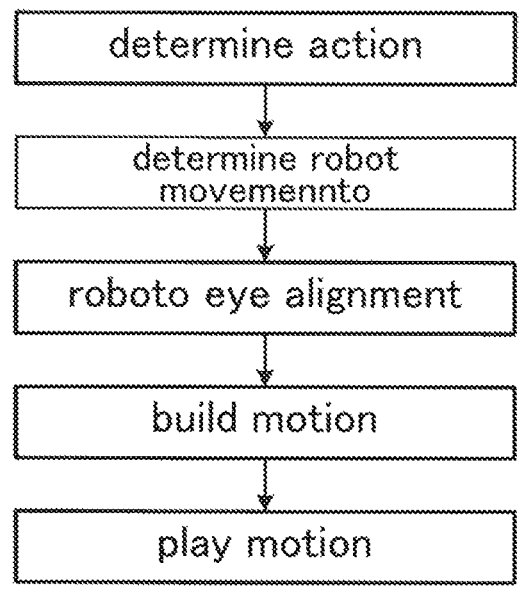
FIG. 46 is a flow diagram illustrating an partial operation of the gaming machine according to an embodiment of the present invention.

In the motion determination shown in FIG. 46, the controller M6 determines an action of the game dealer device or robot M10. The controller M6 may determine the movement of the robot M10 by analyzing the voice data and determining the motion. The controller M6 may align the eyes of the robot M10 with the player, the game area, or other object. Then the controller M6 may synthesize the motion considering the motion collision, writes the motion, and builds the motion. The controller M6 may allocate the player, receive the motion and make the robot M10 play the motion.

The voice data may be synthesized with the motion in the conversation mode.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The above embodiments thus described solely serves as specific examples of the present invention, and the present invention is not limited to such examples. Specific configurations of various means may be suitably designed or modified. Further, the effects of the present invention described in the above embodiments are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

LABELS DECLARATION 1 gaming machine
2 robotic dealer 3 roulette device
4A-4C terminal devices
5 utterance recognition device
5A, 5B player analyzing devices
6 safety camera recognition device
7 overlooking camera recognition device
8 CAIWA server
9 management device
61 safety information acquiring device
62 roulette state camera unit
71 overlooking information acquiring device

What is claimed is:

1. A gaming machine, comprising:
a dealer replacement device which is used to perform a variety of operations including a handling operation for a gaming equipment used in a game;
an obstacle checking device which is used to check whether an obstacle exists in a monitoring area, and the monitoring area includes an operation range of the dealer replacement device; and
a control device which simulates an operation path of the dealer replacement device in advance before the dealer replacement device performs an operation and during a process of performing the operation, and if there is the obstacle in the operation path which is simulated, performs a control to cause the dealer replacement device to perform an operation corresponding to an abnormal state,
wherein the control device performs the control to cause the operation device to simultaneously perform a plurality of operations corresponding to the abnormal state of a first type when the abnormal state is the first type, and
wherein the control device performs the control to cause the operation device to simultaneously perform a plurality of operations corresponding to the abnormal state of a second type when the abnormal state is the second type different from the first type.

2. A reception device, comprising:
an operation device which is used to operate a variety of operations;
an obstacle checking device which is used to check whether an obstacle exists in a monitoring area, and the monitoring area includes an operation range of the operation device; and
a control device which simulates an operation path of the operation device in advance before the operation device performs an operation and during a process of performing the operation, and if there is the obstacle in the operation path which is simulated, performs a control to cause the operation device to perform an operation corresponding to an abnormal state,
wherein the control device performs the control to cause the operation device to sequentially perform different operations corresponding to the abnormal state as time of the abnormal state goes by, wherein the control device performs the control to cause the operation device to simultaneously perform a plurality of operations corresponding to the abnormal state of a first type when the abnormal state is the first type, and
wherein the control device performs the control to cause the operation device to simultaneously perform a plurality of operations corresponding to the abnormal state of a second type when the abnormal state is the second type different from the first type.

3. A reception device, comprising:
an operation device which is used to operate a variety of operations;
an obstacle checking device which is used to check whether an obstacle exists in a monitoring area, and the monitoring area includes an operation range of the operation device; and
a control device which simulates an operation path of the operation device in advance before the operation device performs an operation and during a process of performing the operation, and if there is the obstacle in the operation path which is simulated, performs a control to cause the operation device to perform an operation corresponding to an abnormal state,
wherein the control device performs the control to cause the operation device to sequentially perform different operations corresponding to the abnormal state as time of the abnormal state goes by,
wherein the control device performs the control to cause the operation device to stop an ongoing operation when the obstacle is a human.

4. The reception device according to claim 3, wherein the control device performs the control to cause the operation device to further output an alarm when the obstacle is the human.

5. The gaming machine according to claim 1, wherein the control device performs the control to cause the operation device to sequentially perform different operations corresponding to the abnormal state as time of the abnormal state goes by.

6. The gaming machine according to claim 1, wherein the control device performs the control to cause the operation device to stop an ongoing operation when the obstacle is a human.

7. The gaming machine according to claim 6, wherein the control device performs the control to cause the operation device to further output an alarm when the obstacle is the human.

8. The gaming machine according to claim 1, wherein the dealer replacement device simulates a human dealer, and comprises an arm which is used to perform the variety of operations and a body which supports the arm.

9. The gaming machine according to claim 8, wherein the arm has a multiple degree of freedom in a state that the arm is connected to the body, and
wherein the operation path includes the operation path of the arm.

10. A gaming machine, comprising:
a dealer replacement device which is used to perform a variety of operations including a handling operation for a gaming equipment used in a game;
an obstacle checking device which is used to check whether an obstacle exists in a monitoring area, and the monitoring area includes an operation range of the dealer replacement device; and
a control device which simulates an operation path of the dealer replacement device in advance before the dealer replacement device performs an operation and during a process of performing the operation, and if there is the obstacle in the operation path which is simulated, performs a control to cause the dealer replacement device to perform an operation corresponding to an abnormal state,
wherein the control device performs the control to cause the operation device to stop an ongoing operation when the obstacle is a human.

11. The gaming machine according to claim 10, wherein the control device performs the control to cause the operation device to further output an alarm when the obstacle is the human.

12. A reception device, comprising:
- an operation device which is used to move in a 3D space and locate at any position of the 3D space;
- an obstacle checking device which is used to check whether an obstacle exists in a monitoring area, and the monitoring area includes an operation range of the operation device; and
- a control device which simulates an operation path of the operation device in advance before the operation device performs an operation and during a process of performing the operation, and if there is the obstacle in the operation path which is simulated, performs a control to cause the operation device to perform an operation corresponding to an abnormal state.

* * * * *